US010638020B2

(12) United States Patent
Ochiai et al.

(10) Patent No.: US 10,638,020 B2
(45) Date of Patent: Apr. 28, 2020

(54) COLOR CONVERSION LUT GENERATING DEVICE, COLOR CONVERSION LUT GENERATION METHOD, COLOR CONVERSION PROCESSING DEVICE, COLOR CONVERSION PROCESSING METHOD, AND STORAGE MEDIUM

(71) Applicant: CANON KABUSHIKI KAISHA, Tokyo (JP)

(72) Inventors: Takashi Ochiai, Machida (JP); Shoei Moribe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/945,175

(22) Filed: Apr. 4, 2018

(65) Prior Publication Data

US 2018/0295258 A1    Oct. 11, 2018

(30) Foreign Application Priority Data

Apr. 11, 2017  (JP) ................................ 2017-078367

(51) Int. Cl.
*G03F 3/08*     (2006.01)
*H04N 1/60*     (2006.01)
*B41J 2/21*     (2006.01)

(52) U.S. Cl.
CPC ......... *H04N 1/6025* (2013.01); *H04N 1/6008* (2013.01); *B41J 2/21* (2013.01); *H04N 1/605* (2013.01)

(58) Field of Classification Search
None
See application file for complete search history.

(56) References Cited

U.S. PATENT DOCUMENTS

| 9,894,250 | B2 | 2/2018 | Moribe | |
|---|---|---|---|---|
| 2003/0098986 | A1* | 5/2003 | Pop | H04N 1/54 358/1.9 |
| 2004/0212817 | A1* | 10/2004 | Hagai | H04N 1/6019 358/1.9 |

(Continued)

FOREIGN PATENT DOCUMENTS

| JP | H10-173951 A | 6/1998 |
|---|---|---|
| JP | 2009-130846 A | 6/2009 |

*Primary Examiner* — Huo Long Chen
(74) *Attorney, Agent, or Firm* — Carter, DeLuca & Farrell LLP

(57) ABSTRACT

A generating device that generates a first color conversion LUT for converting an input image signal value into an output value of an actual color material installed in an image forming device, includes: an acquiring unit that acquires grid point position information indicating positions of the grid points in the first color conversion LUT; and a generating unit that generates the first color conversion LUT on the basis of grid point position information, wherein the generating unit determines whether or not an inflection point of an output value of the actual color material is at a position of the grid point, corrects at least some output values for at least two actual color materials in the second color conversion LUT in accordance with a determination result, and generates the first color conversion LUT obtained by thinning out the grid points in the second color conversion LUT.

17 Claims, 36 Drawing Sheets

(56) References Cited

U.S. PATENT DOCUMENTS

| | | | |
|---|---|---|---|
| 2013/0141764 A1* | 6/2013 | Nishikawa | H04N 1/6058 358/3.23 |
| 2015/0138574 A1* | 5/2015 | Yamaguchi | H04N 1/605 358/1.9 |
| 2015/0256717 A1* | 9/2015 | Yamada | H04N 1/6019 358/3.23 |
| 2017/0324885 A1 | 11/2017 | Ochiai et al. | |

* cited by examiner

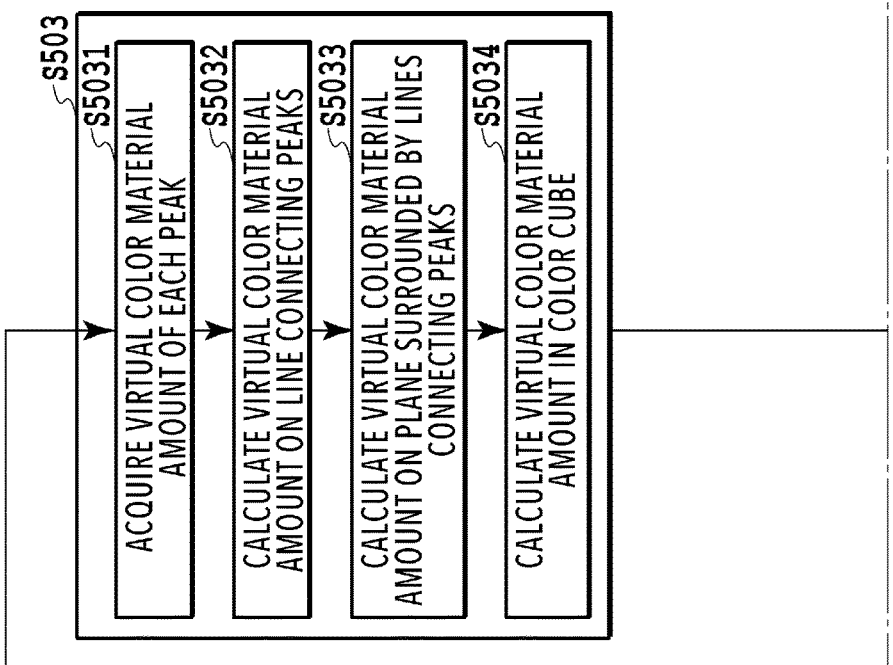
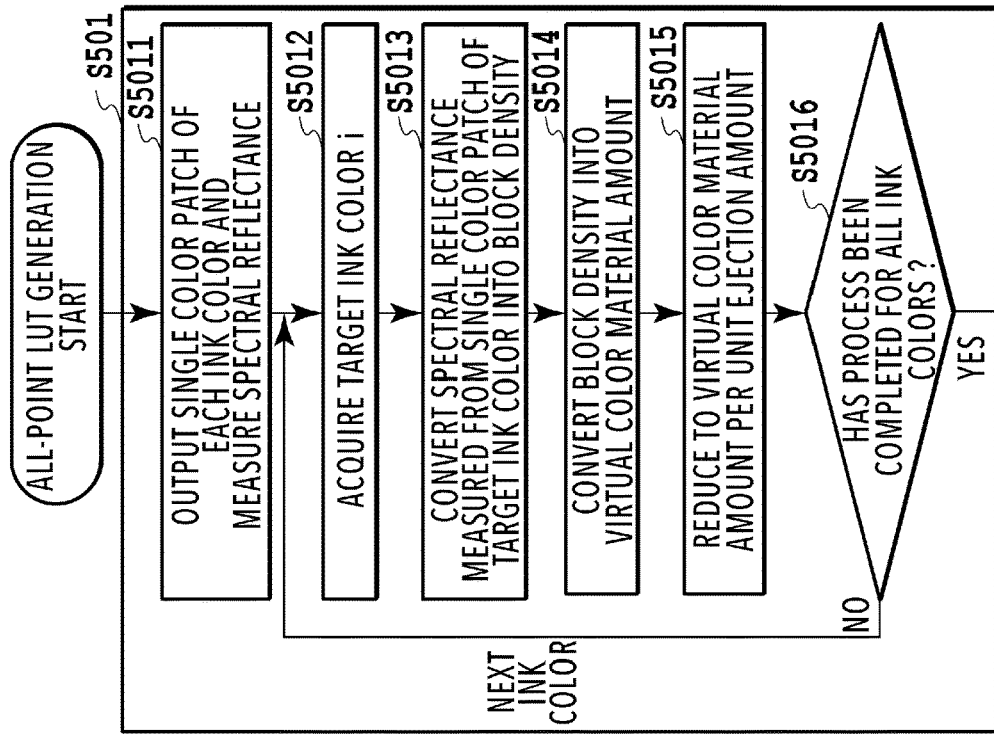
FIG.5
| FIG.5A |
|--------|
| FIG.5B |
FIG.5A

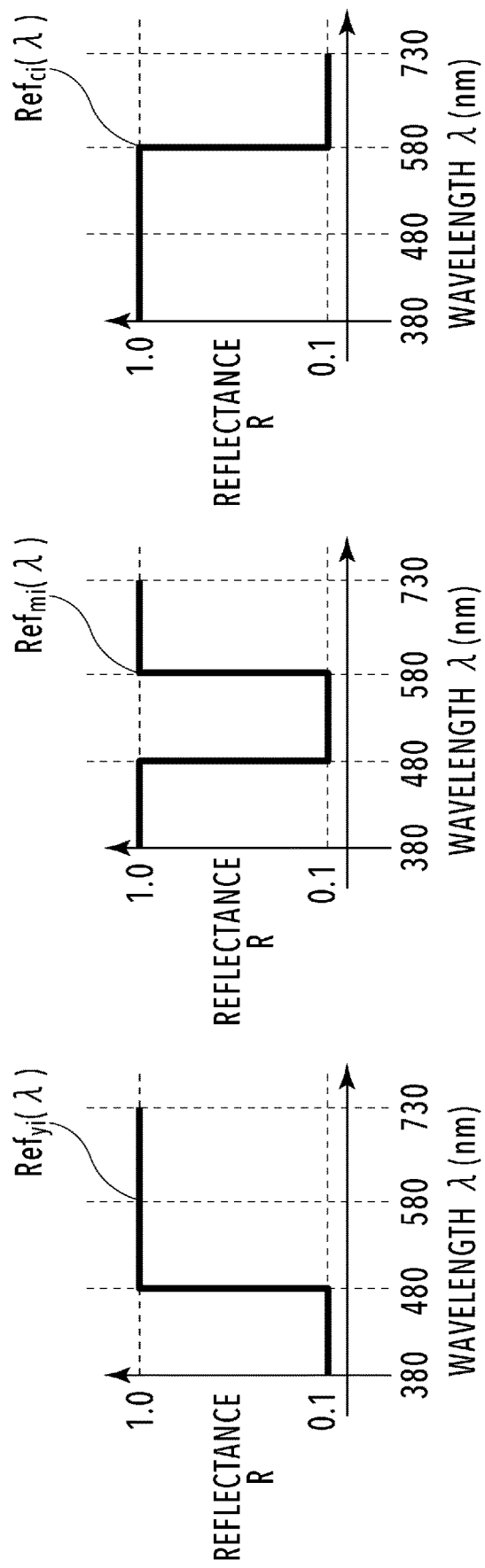

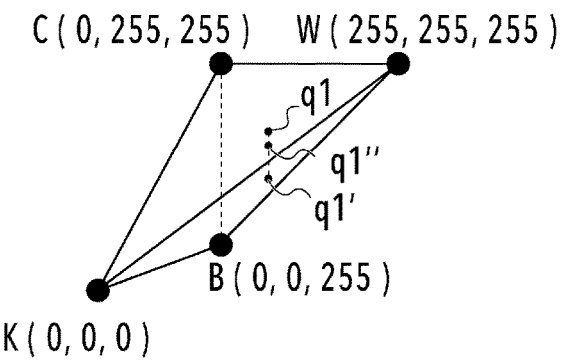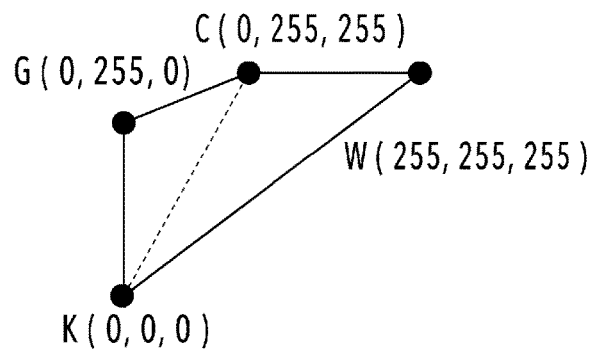
FIG.12A       FIG.12B
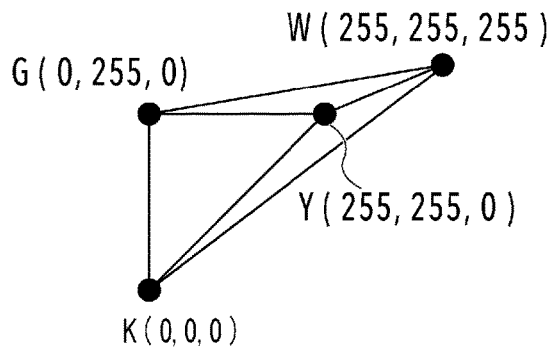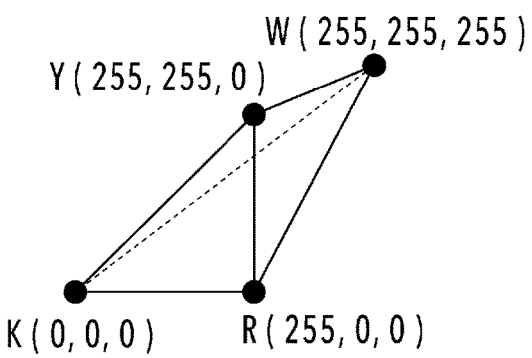
FIG.12C       FIG.12D
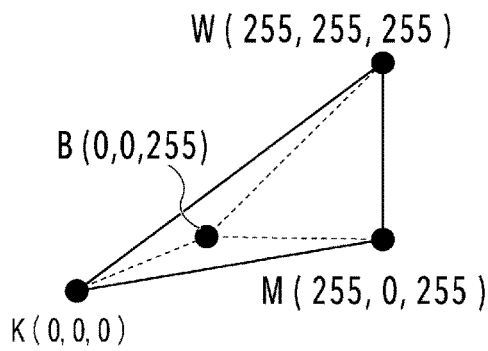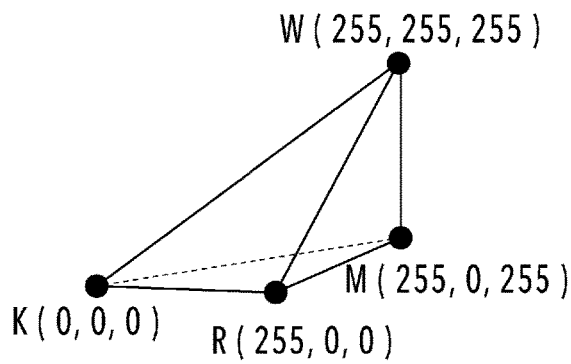
FIG.12E       FIG.12F

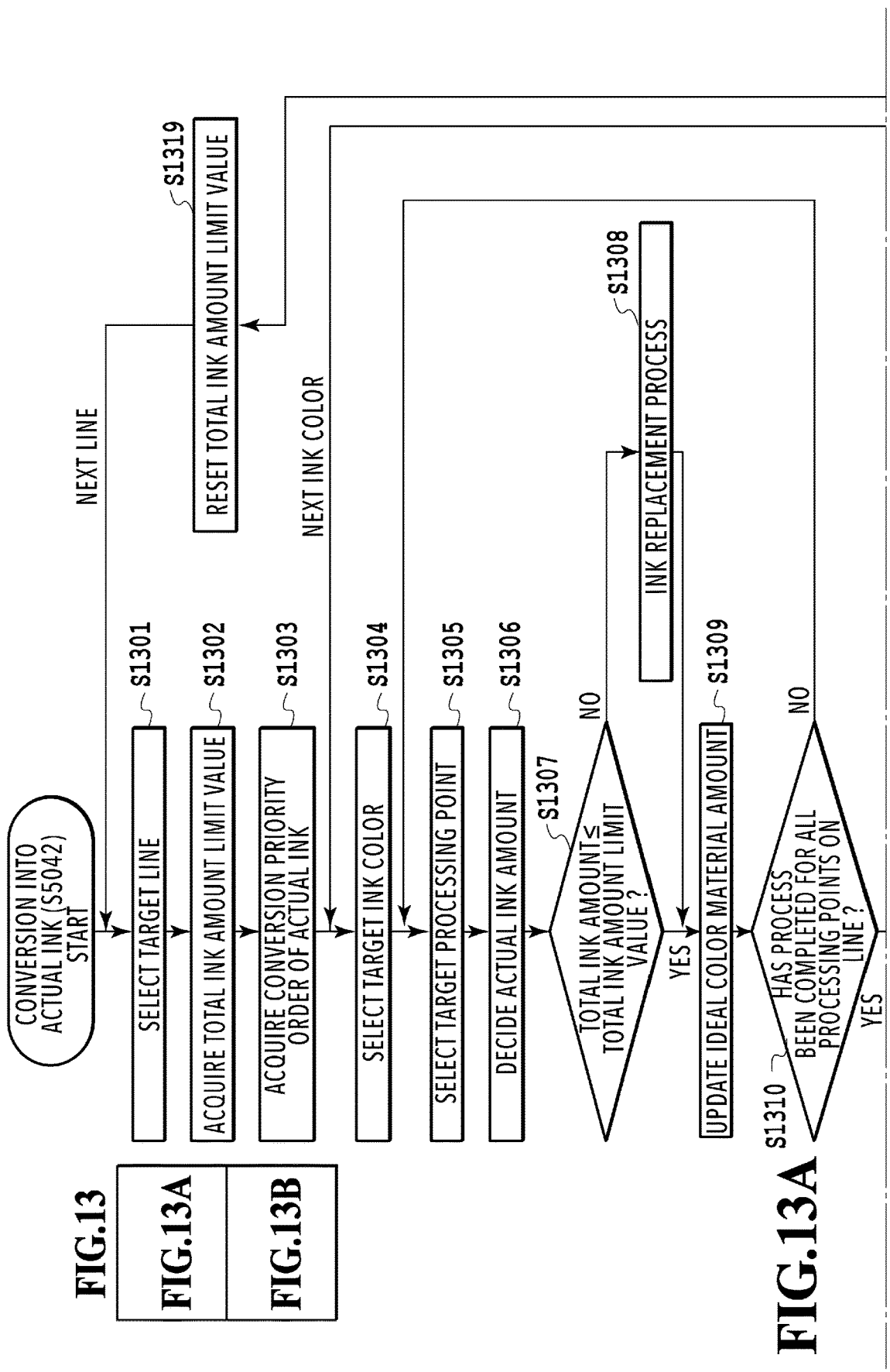

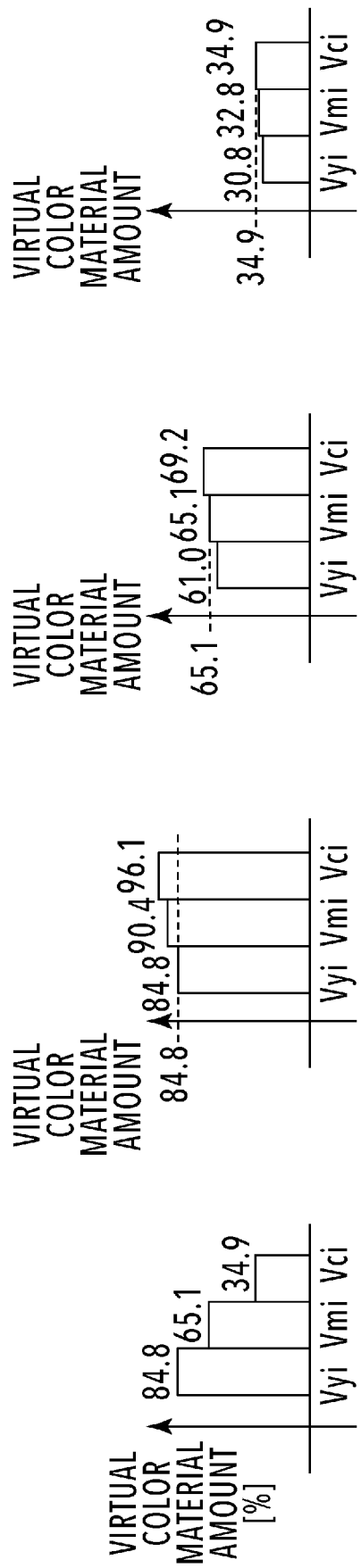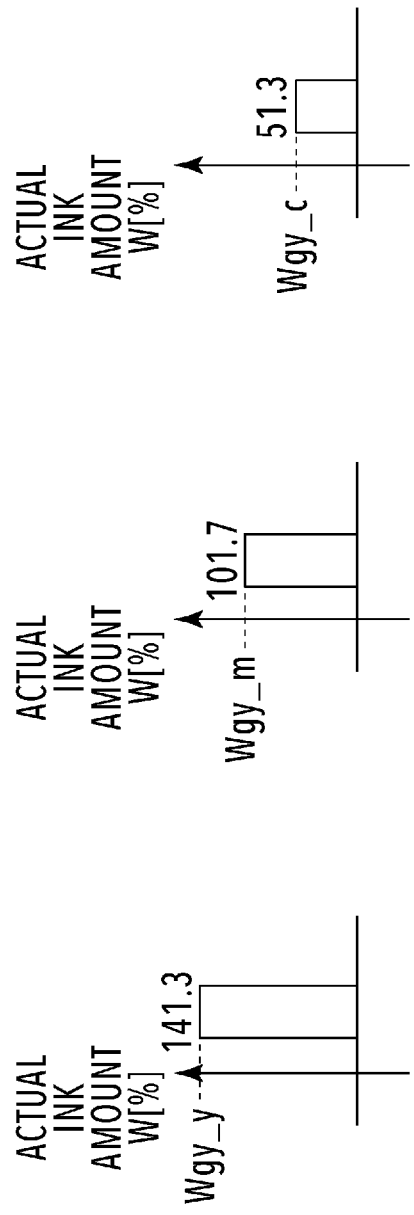

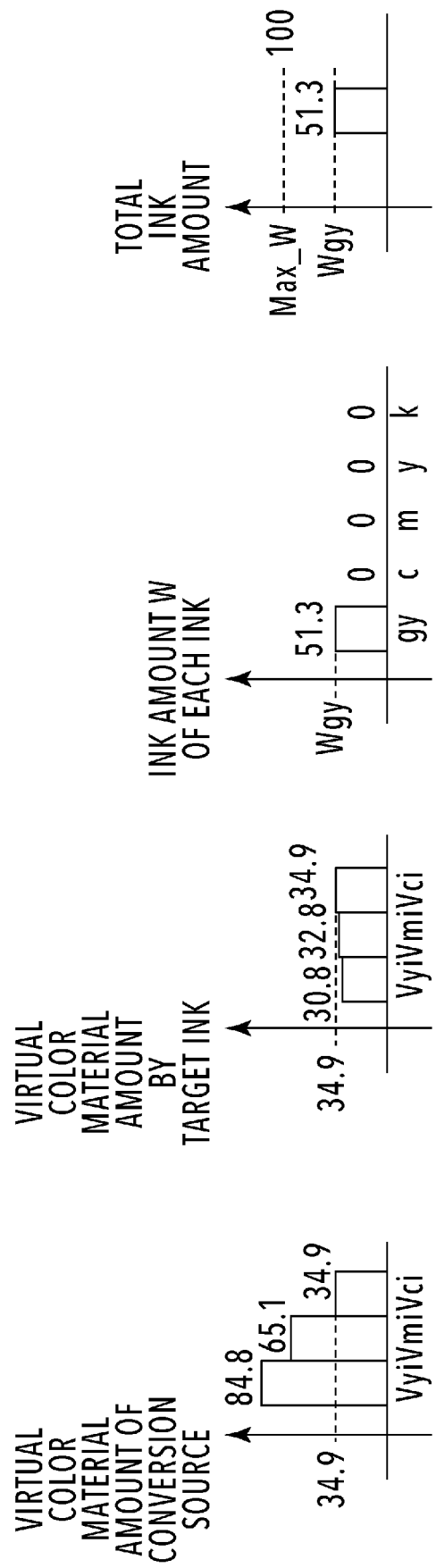

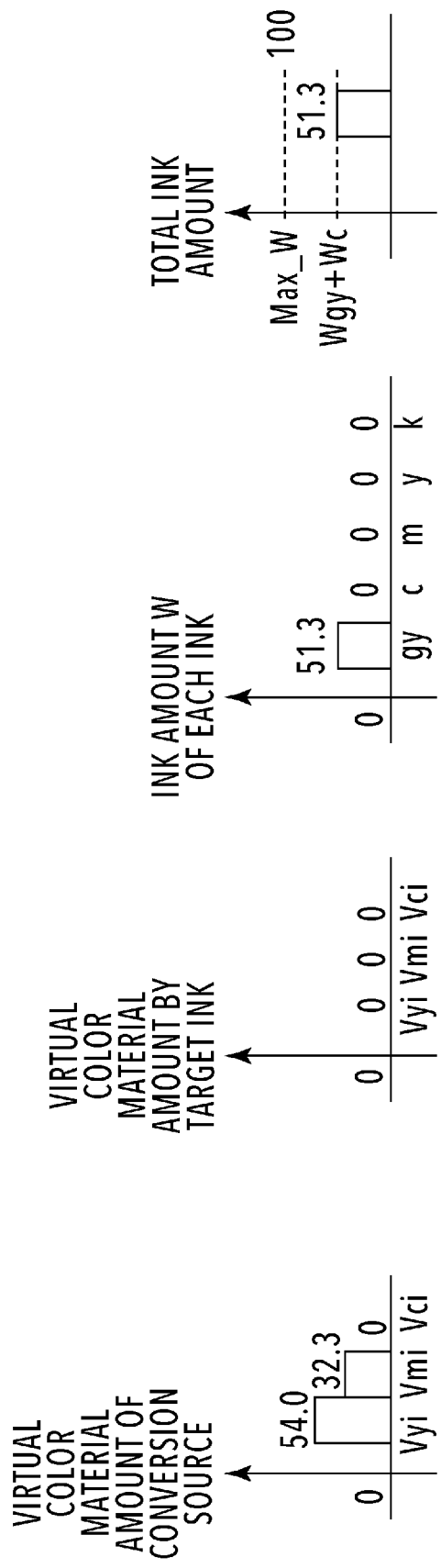

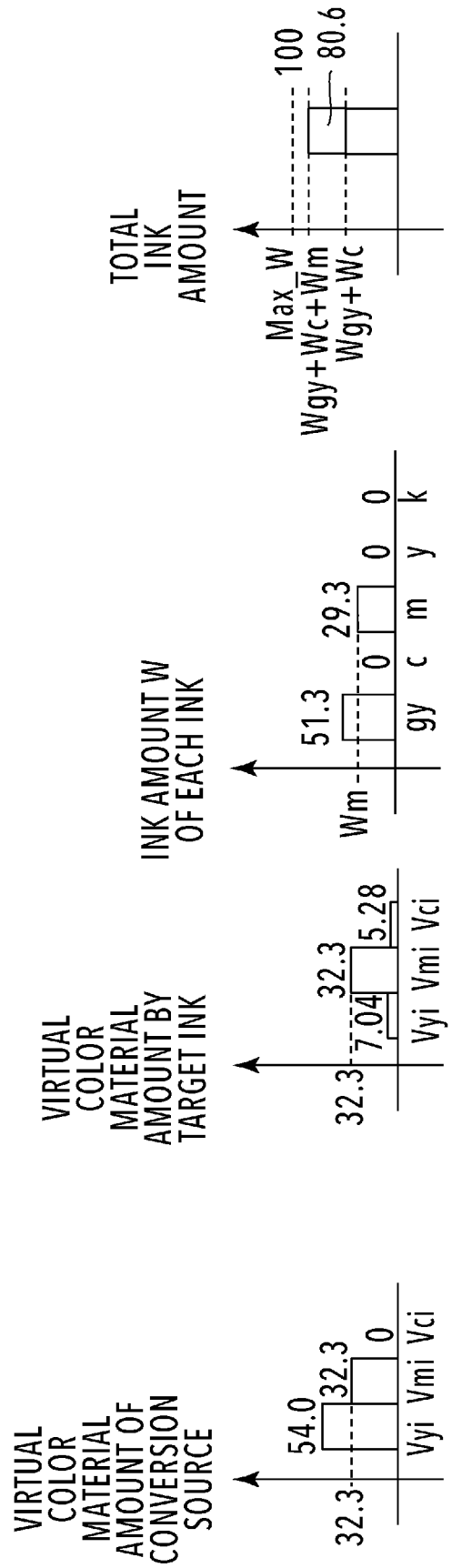

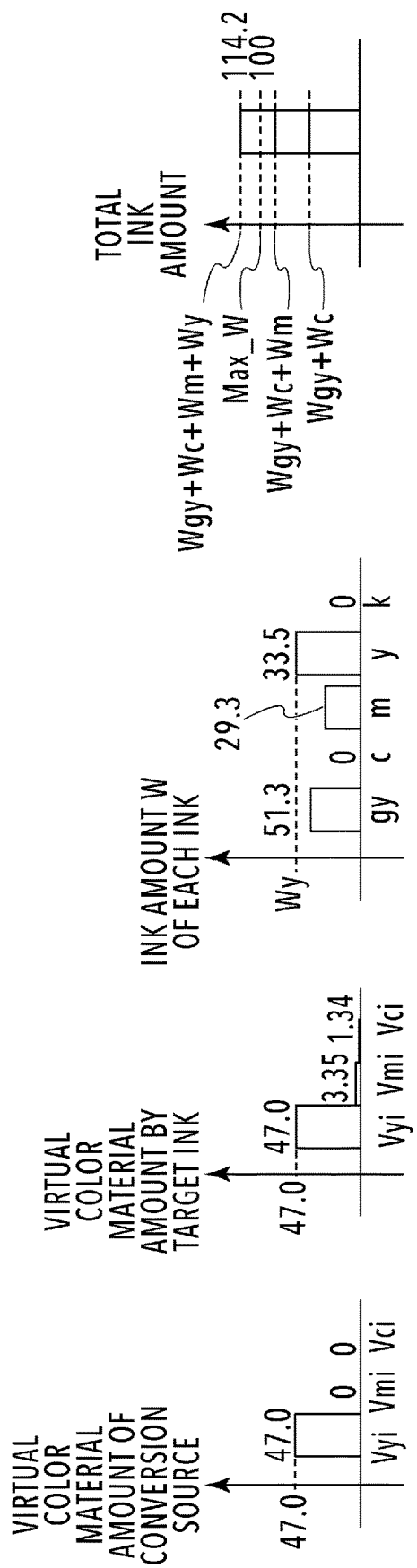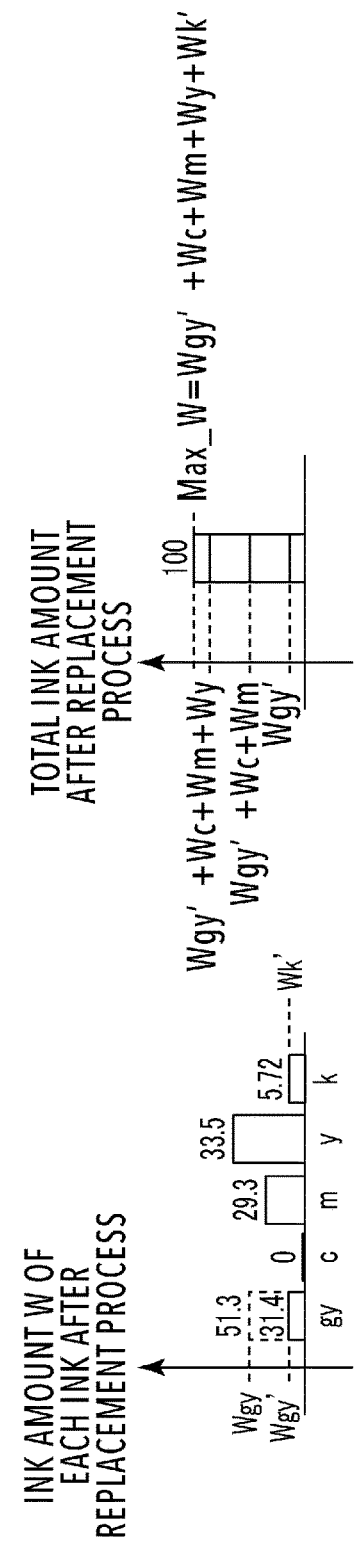

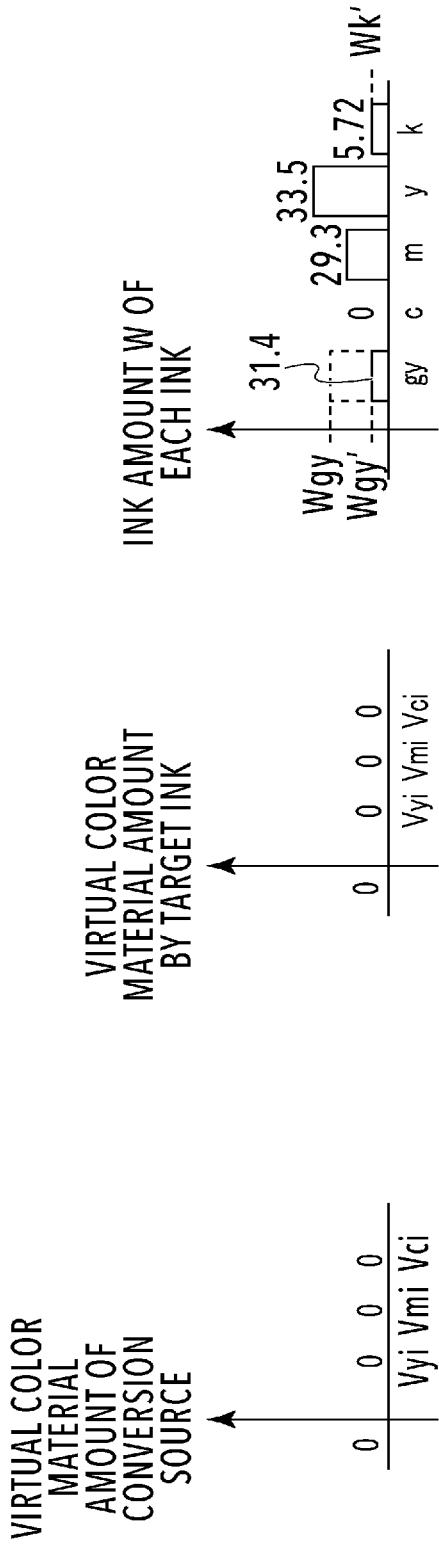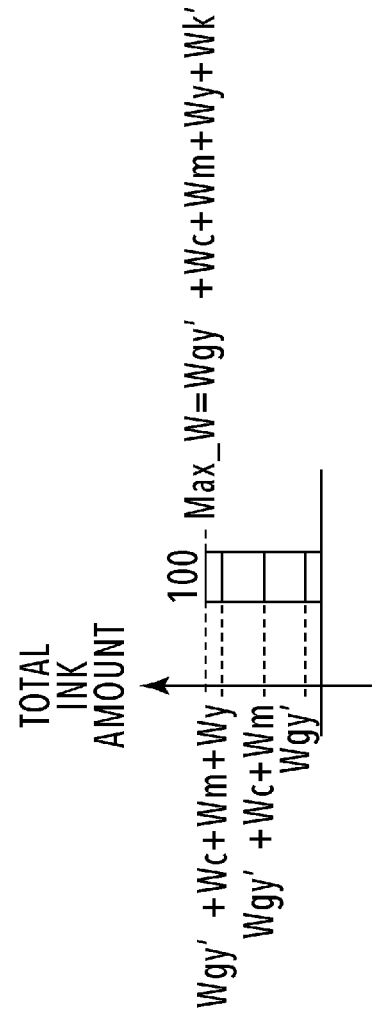

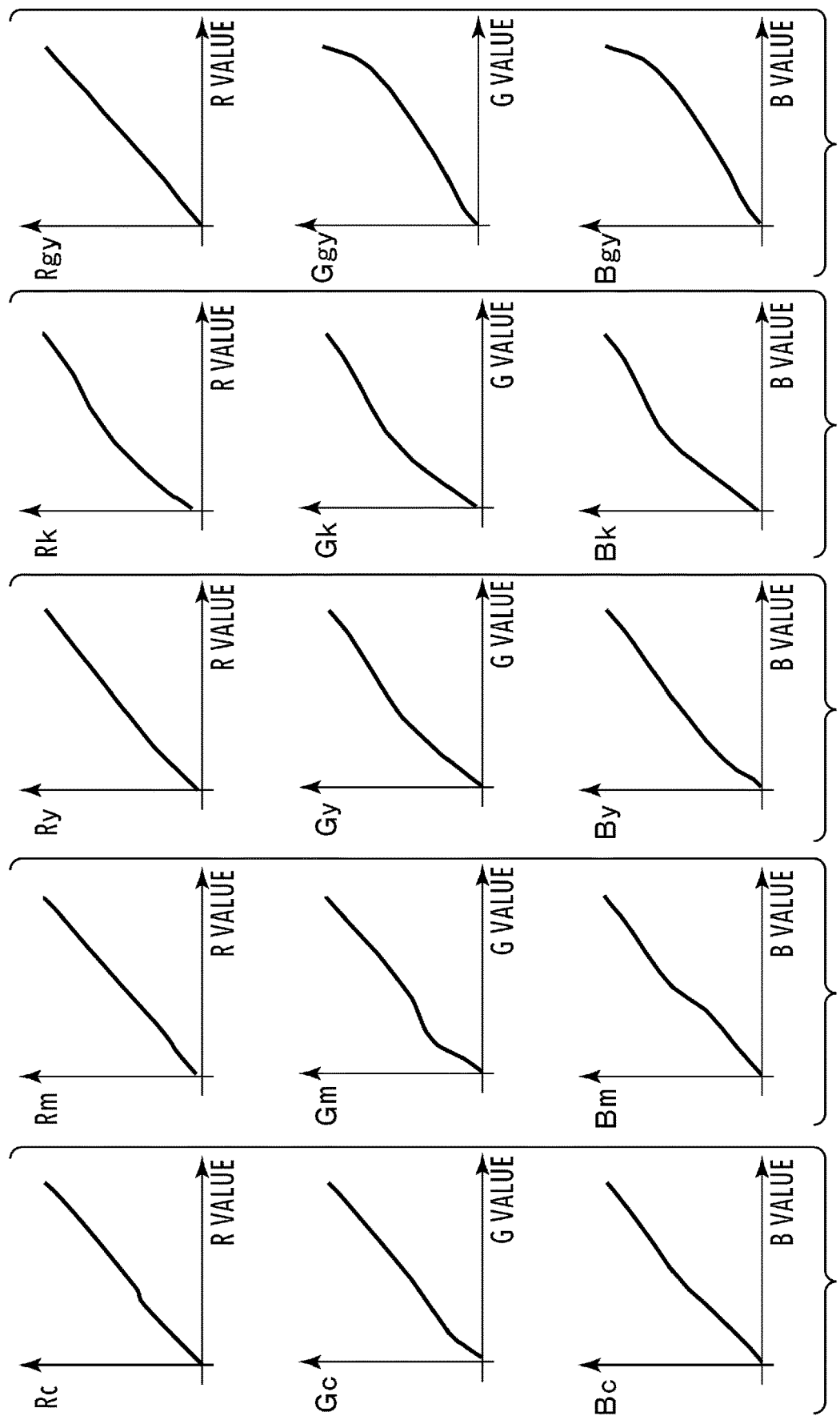

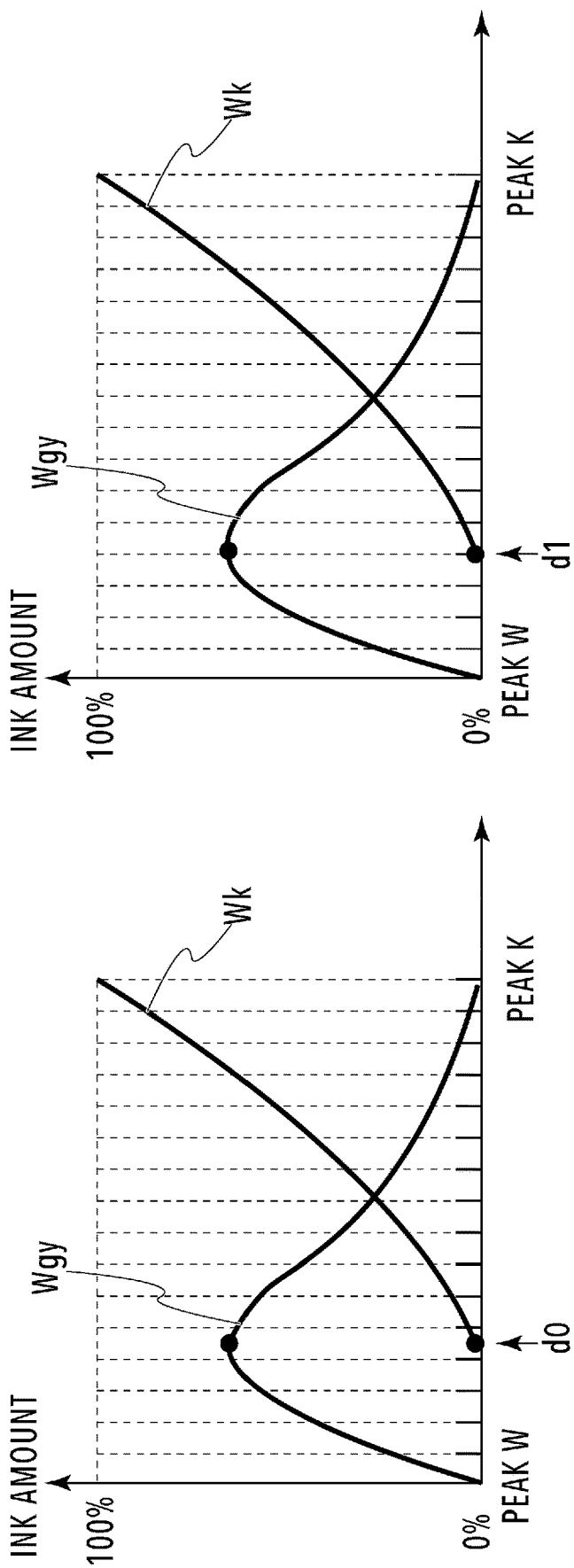

COLOR CONVERSION LUT GENERATING DEVICE, COLOR CONVERSION LUT GENERATION METHOD, COLOR CONVERSION PROCESSING DEVICE, COLOR CONVERSION PROCESSING METHOD, AND STORAGE MEDIUM

BACKGROUND OF THE INVENTION

Field of the Invention

The present invention relates to a technique of generating a color conversion LUT for converting an input image signal into an output value of a color material installed in an image forming device.

Description of the Related Art

A printer represented by an ink jet system or an electrophotographic system converts an input image signal (usually, color signals of three channels of RGB) into an amount of a color material (for example, CMYK ink or toner) installed in the printer and generates print data. The conversion is called a color conversion process or a color separation process, and a technique in which a three-dimensional lookup table (hereinafter referred to as an "LUT") and an interpolation calculation are combined has currently become the main stream.

Normally, in order to save a storage capacity, the three-dimensional LUT holds an output value of a color material at only about 17×17×17 grid points corresponding to an R value, a G value, and a B value in an RGB color space, and the output value of the color material between the grid points is calculated by the interpolation calculation. In order for the three-dimensional LUT to have a desired color conversion characteristic, it is important to appropriately set a correspondence relation between each grid point (an input image signal value) and an output value of each color material.

Japanese Patent Laid-Open No. H10-173951 (1998) discloses a technique of generating a color conversion LUT for generating a thinned LUT obtained by thinning out grid points from an all-point LUT having 256×256×256 grid points while maintaining a certain level of a color conversion characteristic of the all-point LUT. Further, Japanese Patent Laid-Open No. 2009-130846 discloses a technique of correcting the position of a grid point in order to improve color reproducibility in a printed material.

SUMMARY OF THE INVENTION

The present invention aims to provide a color conversion LUT creation technique with a satisfactory color conversion characteristic without requiring a complicated process in a color conversion process.

A color conversion LUT generating device of the present invention is a first color conversion LUT generating device that generates the first color conversion LUT for converting an input image signal value into an output value of an actual color material installed in an image forming device, the first color conversion LUT is a look up table obtained by thinning out grid points in a second color conversion LUT in which the number of grid points is larger than the number of grid points of the first color conversion LUT, and the color conversion LUT generating device includes an acquiring unit configured to acquire grid point position information indicating positions of the grid points in the first color conversion LUT and a generating unit configured to generate the first color conversion LUT on the basis of the grid point position information, wherein the generating unit determines whether or not an inflection point of the output value of the actual color material is at a position of the grid point, corrects at least some output values for at least two actual color materials in the second color conversion LUT in accordance with a determination result, and generates the first color conversion LUT obtained by thinning out the grid points in the second color conversion LUT.

Further features of the present invention will become apparent from the following description of exemplary embodiments with reference to the attached drawings.

BRIEF DESCRIPTION OF THE DRAWINGS

FIG. 5 is a diagram showing the relationship of FIGS. 5A and 5B;

FIG. 5A is a flowchart illustrating an all-point LUT generation procedure in the first embodiment;

FIGS. 6A to 6C are graphs illustrating examples of spectral reflectances in the first embodiment;

FIGS. 12A to 12F are diagrams schematically illustrating a process of calculating an ideal color material amount (an actual ink amount) in the all-point LUT in the first embodiment;

FIG. 13 is a diagram showing the relationship of FIGS. 13A and 13B;

FIG. 13A is a flowchart illustrating a procedure of calculating an actual ink amount in the first embodiment;

FIGS. 15A, 15B-1, 15C-1, 15D-1, 15B-2, 15C-2 and 15D-2 are schematic diagrams illustrating a procedure of deciding an actual ink amount in the first embodiment;

FIGS. 16A to 16D are diagrams for describing a change in a loop process of S1304 to S1317 in the first embodiment;

FIGS. 17A to 17D are diagrams for describing a change in the loop process of S1304 to S1317 in the first embodiment;

FIGS. 18A to 18D are diagrams for describing a change in the loop process of S1304 to S1317 in the first embodiment;

FIGS. 19A, 19B, 19C-1, 19D-1, 19C-2 and 19D-2 are diagrams for describing a change in the loop process of S1304 to S1317 in the first embodiment;

FIGS. 20A to 20D are diagrams for describing a change in the loop process of S1304 to S1317 in the first embodiment;

FIGS. 23A to 23E are schematic diagrams illustrating an example of a non-linear conversion LUT in the second embodiment;

FIGS. 34A and 34B are graphs illustrating transition of an actual ink amount in the fourth embodiment.

DESCRIPTION OF THE EMBODIMENTS

In the technique disclosed in Japanese Patent Laid-Open No. H10-173951 (1998), since the grid points are thinned out from the all-point LUT in accordance with a predetermined rule (for example, an equal interval or the like), a grid point interval in the thinned LUT depends on the rule. For this reason, there are cases in which an input image signal value corresponding to a point at which an increase or decrease of the output value of the color material changes with respect to a color material which is to undergo the color conversion process (the input image signal value is hereinafter referred to as an "inflection point") does not coincide with the grid point in the thinned LUT. As a result, an error occurs between the output value of the color material being output with reference to the all-point LUT and the output value of the color material calculated by the interpolation calculation, leading to a deterioration of a gradation property.

In this regard, the technique of correcting the position of the grid point in the thinned LUT may be applied as in the technique of Japanese Patent Laid-Open No. 2009-130846, but since the interval of the grid point is also changed, a further problem arises in that the interpolation calculation is complicated. Particularly, in a case in which the thinned LUT is implemented by a hardware circuit such as an ASIC, it is necessary to change a design of the circuit in order to change the interval of the grid point, and thus a great cost and time are required.

Hereinafter, modes for carrying out the present invention will be described with reference to the appended drawings. However, constituent elements described in embodiments are merely examples, and the scope of the present invention is not necessarily limited thereto.

First Embodiment (Overall Configuration of Printing System)

Figure 1:
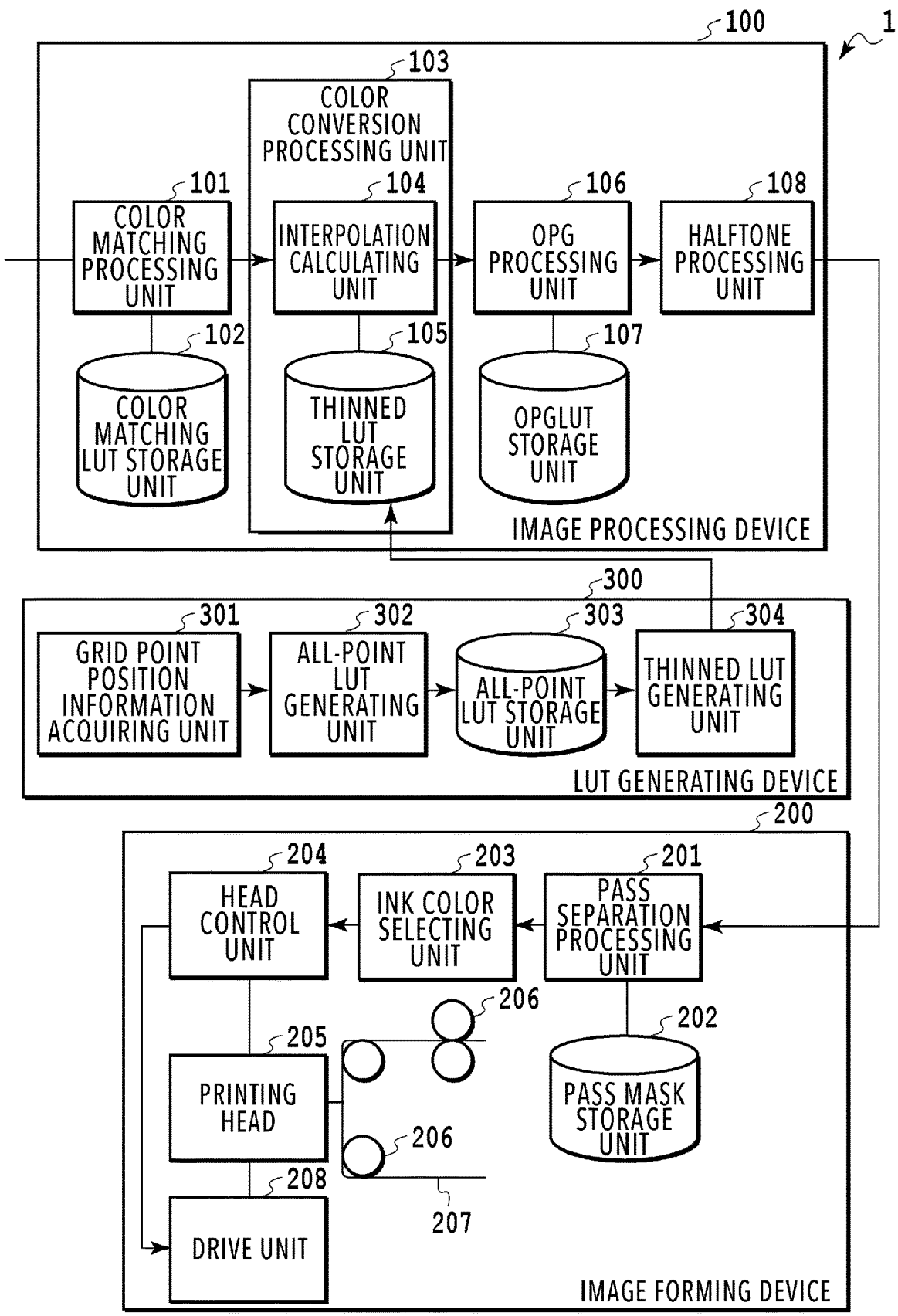
FIG. 1 is a block diagram illustrating an overall configuration example of a printing system in a first embodiment.

FIG. 1 is a block diagram illustrating an overall configuration example of a printing system 1 in the present embodiment. The printing system 1 of the present embodiment includes an image processing device 100, an image forming device 200, and an LUT generating device 300. The image processing device 100, the image forming device 200, and the LUT generating device 300 are connected to be able to communicate with one another via a printer interface (hereinafter also referred to as an "I/F"), a circuit, or a network I/F.

The image processing device 100 is constituted, for example, by a circuit such as an ASIC. As another configuration example of the image processing device 100, the image forming device 200 may include the image processing device 100 therein. Alternatively, the image processing device 100 may be implemented by a printer driver installed in a general information processing device (a personal computer). The image processing device 100 receives an input of image data indicating an image of a printing target and transfers image data to a color matching processing unit 101. The image data is, for example, color image data based on an 8-bit RGB image signal.

The color matching processing unit 101 performs a color matching process on the input image data and converts a color of the RGB image. With the color matching process, it is possible to reproduce a unified color tint even in a case where a printer or a printing medium having a different color reproduction characteristic is used. A three-dimensional color matching LUT stored in a color matching LUT storage unit 102 is referred to in a case where the color matching process is performed. In the color matching LUT, RGB signal values of 8 bits (0 to 255) are held at grid points thinned out to 17×17×17. The RGB signal value between the grid points is calculated by linear interpolation.

A color conversion processing unit 103 receives an input of the image data corrected by the color matching processing unit 101 and generates 5-plane 8-bit ink value image data corresponding to inks of five colors installed in the image forming device 200. In the present embodiment, the inks of the five colors installed in the image forming device 200 are cyan (C), magenta (M), yellow (Y), black (K), and gray (GY) but may be a combination of inks of other colors. In the color conversion processing unit 103, an interpolation calculating unit 104 performs an interpolation calculation on the image data which has undergone the color matching process with reference to the thinned LUT stored in a thinned LUT storage unit 105. The thinned LUT is a three-dimensional LUT having 17×17×17 grid points, and ink amounts (ink values) of the inks of the five colors are held at the grid points of the thinned LUT. The interpolation calculating unit 104 calculates the ink amount between the grid points through the linear interpolation with reference to the thinned LUT. In the present embodiment, the thinned LUT storage unit 105 stores the thinned LUT generated in advance by the LUT generating device 300.

An output gamma (OPG) processing unit 106 performs a gamma correction process on the ink value image data which has undergone the color separation process for each ink color. In a case where the gamma correction process is performed, a one-dimensional OPGLUT stored in an OPGLUT storage unit 107 is referred to. In a case where printing is performed using only each ink, a value is set in an OPGLUT for each ink color so that brightness of a printed material printed by the image forming device 200 changes linearly with respect to a signal value in the ink value image data. L* specified in CIELAB is used as a brightness evaluation value.

A halftone processing unit 108 performs a quantization process for converting the ink value image data of each color output from the OPG processing unit 106 into a binary value (or a multiple value of a gradation number which is a binary value or more and smaller than an input gradation number). In the present embodiment, a known dither matrix method is selected as a method of performing a halftone process. Here, the method of the halftone process is not limited thereto, and for example, a well-known error diffusion method may be used. The binary image data generated by the halftone processing unit 108 is output to the image forming device 200 via an output I/F or an output terminal.

The image forming device 200 forms an image indicated by the binary image data formed by the image processing device 100 on a printing medium 207 by moving a printing head 205 lengthwise and crosswise relative to the printing medium 207 such as cut paper. In the present embodiment, an example in which the image forming device 200 is a printer of an ink jet system including the printing head 205 will be described. The printing head 205 includes a plurality of printing elements (nozzles). The printing head 205 of the present embodiment is equipped with ink tanks of five colors C, M, Y, K, and GY. A head control unit 204 controls an operation of a drive unit 208. The drive unit 208 moves the printing head 205 under the control of the head control unit 204. The head control unit 204 also controls an operation of a conveying unit 206. The conveying unit 206 conveys the printing medium under the control of the head control unit 204. In the present embodiment, the printing head 205 scans the printing medium 207 twice or more and forms an image. Such an image forming method is referred to as a so-called "multipass printing method." A pass separation processing unit 201 generates scan data of each color on the basis of the binary image data of each color generated by the image processing device 100 and a pass mask acquired from a pass mask storage unit 202. On the basis of the generated scan data, an ink color selecting unit 203 selects the ink color from among the ink colors loaded into the printing head 205, and the selected ink is ejected onto the printing medium 207 through the printing element (nozzle).

Next, the LUT generating device 300 will be described. The LUT generating device 300 of the present embodiment is implemented by a general information processing device (a personal computer). A grid point position information acquiring unit 301 acquires grid point position information of a thinned LUT serving as a generation target. Here, the grid point position information is information indicating positions of grid points on an R axis, a G axis, and a B axis which are axes of the input RGB signal in the thinned LUT, and for example, the grid point position information acquiring unit 301 can acquire the grid point position information on every 17 points in each axis. The grid point position information acquiring unit 301 can acquire the grid point position information from a definition file in which the grid point position information is described in advance. Further, in a case where an existing thinned LUT is generated, the grid point position information acquiring unit 301 can also acquire the grid point position information with reference to the thinned LUT storage unit 105. Alternatively, the grid point position information acquiring unit 301 can also generate the grid point position information by performing a calculation according to a predetermined rule on the basis of the number of grid points of a predetermined thinned LUT. For example, in a case where the number of grid points is 17, and a grid point position is generated at equal intervals, (R, G, B)=(16,0,0) (32,0,0) . . . (255,255,255) is output. An all-point LUT generating unit 302 generates an all-point LUT using the acquired grid point position information. In the present embodiment, the all-point LUT is a three-dimensional LUT with a size having 256 grid points in each of the R axis, the G axis, and the B axis. The all-point LUT is an LUT in which the number of grid points is larger than the number of grid points of the thinned LUT and used as a reference of the thinned LUT. A method of generating the all-point LUT will be described later. An all-point LUT storage unit 303 stores the all-point LUT generated by the all-point LUT generating unit 302. A thinned LUT generating unit 304 generates a thinned LUT on the basis of the all-point LUT stored in the all-point LUT storage unit 303. The thinned LUT generated by the thinned LUT generating unit 304 is stored in the thinned LUT storage unit 105 of the image processing device 100. A method of generating the thinned LUT will be described later.

(Hardware configuration of LUT generating device)

Figure 2:
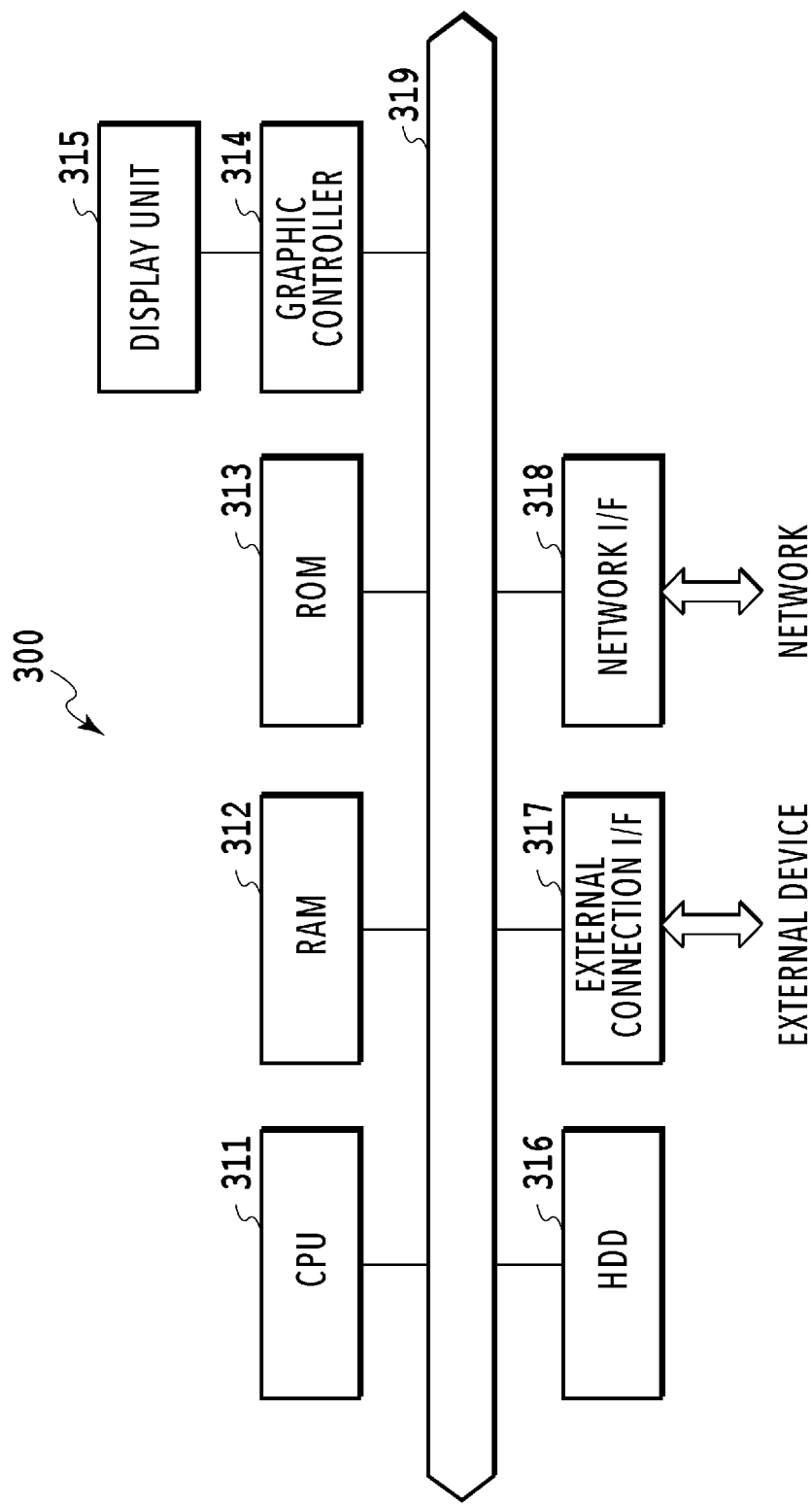
FIG. 2 is a diagram illustrating a hardware configuration example of an information processing device in the first embodiment.

FIG. 2 is a block diagram illustrating a hardware configuration example of the LUT generating device 300 in the present embodiment. The LUT generating device 300 includes a CPU 311, a RAM 312, a ROM 313, a graphic controller 314, a display unit 315, and a hard disk drive (HDD) 316. The LUT generating device 300 further includes an external connection I/F 317 and a network I/F 318, and the respective components are connected to be able to communicate with one another via a bus 319. The CPU 311 includes an operation circuit and performs integrated control of the LUT generating device 300. The CPU 311 reads a program stored in the ROM 313 or the HDD 316 out to the RAM 312 and executes various kinds of processes. The ROM 313 stores a system program and the like used for controlling the LUT generating device 300. The graphic controller 314 generates a screen to be displayed on the display unit 315. The HDD 316 has a function as a storage region and stores an application program and the like for executing various kinds of processes. The HDD 316 is an example of a storage device and can be constituted by a solid state drive (SSD) or the like instead of an HDD. The external connection I/F 317 is an interface for connecting various devices to the LUT generating device 300. For example, the image processing device 100, a display, a keyboard, a mouse, and the like can be connected via the external connection I/F 317. The network I/F 318 communicates with the image processing device 100 or the like via a network under the control of the CPU 311. The hardware configuration of the LUT generating device 300 illustrated in FIG. 2 is a general configuration of an information processing device. Therefore, the image processing device 100 can also be implemented by an information processing device having the hardware configuration illustrated in FIG. 2.

(Image forming procedure)

Figure 3:
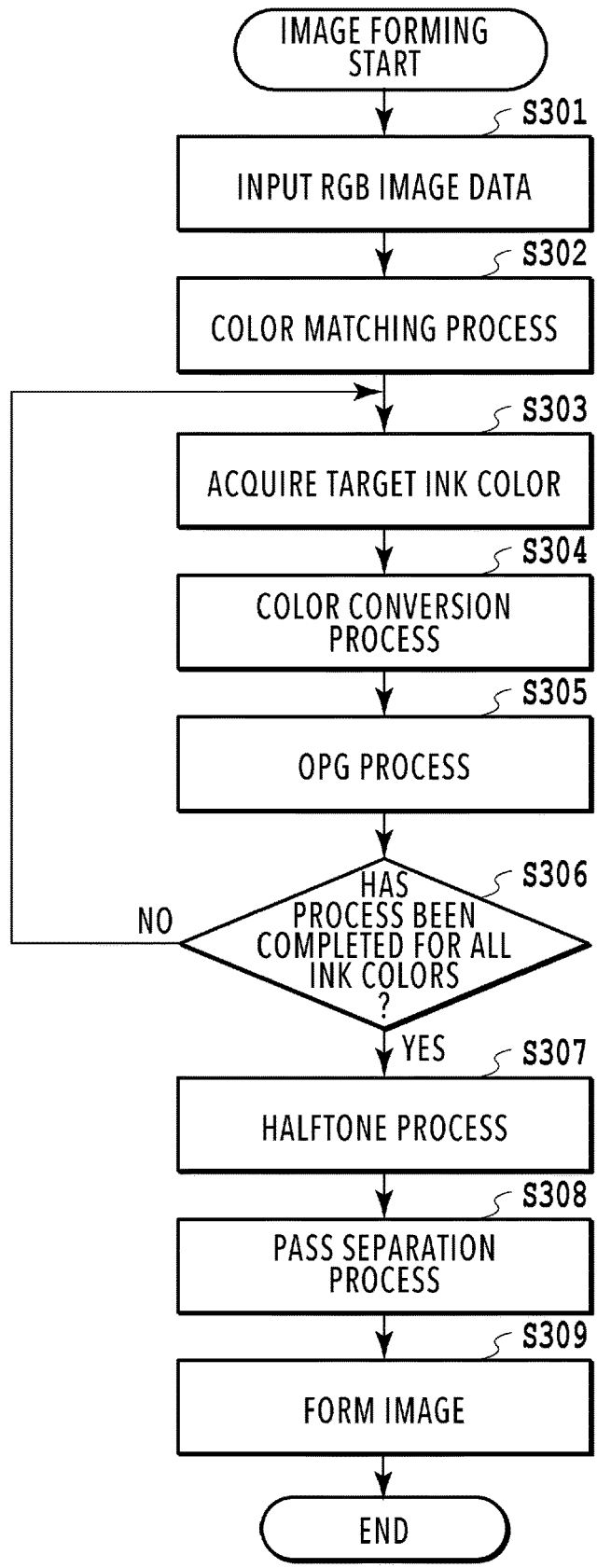
FIG. 3 is a flowchart illustrating an image forming procedure in the first embodiment.

FIG. 3 is a flowchart illustrating a series of processes until the image forming device 200 outputs an image after the image processing device 100 receives an input of image data in the present embodiment. A process of the flowchart illustrated in FIG. 3 is executed by a circuit such as an ASIC mounted on the image processing device 100 and the image forming device 200. Reference signal S below indicates steps in the flowchart. The same applies to flowcharts of FIG. 4 and subsequent drawings.

In S301, RGB image data is input via the external connection I/F of the image processing device 100.

In S302, the color matching processing unit 101 performs the color matching process of the RGB image data input in S301 with reference to the three-dimensional color matching LUT.

In S303, the color conversion processing unit 103 acquires a target ink color which is to undergo the color conversion process. In the present embodiment, the initial set target ink color is a cyan ink color.

In S304, the color conversion processing unit 103 generates ink value image data from the image data converted in the color matching process. In the color conversion process of the present embodiment, the interpolation calculating unit 104 calculates an ink amount between the grid points through the interpolation calculation with reference to the ink amount described at the grid point of the thinned LUT.

In S305, the OPG processing unit 106 performs the output gamma process of the ink value image data generated in the color conversion process with reference to the OPGLUT. For example, in a case where a gradation patch is output using only cyan ink, values before and after conversion are set in the OPGLUT in advance so that brightness is converted linearly in an output image with respect to the signal value indicating the ink value image data. The same applies to the OPGLUTs other than cyan.

In S306, it is determined whether or not the color conversion process (S304) to the OPG process (S305) have been completed for all the ink colors. In a case where the processes have been completed for all the ink colors (S306: YES), the process proceeds to S307. In a case where the processes have not been completed for all the ink colors (S306: NO), the process returns to S303, and a next target ink color is acquired. An order in which the ink color is selected can be, for example, an order of C, M, Y, K, and GY, but different orders may be used.

In S307, the halftone processing unit 108 converts the image data which has undergone the OPG process into binary image data. The binary image data is output to the image forming device 200 with an arbitrary size such as the entire image or a bandwidth of each unit printing region.

In S308, the pass separation processing unit 201 converts the binary image data received from the image processing device 100 into scan data.

In S309, the ink color selecting unit 203 selects an ink color suitable for the scan data. The printing head 205 drives each nozzle corresponding to the selected ink color at constant intervals while moving relative to the printing medium 207. The printing medium 207 is conveyed by a predetermined amount for each movement (scanning) of the printing head 205. The driving of the printing head 205 and the conveying of the printing medium 207 are repeated, and thus an image is formed on the printing medium 207. In a case where image forming (S309) is completed, the process of the present flowchart ends.

(LUT Generation Procedure)

Figure 4:
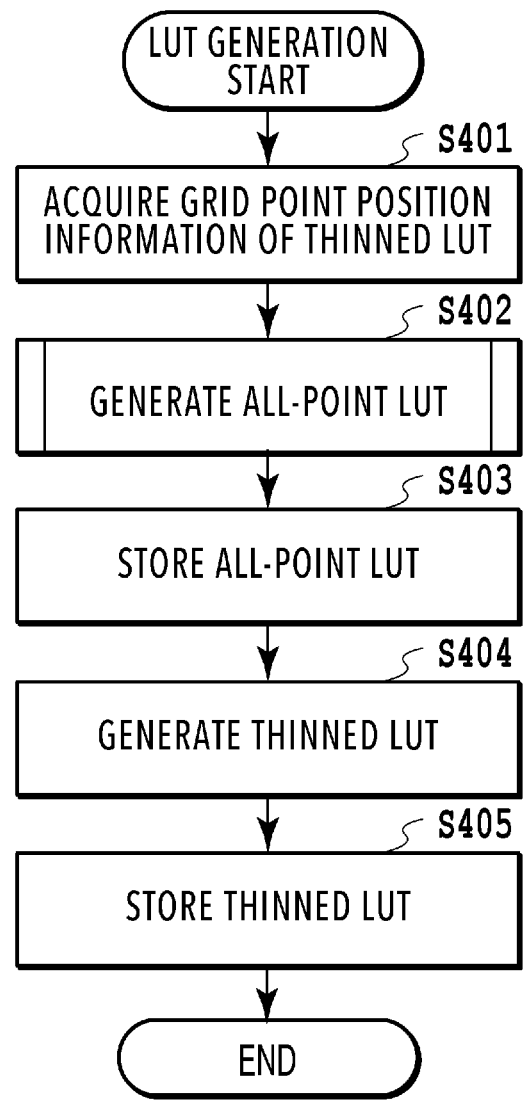
FIG. 4 is a flowchart illustrating an LUT generation procedure in the first embodiment.

FIG. 4 is a flowchart illustrating the LUT generation procedure in the present embodiment. A process of the flowchart illustrated in FIG. 4 is performed by developing a program code stored in the ROM 313 onto the RAM 312 and executing it through the CPU 311 of the LUT generating device 300.

In S401, the grid point position information acquiring unit 301 acquires the grid point position information of the thinned LUT serving as the generation target. The grid point position information acquiring unit 301 can acquire the grid point position information from the definition file in which the grid point position information is described in advance. Further, in a case where an existing thinned LUT is generated, the grid point position information acquiring unit 301 can also acquire the grid point position information with reference to the thinned LUT storage unit 105. Alternatively, the grid point position information acquiring unit 301 can also generate the grid point position information by performing a calculation according to a predetermined rule on the basis of the number of grid points of a predetermined thinned LUT. For example, grid point position information on 17 points, that is, 0, 16, 32, 48, 64, 80, 96, 112, 128, 144, 160, 176, 192, 208, 224, 240, 255, corresponding to the input image signal is acquired for each of three axes, that is, the R axis, the G axis, and the B axis. In the present embodiment, the grid point position information is common to any of ink colors. The grid point position information may differ depending on each of the RGB axes or each ink color of the input image signal, and each piece of grid point position information may be acquired for each of the RGB axes and each ink color of the input image signal.

In S402, the all-point LUT generating unit 302 generates the all-point LUT serving as the reference of the thinned LUT on the basis of the grid point position information acquired by the grid point position information acquiring unit 301. The flow of generating the all-point LUT on the basis of the grid point position information will be described later.

In S403, the all-point LUT generating unit 302 stores the generated all-point LUT in the all-point LUT storage unit 303.

In S404, the thinned LUT generating unit 304 generates a thinned LUT obtained by thinning out the grid points from the all-point LUT stored in the all-point LUT storage unit 303. Specifically, the thinned LUT generating unit 304 assigns the positions (112, 112, 112) or the like of the grid points in the thinned LUT as the input RGB signal values of the all-point LUT. Then, the ink amount (the color material amount) associated with the input RGB signal value in the all-point LUT is set as the ink amount held at the grid point of the thinned LUT. The thinned LUT generating unit 304 may adjust the value of each grid point in the thinned LUT to further suppress an interpolation error with the all-point LUT using an optimization method such as a steepest descent method or a quasi-Newton method. In the present embodiment, the interpolation error is an error between the ink amount being output with reference to the all-point LUT and the ink amount calculated by the interpolation calculation. Due to the interpolation error, the gradation property in the output image is likely to deteriorate.

In S405, the thinned LUT generating unit 304 stores the generated thinned LUT in the thinned LUT storage unit 105. In a case where the thinned LUT is stored (S405), the process of the present flowchart ends.

(All-Point LUT Generation Procedure)

Figure 5B:
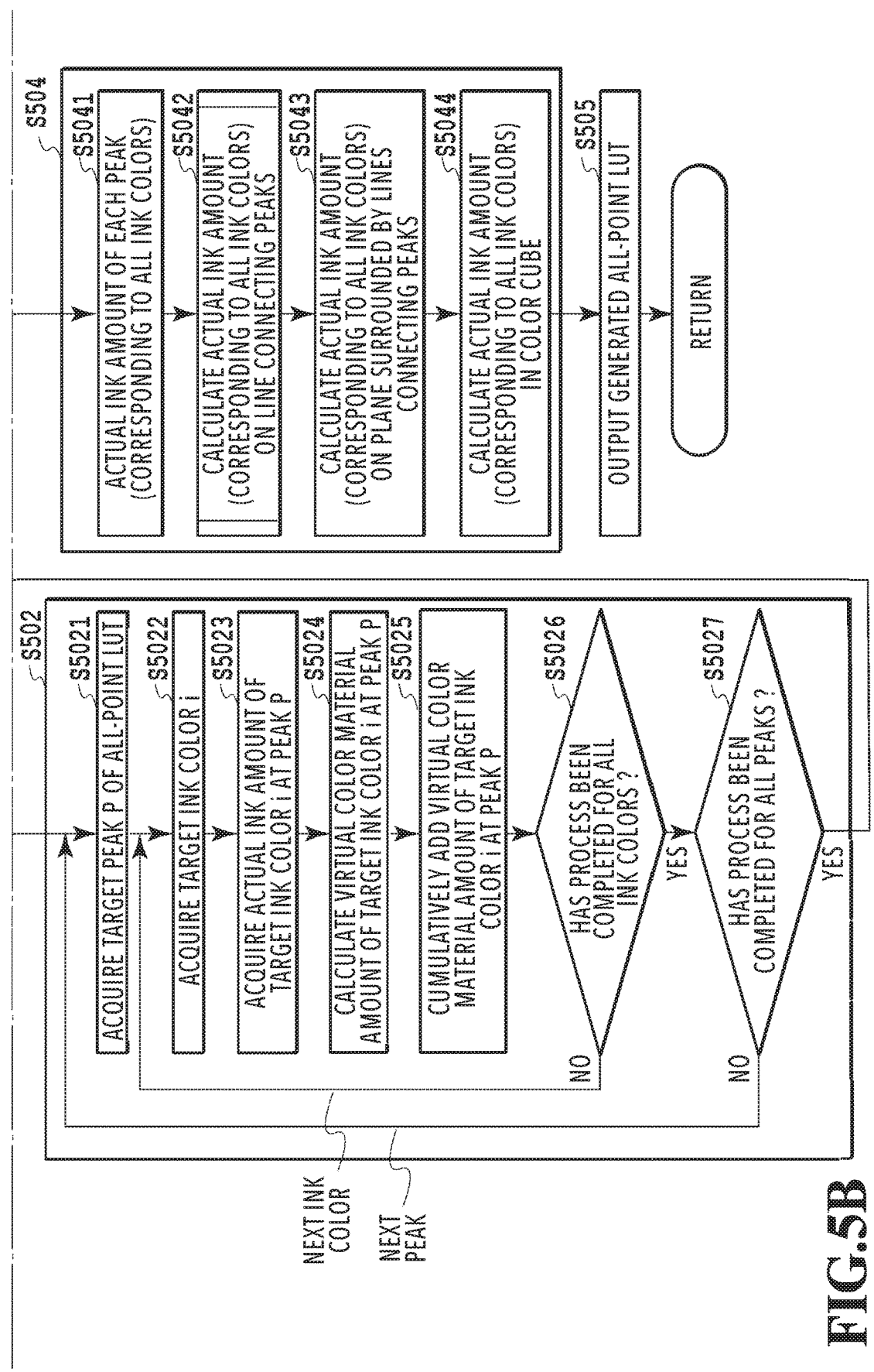
FIG. 5B is a flowchart illustrating an all-point LUT generation procedure in the first embodiment.

FIGS. 5A and 5B are flowcharts illustrating an all-point LUT generation procedure in the present embodiment. In the present embodiment, in the process of generating the all-point LUT, a correspondence relation between an input RGB signal value and a virtual color material amount is first derived, and then a correspondence relation between the input RGB signal value and the ink amounts of C, M, Y, K, and GY is derived on the basis of the virtual color material amount. Here, the "virtual color material" is not an actual ink (hereinafter referred to as an "actual ink" as compared with the virtual color material) installed in the image forming device 200 but a virtual color material with a non-overlapping absorption wavelength band. Further, the "virtual color material amount" refers to an amount of the virtual color material corresponding to the input RGB signal value. In the present embodiment, the amount of the virtual color materials which are smaller in number than actual inks (equal to or larger than at least 3 and less than the number of actual inks) so that a relation between the input RGB signal value and the virtual color material amount is not monotonically increased, and an inflection point does not occur (so that a secondary differentiation is not negative). The color conversion process is performed with the color materials which are smaller in number than the actual inks installed in the printer, and thus discontinuity of the gradation of the entire color conversion process can be reduced.

The flowchart of FIG. 5A is roughly divided into a first half flow of S501 to S503 and a second half flow of S504 and S505. First, in the first half flow, in order to generate the color conversion LUT with less gradation discontinuity, the virtual color material amount having the virtual (non-overlapping) absorption wavelength band other than the actual ink installed in the image forming device 200 is calculated. That is, the first half flow is a flow for calculating the virtual color material amount corresponding to each input image signal value in the all-point LUT. In a case where the first-half flow is applied in the process of generating the all-point LUT, it is possible to generate the virtual color material amount having the high gradation property for the input image signal value.

Then, in the second half flow, the virtual color material amount is converted into an actual ink amount. In other words, each actual ink amount corresponding to each input image signal value of the all-point LUT is calculated. At this time, a plurality of types of actual ink amounts in the all-point LUT are decided so that the inflection points of a plurality of types of actual ink amounts in the all-point LUT coincide with the positions of the grid points of the thinned LUT. In a case where the second half flow is applied, it is possible to generate a thinned LUT with a color conversion characteristic of the all-point LUT while suppressing the occurrence of the interpolation error. Under the above assumption, steps of S501 to S505 will be described in detail. A process in each step is executed by the all-point LUT generating unit 302.

(Virtual Color Material Amount)

Before S501 to S505 are described in detail, the virtual color material amount in the present embodiment will be described. In the present embodiment, the virtual color material is assumed to be color materials of three colors, that is, yellow, magenta, and cyan which are three primary colors of a subtractive color mixing. Here, values obtained by dividing a spectral reflectance Ref(λ) into n wavelength blocks and averaging the spectral reflectances in the respective wavelength blocks are defined as block reflectances Ref1, Ref2, . . . , and Refn. Further, values D1, D2, . . . , and Dn obtained by converting the block reflectances Ref1, Ref2, . . . , and Refn using the following Formula (1) are defined as block densities.

$$D = -\log 10(Ref) \hspace{2cm} \text{Formula (1)}$$

In the present embodiment, the spectral reflectance Ref(λ) is divided into three wavelength blocks corresponding to wavelength bands of light mainly absorbed by the color materials of the three colors. At this time, the block density corresponding to the wavelength band (380 nm to 480 nm) mainly absorbed by the yellow ink is indicated by Dy. Similarly, the block density corresponding to the wavelength band (480 nm to 580 nm) mainly absorbed by the magenta ink is indicated by Dm, and the block density corresponding to the wavelength band (580 nm to 730 nm) mainly absorbed by the cyan ink is indicated by Dc. The virtual color materials having ideal spectral reflectances Refyi(λ), Refmi(λ), and Refci(λ) corresponding to the block densities Dy, Dm, and Dc are defined as yi, mi, and ci. FIGS. 6A to 6C are graphs illustrating the spectral reflectances of the virtual color materials. FIG. 6A illustrates that the virtual color material yi absorbs only light of the wavelength band (380 nm to 480 nm) mainly absorbed by the yellow ink and reflects light of wavelengths other than the wavelength band 100%. FIG. 6B illustrates that the virtual color material mi absorbs only light of the wavelength band (480 nm to 580 nm) mainly absorbed by the magenta ink and reflects light of wavelengths other than the wavelength band 100%. FIG. 6C illustrates that the virtual color material ci absorbs only light of the wavelength band (580 nm to 730 nm) mainly absorbed by the cyan ink and reflects light of wavelengths other than the wavelength band 100%.

Figure 7A:
FIGS. 7A to 7C are graphs illustrating examples of block densities in the first embodiment.
Figure 7B:
Figure 7C:

As described above, the block densities Dy, Dm, and Dc of the virtual color materials yi, mi, and ci are obtained by Formula (1) above. For example, the reflectances of the wavelength bands mainly absorbed by the virtual color materials yi, mi, and ci are assumed to be 10%. At this time, the block density Dy of the virtual color material yi is assumed to be 1.0, Dm is assumed to be 0.0, and Dc is assumed to be 0.0 (see FIG. 7A). Similarly, the block density Dy of the virtual color material mi is assumed to be 0.0, Dm is assumed to be 1.0, and Dc is assumed to be 0.0, and the block density Dy of the virtual color material ci is assumed to be 0.0, Dm is assumed to be 0.0, and Dc is assumed to be 1.0 (see FIGS. 7B and 7C).

Incidentally, it is already known as Lambert's law that the color material amount (thickness) is proportional to an optical density within a range in which light scattering can be ignored. In a case where this rule always holds for the virtual color materials yi, mi, and ci on the printing medium, the block density of each of yi, mi and ci is proportional to the color material amount per unit area on the printing medium. In other words, it is possible to perform mutual linear conversion of arbitrary block densities Dy, Dm, and Dc and the virtual color material amounts Vyi, Vmi, and Vci [%] in accordance with the following Formulas (2-1) to (2-3).

$$Vyi = Ky \times Dy \times 100 \hspace{2cm} \text{Formula (2-1)}$$

$$Vmi = Km \times Dm \times 100 \hspace{2cm} \text{Formula (2-2)}$$

$$Vci = Kc \times Dc \times 100 \hspace{2cm} \text{Formula (2-3)}$$

Further, the virtual color material amount Vyi [%] means that the yellow ink (the virtual color material: yi) is ejected onto a corresponding pixel to form an ink dot at a probability of Vyi % on average. The virtual color material amount Vmi

[%] means that the magenta ink (the virtual color material: mi) is ejected onto a corresponding pixel to form an ink dot at a probability of Vmi % on average. The virtual color material amount Vci [%] means that the cyan ink (the virtual color material: ci) is ejected onto a corresponding pixel to form an ink dot at a probability of Vci % on average. Ky in Formula (2-1) above is a proportional constant related to the yellow density of the virtual color material yi, and as the value of Ky increases, the yellow density per unit amount increases. Similarly, Km in Formula (2-2) above is a proportional constant related to the magenta density of the virtual color material mi, and Kc in Formula (2-3) above is a proportional constant related to the cyan density of the virtual color material ci.

According to the above description, the arbitrary spectral reflectances Ref(λ) can be converted into the block densities Dy, Dm, and Dc through Formula (1) after the block reflectances are obtained. Further, the block densities can be uniquely converted into the virtual color material amounts Vyi, Vmi, and Vci [%] from the block densities through Formulas (2-1) to (2-3). In the present embodiment, the actual ink amount is calculated so that the virtual color material amounts Vyi, Vmi, and Vci change smoothly with respect to the input image signal (the input image signals of the three channels of RGB in the present embodiment). The spectral reflectance of the virtual color material is not limited to the example described above, and for example, the wavelength band in which the virtual color material has the density may be narrowed, and the wavelength band may be defined to have the density in only some wavelength bands (for example, the virtual color material yi absorbs only 400 to 460 nm). Conversely, the wavelength band may be expanded, and the wavelength band may be defined so that two or more virtual color materials have the density with respect to the same wavelength.

In the above example, the reflectance Ref of each virtual color material is defined to be 10% in the wavelength band in which the reflectance Ref is mainly absorbed and 100% in other wavelength bands, and the block density is set to 0.0 or 1.0. However, the reflectance and the block density of the virtual color material are not limited to the above example, and other values may be used. Of course, different reflectances may be applied to the virtual color materials yi, mi, and ci.

Further, the number of virtual color materials is not limited to three but is preferably three or more and less than the number of inks installed in the image forming device 200. In a case where inks of five colors are installed in the image forming device 200 as in the present embodiment, for example, block densities in which the wavelength range (for example, 380 to 730 nm) reproduced by the actual ink is equally divided into four may be defined, and virtual color materials corresponding thereto may be defined. Further, the width of the wavelength band may be narrower than 380 to 730 nm, or a broader wavelength band including other wavelength band may be used.

(Details of S501)

First, in S501, the virtual color material amounts per unit ejection amount of the ink colors of C, M, Y, K, and GY are calculated.

In S5011, single color patches of the inks of C, M, Y, K, and GY installed in the image forming device 200 are output, and the spectral reflectance Ref(λ) is measured. Specifically, first, the image forming device 200 outputs print data whose ejection amount is R [%]. Then, the spectral reflectance Refp(λ) of a printed portion of the output printed material and the spectral reflectance Ref0(λ) of a blank portion are measured using a spectrocolorimeter or the like. Further, the spectral reflectance of each ink is calculated by the following Formula (3).

$$Ref(\lambda) = Refp(\lambda)/Ref0(\lambda) \qquad \text{Formula (3)}$$

Here, in a case where the ink ejection amount R is 25%, a single color patch as a measurement target of the spectral reflectance Ref(λ) is a patch in which a pixel in which a dot is printed occupies 25% per unit area in the binary image data generated by the halftone processing unit 108. The ink ejection amount is not limited to R=25%, and it is preferable to set a halftone ejection amount (for example, in a range of 5% to 50%) from the bright portion in which the spectral reflectance Ref(λ) is likely to change linearly.

In S5012, an ink color i to be converted into the virtual color material amount is acquired. "i" is a number designating the target ink color, and in the present embodiment, the ink colors of GY, C, M, Y, and K are assigned to 0 to 4, respectively. An ink color of an initial i=0 is a gray (GY) ink.

In S5013, the spectral reflectance Ref(λ) of the target ink color is converted into the block density D. Specifically, the spectral reflectance R(λ) measured in S5011 is divided into three wavelength blocks, and the block reflectances Ry, Rm, and Rc which are values obtained by averaging the spectral reflectances in the respective blocks are converted into the block densities Dy, Dm, and Dc. As described in FIGS. 6A to 6C, the three wavelength blocks in the present embodiment are divided into three wavelength bands (380 nm to 480 nm, 480 nm to 580 nm, and 580 nm to 730 nm) mainly absorbed by the yellow ink, the magenta ink, and the cyan ink. The conversion from the block reflectances Ry, Rm, and Rc into the block densities Dy, Dm, and Dc can be calculated in accordance with the following Formulas (1-1) to (1-3).

$$Dy = -\log 10(Ry) \qquad \text{Formula (1-1)}$$

$$Dm = -\log 10(Rm) \qquad \text{Formula (1-2)}$$

$$Dc = -\log 10(Rc) \qquad \text{Formula (1-3)}$$

Figures 8A, 8B, 8C:
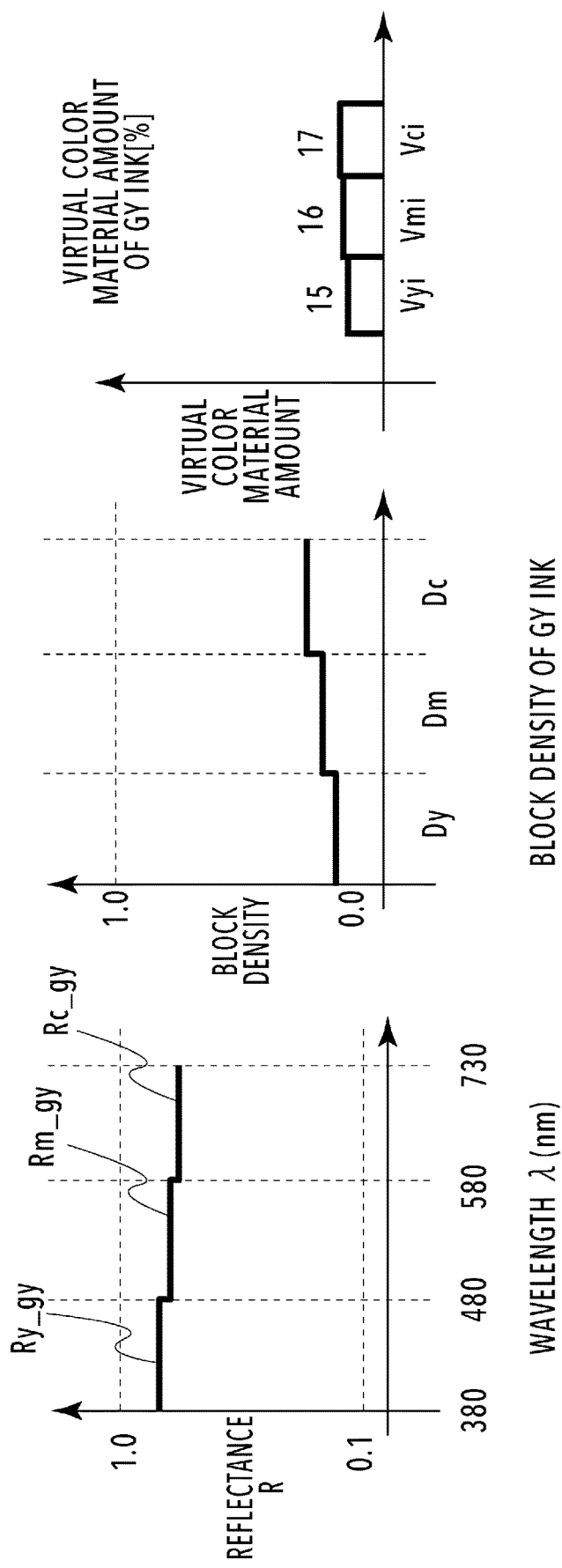
FIGS. 8A to 8C are diagrams for describing a reduction process to a virtual color material amount in the first embodiment.

FIG. 8A is a graph schematically illustrating block reflectances Ry_gy, Rm_gy, and Rc_gy obtained as a result of measuring a single color patch of the gray ink (S5011) in a case where the target ink color is the gray (GY). FIG. 8B is a graph schematically illustrating the block densities Dy, Dm, and Dc obtained as a result of carrying out calculations of Formulas (1-1) to (1-3) on the block reflectances Ry_gy, Rm_gy, and Rc_gy of FIG. 8A.

In S5014, the block densities Dy, Dm, and Dc are converted into the virtual color material amounts Vyi, Vmi, and Vci. According to Lambert's law, since the block densities Dy, Dm, and Dc and the virtual color materials yi, mi, and ci can be linearly converted into each other, the virtual color material amounts Vyi, Vmi, and Vci can be calculated by Formulas (2-1) to (2-3).

$$Vyi = Ky \times Dy \times 100 \qquad \text{Formula (2-1)}$$

$$Vmi = Km \times Dm \times 100 \qquad \text{Formula (2-2)}$$

$$Vci = Kc \times Dc \times 100 \qquad \text{Formula (2-3)}$$

Ky, Km, and Kc are proportional constants related to the densities of virtual color materials yi, mi, and ci. An example of the virtual color material amounts Vyi, Vmi, and Vci [%] calculated for the gray ink is illustrated in FIG. 8C.

In S5015, the virtual color material amounts Vyi, Vmi, and Vci obtained in S5014 are reduced to virtual color material amounts Vyi', Vmi', and Vci' per unit ejection amount. The reduction to the virtual color material amounts Vyi', Vmi', and Vci' is obtained by dividing the virtual color material amounts Vyi, Vmi, and Vci by the ejection amount R [%] of the ink for patch output (25% in the present embodiment). Specifically, the virtual color material amounts Vyi', Vmi', and Vci' per unit ejection amount can be calculated in accordance with the following Formulas (3-1) to (3-3).

$$Vyi'=Vyi/R \quad \text{Formula (3-1)}$$

$$Vmi'=Vmi/R \quad \text{Formula (3-2)}$$

$$Vci'=Vci/R \quad \text{Formula (3-3)}$$

In S5016, it is determined whether or not S5012 to S5015 have been completed for all the ink colors. In a case where the process has been completed for all ink colors (S5016: YES), the process proceeds to S502. In a case where the process has not been completed for all the ink colors (S5016: NO), the process returns to S5012 to acquire a next target ink color i. In the present embodiment, the ink color i is set in the order of GY, C, M, Y, and K but may be set in a different order. An example of the virtual color material amounts Vyi, Vmi, and Vci at the stage at which S501 is completed is illustrated in FIGS. 9A to 9E.

(Details of S502)

Figure 10:
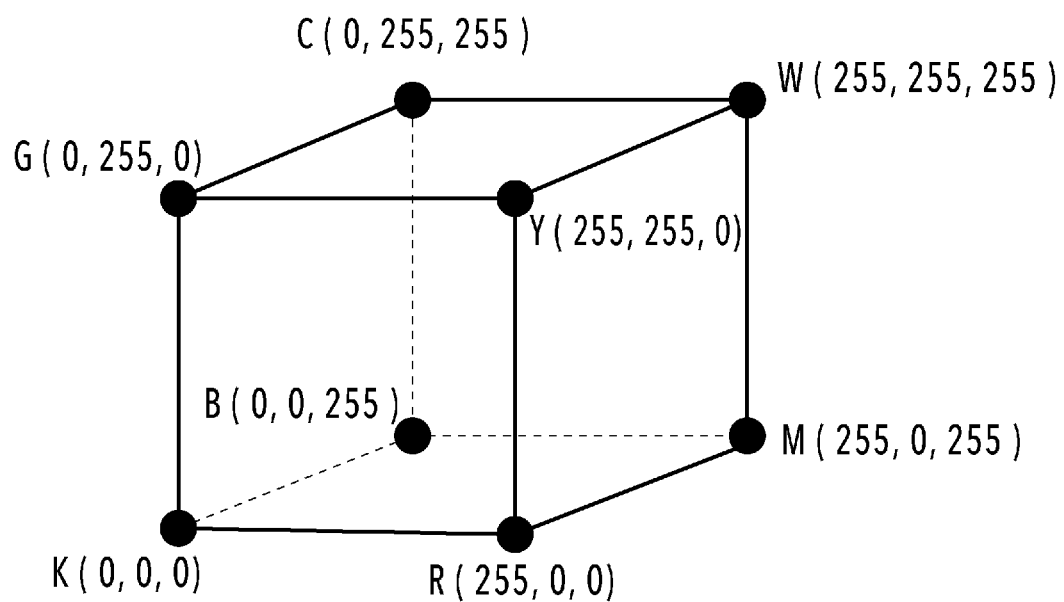
FIG. 10 is a diagram illustrating a color cube in the first embodiment.

In S502, the virtual color material amount is calculated at the eight peaks of the all-point LUT. Here, the peaks at which the virtual color material amount is calculated correspond to input image signal values positioned at eight corners of a color cube in a color cube of a color space in which three components of the input image signal are indicated by the R axis, the G axis, and the B axis, and these are also called primary colors. Specifically, each of the R value, the G value, and the B value of the input image signal is a value of either 0 or 255, and the number of input image signal values positioned at the eight corners of the color cube is a total of 8. FIG. 10 is a diagram illustrating an example of a color cube in the present embodiment. The R value, the G value, and the B value at the peaks are indicated by K(0,0,0), B(0,0,255), G(0,255,0), C(0,255,255), R(255,0,0), M(255,0,255), Y(255,255,0), and W(255,255,255).

In the present embodiment, the actual ink amounts corresponding to the R value, the G value, and the B value at the eight peaks of the all-point LUT are given in advance by an LUT designer. Then, the all-point LUT generating unit 302 calculates the virtual color material amount at the eight peaks of the all-point LUT on the basis of the virtual color material amount per unit ejection amount calculated in S5015 and the actual ink amount at each peak.

In S5021, a target peak P at which the virtual color material amount is calculated is acquired. P is a number identifying the eight peaks, and in the present embodiment, numbers 0 to 7 are assigned in order to the eight peaks of K, B, C, R, M, Y, and W, but a different order may be used. A target peak of an initial P=0 is K (0, 0, 0).

In S5022, the target ink color i at which the virtual color material amount is calculated is acquired. A definition of i is similar to S5012, and the ink color of the initial i=0 is assumed to be a gray ink.

In S5023, an actual ink amount of the ink color i at the peak P is acquired. In the present embodiment, the actual ink amount acquired in S5023 is indicated by 0 to 100[%] for each ink color and held in a predetermined storage region in advance in a table format. Alternatively, the actual ink amount corresponding to the target peak P may be acquired with reference to the actual thinned LUT stored in the thinned LUT storage unit 105. In the present embodiment, the actual ink amount of the ink color i at the peak P is indicated by Q(P, i) [%].

In S5024, the virtual color material amount of the ink color i at the peak P is calculated. Specifically, the virtual color material amount V(P, i) of the ink color i at the peak P can be calculated in accordance with the following Formulas (4-1) to (4-3).

$$Vyi(P,i)=Vyi'(P,i)*R*Q(P,i) \quad \text{Formula (4-1)}$$

$$Vmi(P,i)=Vmi'(P,i)*R*Q(P,i) \quad \text{Formula (4-2)}$$

$$Vci(P,i)=Vci'(P,i)*R*Q(P,i) \quad \text{Formula (4-3)}$$

As a specific example, an example of calculating the virtual color material amount at a peak C in a case where the target peak P is C, and the ink color i is the cyan ink will be described. As described above, the actual ink amount corresponding to the R value, the G value, the B value at the peak of the color cube is given in advance by the LUT designer. In this example, (GY, C, M, Y, K)=(0, 100, 0, 0, 0) [%] is given as the actual ink amount corresponding to the peak C (R value, G value, B value)=(0, 255, 255).

Figures 9A, 9B, 9C, 9D, 9E:
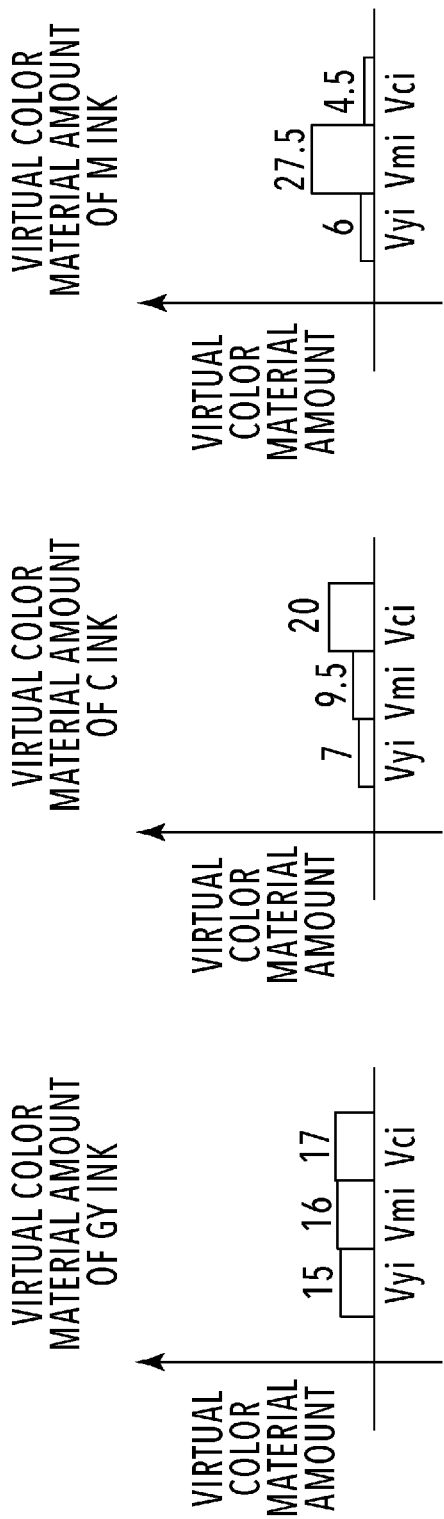
FIGS. 9A to 9E are diagrams illustrating an example of the virtual color material amount in the first embodiment.

The virtual color material amount of the cyan ink is illustrated in FIG. 9B. The actual ink amount of the cyan ink at the peak C is 100%. In this case, the ideal color material amount at the peak C is calculated as follows.

$$Vyi(C,C)=(7/25)*100=28$$

$$Vmi(C,C)=(9.5/25)*100=38$$

$$Vci(C,C)=(20/25)*100=80$$

In S5025, the virtual color material amounts Vyi(P, i), Vmi(P, i), and Vci(P, i) calculated in S5024 are accumulatively added to cumulative virtual color material amounts Vyi_ALL(p), Vmi_ALL(p), and Vci_ALL(p), respectively. The cumulative virtual color material amounts Vyi_ALL(p), Vmi_ALL(p) and Vci_ALL(p) are initialized to 0 before a virtual color material amount of a first target ink color is added.

In S5026, it is determined whether or not the process of S5022 to S5025 has been completed for all the ink colors. In a case where the process has been completed for all the ink colors (S5026: YES), the flow shifts to S5027. In a case where the process has not been completed for all the ink colors (S5026: NO), the process returns to S5022, and a next target ink color i is acquired.

In S5027, it is determined whether or not the process of S5021 to S5026 has been completed for all the peaks. In a case where the process has been completed for all the peaks (S5027: YES), the process proceeds to S503. In a case where the process has not been completed for all the peaks (S5027: NO), the process returns to S5021, and a next target peak P is acquired. In a case where the determination process of S5027 ends, the process of S502 ends.

(Details of S503)

In S503, the virtual color material amounts corresponding to all the input image signal values in the all-point LUT are calculated. In the present embodiment, all the input image signal values refer to a combination of input RGB signal values of 256×256×256 points (about 16,780,000 colors) in a case where the R value, the G value, and the B value in the input image signal correspond to 8-bit signal values of 0 to 255. In the present embodiment, the virtual color material amount is calculated for each axis of RGB, and the virtual color material amount between the respective axes is obtained by the interpolation process, and thus the virtual color material amount corresponding to the total input image signal value is obtained. Hereinafter, detailed description will proceed with reference to S5031 to S5034.

In S5031, the cumulative virtual color material amounts Vyi_ALL(p), Vmi_ALL(p), Vci_ALL(p) of each peak calculated in S502 are acquired. In order to simplify the following description, the cumulative virtual color material amounts Vyi_ALL(p), Vmi_ALL(p), and Vci_ALL(p) are referred to simply as "virtual color material amounts" and are indicated by Vyi(p), Vmi(p), and Vci(p), respectively.

In S5032, the virtual color material amount on a line connecting the peaks is calculated. At this time, the virtual color material amount of an arbitrary point p positioned on the line connecting the peaks is decided so that the change of the virtual color material amount becomes smooth. For example, a function which passes through a predetermined point on the line connecting the peaks and does not have a monotonic increase and an inflection point may be defined, and the virtual color material amount of an arbitrary point p may be decided with reference to the defined function. Alternatively, the virtual color material amount of an arbitrary point p may be decided so that the monotonic increase and the inflection point do not occur through a known technique such as the linear interpolation.

In the present embodiment, an example of calculating the virtual color material amount on the line connecting a peak W (255, 255, 255) with a peak C (0, 255, 255) in the color cube will be described. The virtual color material amounts Vyi(p), Vmi(p), and Vci(p) of the point p positioned on the line connecting the peak W and the peak C are calculated by Formulas (5-1) to (5-3) in accordance with the linear interpolation formulas indicated by Formulas (5-1) to (5-3).

$$Vyi(p)=Vyi(W)+(Vyi(C)-Vyi(W))*x/L \quad \text{Formula (5-1)}$$

$$Vmi(p)=Vmi(W)+(Vmi(C)-Vmi(W))*x/L \quad \text{Formula (5-2)}$$

$$Vci(p)=Vci(W)+(Vci(C)-Vci(W))*x/L \quad \text{Formula (5-3)}$$

At this time, the cumulative virtual color material amounts of the peak W are Vyi(W), Vmi(W), and Vci(W), and the cumulative virtual color material amounts of the peak C are Vyi(C), Vmi(C), and Vci(C). Further, L indicates a distance on the RGB color space between the peak W and the peak C, and x indicates a distance on the RGB color space from the peak W to the point p. A line connecting the other peaks is also calculated in accordance with Formulas (5-1) to (5-3).

In S5033, the virtual color material amount on a plane surrounded by the lines connecting the peaks in the RGB cube is calculated. For example, the virtual color material amount on the plane partitioned by a W-K line connecting the peak W with the peak K and one of the other peaks R, B, C, M, and Y is calculated by a technique similar to that in S5032. In other words, in a case where the W-K line connecting the peak W with the peak K is taken as a reference, the virtual color material amounts on six planes including one of the W-K line and one of the other peaks is decided.

Figure 11:
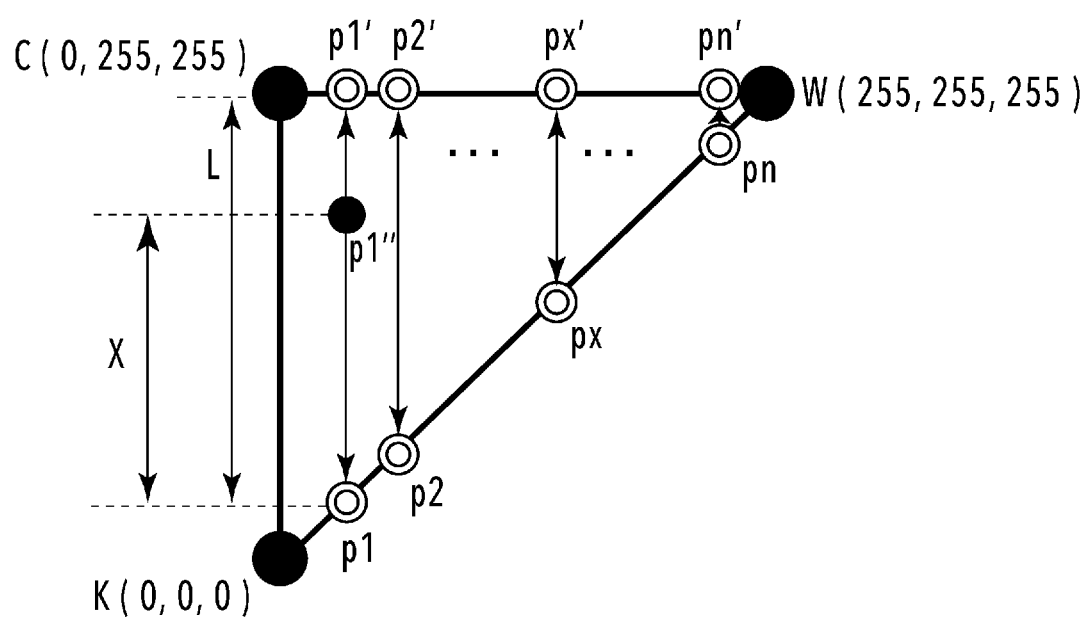
FIG. 11 is a diagram schematically illustrating a process of calculating an ideal color material amount (an actual ink amount) in an all-point LUT in the first embodiment.

FIG. 11 is a diagram schematically illustrating the process of calculating the virtual color material amount on a lane of the peaks W, K, and C. First, the virtual color material amount at a point px on the W-K line and the virtual color material amount at an intersection px' between a perpendicular line drawn from the point px to a C-W line and the C-W line are acquired, respectively. Then, the virtual color material amount on a line connecting px with px' is sequentially decided from the acquired virtual color material amount through a higher order function or a known interpolation process such as the linear interpolation. For example, in a case where a virtual color material amount Vyi(p1") at a point p1" on the line connecting p1 with p1' is calculated through the linear interpolation, it can be calculated by an operation indicated by Vyi(p1")=Vyi(p1)+(Vyi(p1')−Vyi(p1))×x/L. Here, Vyi(p1) indicates an amount of the virtual color material yi at the point p1, and Vyi(p1') indicates an amount of the virtual color material yi at point p1'. L indicates a distance on the RGB color space between the point p1 and the point p1', and "x" indicates a distance on the RGB color space between the point p1 and the point p".

In S5034, the virtual color material amount in the color cube is calculated. In the present embodiment, the color cube of FIG. 10 is divided into a plurality of tetrahedrons, and an internal virtual color material amount is calculated for each divided tetrahedron. More specifically, as illustrated in FIGS. 12A to 12F, the color cube of FIG. 10 is divided into six tetrahedrons including the K-W line. Then, the internal virtual color material amount is calculated for each of the six divided tetrahedrons. Since the virtual color material amounts of two planes including W-K among four planes constituting each tetrahedron have already been calculated in S5033, the calculation is unnecessary in this step.

In the present embodiment, in order to obtain the virtual color material amount in the tetrahedron, planes in which the calculation of the internal virtual color material amount is completed are first connected by a line parallel to any one of the R, and B axes. Then, the virtual color material amount in the tetrahedron is calculated by sequentially calculating the virtual color material amount for each connected line on the basis of a higher order function or a known interpolation process such as the linear interpolation. A specific example will be described below with reference to FIG. 12A. In FIG. 12A, in the tetrahedron W-C-K-B surrounded by the plane W-C-K, the plane W-B-K, the plane W-C-B, and the plane C-B-K, the virtual color material amounts in the plane W-C-K and the plane W-B-K have already been calculated in S5033. At this time, in order to calculate a virtual color material amount V(q1") of a point q1" in the tetrahedron WCKB, first, a virtual color material amount V(q1) at an intersection point q1 of a line parallel to the G axis passing through the point q1" and the plane WCK is acquired. Similarly, a virtual color material amount V(q1') at an intersection point q1' between a line parallel to the G axis passing through the point q1" and the plane W-B-K is acquired. Then, the virtual color material amount V(q1") of the point q1" is calculated from the acquired virtual color material amounts V(q1) and V(q1') through a higher order function or a known interpolation process such as the higher order function or the linear interpolation process. For example, in a case where the virtual color material amount V(q1") of the point q1" is calculated through the linear interpolation, it can be calculated by an operation indicated by V(q1")=V(q1)+(V(q1')−V(q1))×x/L. Here, L indicates a distance on the RGB color space between the point q1 and the point q1', and x indicates a distance on the RGB color space between the points q1 and q1". In the description of the calculation of the virtual color material amount in the tetrahedron, reference numerals related to the three virtual color materials of the virtual color material amount is omitted for the sake of simplification of description. For the other tetrahedrons than the tetrahedron W-C-K-B, the virtual color material amount in the tetrahedron can be calculated through a similar technique. In a case where the computation of the virtual color material amount in the color cube ends, the process proceeds to S504.

(Details of S504)

In S504, the actual ink amounts of all the ink colors corresponding to all the input image signals of the all-point LUT are calculated on the basis of the grid point position information of the thinned LUT. Hereinafter, detail description will proceed with reference to S5041 to S5044.

In S5041, the actual ink amount of each peak (corresponding to all the ink colors) in the all-point LUT is acquired. The actual ink amount of each peak is equal to the ink amount acquired in S5023, and in S5041, the actual ink amounts of all the ink colors at the eight peaks in the all-point LUT are acquired again.

In S5042, the actual ink amount (corresponding to all the ink colors) on the line connecting the peaks is calculated. A process of S5042 is performed in accordance with the flowcharts of FIGS. 13A and 13B. Hereinafter, the process of S5042 will be described with reference to the flowcharts of FIGS. 13A and 13B.

In S1301, a target line for calculating the actual ink amount is selected. In this example, a first target line is the W-K line.

In S1302, a total ink amount limit value is acquired. The total ink amount limit value is a value given in advance by the LUT designer, and for example, a plurality of patches having different ink amounts are output from the image forming device 200, and a total amount limit value is decided on the basis of the ink amount which can be sufficiently absorbed by the printing medium. Alternatively, a table or a calculation formula in which information related to an ink reduction amount, a printing speed, the number of printing passes is described may be generated in advance for each printing medium, and the total ink amount limit value may be decided on the basis of the table or the calculation formula. In other words, the total ink amount limit value is a maximum ink amount that can be ejected onto the printing medium 207.

In S1303, for each ink installed in the image forming device 200, information indicating a conversion priority order in the target line is acquired. For example, the conversion priority order is set to increase as the density of the ink decreases. In the present embodiment, for example, the order of GY, C, M, Y, and K is set as the conversion priority order of the ink color in the W-K line.

In S1304, the target ink color is selected in accordance with the conversion priority order of the actual ink acquired in S1303. In this example, GY is selected as the first target ink.

In S1305, a target processing point is selected. In this case, (R, G, B)=(254, 254, 254) adjacent to the point of the peak W on the W-K line is selected as the initial target processing point. At this time, the virtual color material amounts Vyi, Vmi, and Vci calculated in S503 are also acquired. The virtual color material amounts Vyi, Vmi, and Vci are used as virtual color material amounts of a conversion source in S1306 to be described later.

In S1306, the actual ink amount of the target ink color at the target processing point is decided. The process of S1306 will be described in detail later.

In S1307, it is determined whether or not the total ink amount of all the ink colors at the target processing point is equal to or less than the total ink amount limit value acquired in S1302. In a case where the total ink amount of all the ink colors at the target processing point is equal to or less than the total ink amount limit value (S1307: YES), the process proceeds to S1309. In a case where the total ink amount of all the ink colors at the target processing point is larger than the total ink amount limit value (S1307: NO), the process proceeds to S1308.

In S1308, an ink replacement process is performed. Specifically, an ink having a higher conversion priority order is converted into an ink having a lower priority order which exhibits substantially the same hue so that the total ink amount is equal to the total ink amount limit value. The process of S1308 will be described in detail later.

In S1309, the ideal color material amount at the target processing point is updated. The process of S1309 will be described in detail later.

In S1310, it is determined whether or not the actual ink amount has been decided for all the processing points on the target line. In a case where the actual ink amount has been decided (S1310: YES), the process proceeds to S1311. In a case where the actual ink amount has not been decided (S1310: NO), the process returns to S1305, and a next target processing point is selected.

The process of deciding the actual ink amount in S1306 will be described in detail with reference to a specific example illustrated in FIGS. 14 to 20D. In the following description, a case in which a target processing point (R, G, B)=(177, 129, 105) is selected in S1305, and the virtual color material amounts Vyi=84.8[%], Vmi=65.1[%], and Vci=34.9[%] are acquired will be described as an example. Strictly speaking, the target processing point (R, G, B)=(177, 129, 105) is not present on the line connecting the peaks, but as it is described as an example to facilitate understanding of the procedure of deciding the actual ink amount. Therefore, the process of deciding the actual ink amount to be described below can be similarly applied even in a case where the target processing point is present on the line.

Figure 14:
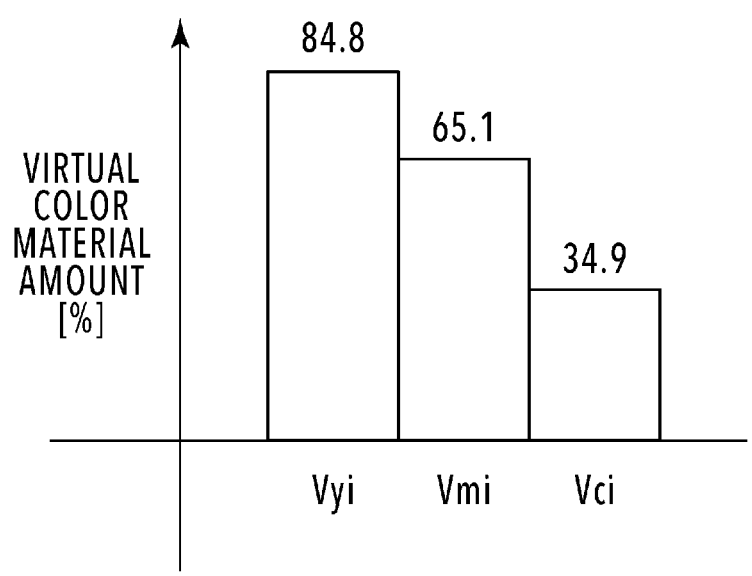
FIG. 14 is a schematic diagram illustrating a specific example of an ideal color material amount in the first embodiment.

FIG. 14 is a diagram schematically illustrating the virtual color material amounts Vyi=84.8[%], Vmi=65.1[%], Vci=34.9[%] serving as the conversion source in this example. First, prior to the decision of the actual ink amount, the gray ink is selected as the target ink color in accordance with the conversion priority order (S1304).

FIG. 15A illustrates the virtual color material amounts of the conversion source acquired in S1305, that is, Vyi=84.8 [%], Vmi=65.1[%], and Vci=34.9[%] as illustrated in FIG. 14. Further, FIG. 15B-1 illustrates the virtual color material amounts Vyi, Vmi, and Vci by the gray ink in a case where the virtual color material amount Vyi is caused to coincide with the virtual color material amount of the gray ink illustrated in FIG. 9A. At this time, an ink amount Wgy_y for causing the virtual color material amount Vyi to coincide is illustrated in FIG. 15B-2. In other words, the actual ink amount Wgy_y calculated by $$Wgy\_y=R/Vyi\_gy*Vyi=25/15*84.8=141.3[\%]$$

so that it coincides with the virtual color material amount Vyi illustrated in FIG. 15A is illustrated in FIG. 15B-2. At this time, in a case where the virtual color material amount is multiplied by "1.67" calculated using R/Vyi_gy=25/15=1.67, Vyi=84.8%, Vmi=90.4%, and Vci=96.1[%] are obtained as illustrated in FIG. 15B-1. Similarly, in a case where the virtual color material amount Vmi is caused to coincide, the virtual color material amount is illustrated in FIG. 15C-1, and the ink amount Wgy_m is illustrated in FIG. 15C-2. In a case where the virtual color material amount Vci is caused to coincide, the virtual color material amount is illustrated in FIG. 15D-1, and the ink amount Wgy_c is illustrated in FIG. 15D-2. Here, the actual ink amount of the gray ink is indicated by Wgy, and minimum values of Wgy_y, Wgy_m, Wgy_c are assumed to be used. In this case, since Wgy_y=141.3[%]>Wgy_m=101.7[%]>Wgy_c=51.3[%], Wgy=Wgy_c=51.3[%].

Then, the ink amount Wgy of the gray ink and the total ink amount limit value Max_W are compared (S1307), and the ink replacement process is further performed if necessary (S1308). Thereafter, the virtual color material amount is updated (S1309), and in a case where the process is not completed for all the ink colors (S1317: NO), the process using the next ink as the target ink is repeated. Changes in the "virtual color material amount of the conversion source," the "virtual color material amount by the target ink," the "ink amount of each ink," the "total ink amount" in the loop process of S1304 to S1317 will be described with reference to FIGS. 16A to 20D.

FIG. 16A to FIG. 16D illustrate the "virtual color material amount of the conversion source," the "virtual color material amount by the target ink," the "ink amount of each ink," and "total ink amount" in a first loop, respectively. As described above, in the first loop, the gray ink is selected as the target ink (S1304). The ink amount Wgy of the gray ink is Wgy_c=51.3[%] which is the minimum value among Wgy_y, Wgy_m and Wgy_c. Therefore, the ink amount Wgy of the gray ink=51.3 [%] is decided as illustrated in FIG. 16C. At this stage, since the ink amounts of the other inks are 0, the total ink amount=Wgy is 51.3[%] (see FIG. 16D). Since the total ink amount the total amount limit value Max_W (=100[%]) (S1307: YES), the replacement process is not performed in the first loop. Then, in S1309, a process of updating the virtual color material amount is performed. In other words, the virtual color material amount is updated to a value obtained by subtracting the virtual color material amount by the target ink (Vyi=30.8[%], Vmi=32.8[%], Vci=34.9[%]) from Vyi=84.8[%], Vmi=65.1[%], and Vci=34.9[%] illustrated in FIG. 16A. In the first loop, since there is an unprocessed ink (S1317: NO), the flow returns to S1304, and a next target ink color is selected.

FIGS. 17A to 17D illustrate the "virtual color material amount of the conversion source," the "virtual color material amount by the target ink," the "ink amount of each ink," and the "total ink amount" in a second loop, respectively. In the second loop, the cyan ink is selected as the target ink (S1304). Here, the ink amount Wc_c that satisfies the virtual color material amount Vci corresponding to the maximum value Vci_c of the virtual color material amount of cyan ink is set as the ink amount Wc of cyan ink. Here, as illustrated in FIG. 17A, since the virtual color material amount Vci of the conversion source is Vci=0, Wc=0, and all the virtual color material amounts by the target ink are also 0 (see FIG. 17B). Then, since Wc=0, the total ink amount (=Wgy+Wc) does not change from 51.3[%] (see FIG. 17C). Therefore, the total ink amount≤the total amount limit value Max_W (=100[%]) (S1307: YES), and the ink replacement process is not performed in the second loop. Then, in S1309, the process of updating the virtual color material amount is performed, but since all the virtual color material amounts by the target ink are 0 at this point, it is maintained in substantially the same state as FIG. 17A (see FIG. 18A). Since there is an unprocessed ink even in the second loop (S1317: NO), the process returns to S1304, and a next target ink color is selected.

FIG. 18A to FIG. 18D illustrate the "virtual color material amount of the conversion source," the "virtual color material amount by the target ink," the "ink amount of each ink," and the "total ink amount" in a third loop, respectively. In the third loop, the magenta ink is selected as the target ink. Here, similarly to the cyan ink, the ink amount Wm_m that satisfies the virtual color material amount Vmi corresponding to the maximum value Vmi_m of the virtual color material reduction amount is assumed to be the ink amount Wm of the magenta ink. Now, the ink amount Wm is 29.3[%] (see FIG. 18C). As a result, the cumulative ink amount (=Wgy+Wc+Wm) is 80.6[%] as illustrated in FIG. 18D. Even at this stage, since the cumulative ink amount the total amount limit value Max_W (=100[%]), the replacement process is not performed in the third loop. Then, in S1309, the process of updating the virtual color material amount is performed. In the update process, the virtual color material amount is updated to a value obtained by subtracting the virtual color material amount by the target ink (Vyi=7.04[%], Vmi=32.3[%], and Vci=5.28[%]) from Vyi=54.0 [%], Vmi=32.3[%], and Vci=0[%]) illustrated in FIG. 18A. Here, in a case where the updated virtual color material amount Vci is original, it is a negative value, but the negative value uniformly becomes 0. FIG. 19A illustrates the updated virtual color material amounts of the conversion source, that is, Vyi=47.0[%], Vmi=0[%], and Vci=0[%]. Since there is unprocessed ink even in the third loop (S1317: NO), the process returns to S1304, and a next target ink color is selected.

FIGS. 19A, 19B, 19C-1, 19D-1, 19C-2 and 19D-2 illustrate the "virtual color material amount of the conversion source," the "virtual color material amount by a target ink," the "ink amount of each ink," the "total ink amount" in a fourth loop, respectively. In the fourth loop, the yellow ink is selected as the target ink. Similarly to the cyan ink and the magenta ink, the ink amount Wy_y that satisfies the virtual color material amount Vyi corresponding to the maximum value Vyi_y of the virtual color material reduction amount is assumed to be the ink amount Wy of the yellow ink. Now, the ink amount Wy is 33.5[%] (see FIG. 19C). As a result, the total ink amount (=Wgy+Wc+Wm+Wy) is 114.2[%] as illustrated in FIG. 19D-1. In this stage, the total ink amount>the total amount limit value Max_W (=100[%]) (S1307: NO), and the ink replacement process is performed (S1308). In other words, the process of replacing the gray ink having the highest priority order with the black ink having the same hue and the low priority order is performed. Here, referring to FIG. 9A and FIG. 9E, a replacement ratio between the gray ink and the black ink is a comparison ratio $\gamma = V\_k/V\_gy = (53+55.5+58.5)/(15+16+17) = 3.48$.

Therefore, an ink amount Wgy' of the gray after the replacement process is 31.4 [%] (=51.3−(114.2−100)×3.48/(3.48−1)). Further, the ink amount Wk' of the black after the replacement process is 5.72[%] (=0+(114.2−100)/(3.48−1)).

FIGS. 19C-2 and 19D-2 illustrate the ink amount of each ink and the total ink amount after the replacement process which are obtained accordingly. It can be seen that the total ink amount has been changed from the sum Sum_W (=114.2 [%]) to [100 [%] which is the total ink amount limit. In S1309, the process of updating the virtual color material amount is performed. In the update process, the virtual color material amount is updated to a value obtained by subtracting the virtual color material amount by the target ink (Vyi=47.0[%], Vmi=3.35[%], and Vci=1.34[%]) from the Vyi=47.0[%], Vmi=0[%], and Vci=0[%] illustrated in FIG. 19A. Here, in a case where the updated virtual color material amount Vmi and Vci is original, it is a negative value, and the negative value uniformly becomes 0. FIG. 20A illustrates the updated virtual color material amounts of the conversion source, that is, Vyi=0[%], Vmi=0[%], and Vci=0

[%]. Since there is unprocessed ink even in the fourth loop (S1317: NO), the process returns to S1304, and a next target ink color is selected.

FIGS. 20A to 20D illustrate the "virtual color material amount of the conversion source," the "virtual color material amount by a target ink," the "ink amount of each ink," the "total ink amount" in a final loop, respectively. In the final loop, the black ink is selected. The minimum value among Wk_y, Wk_m, Wk_c is used as the ink amount Wk of the black ink, similarly to the gray ink. Here, since the value of the virtual color material amount of the conversion source at this point is 0, Wk=0 as illustrated in FIG. 20A. Incidentally, for the black ink, the ink amount Wk' (=5.72 [%]) has already been given by the replacement process in the fourth loop. Therefore, a value obtained by adding a value of Wk obtained in this loop to an already given value becomes a value of the final ink amount Wk. In the present embodiment, since the value of the ink amount Wk obtained in the final loop is 0, 5.72[%] which is the value given by the replacement process of the fourth loop is the value of the final ink amount Wk (see FIG. 20C). Therefore, the value of the total ink amount is also 100[%] which is equal to the value after the fourth loop (see FIG. 20D). In the final loop, since there is no unprocessed ink (S1317: YES), the conversion process from the virtual color material amount into the actual ink amount in this target line ends.

Figure 13B:
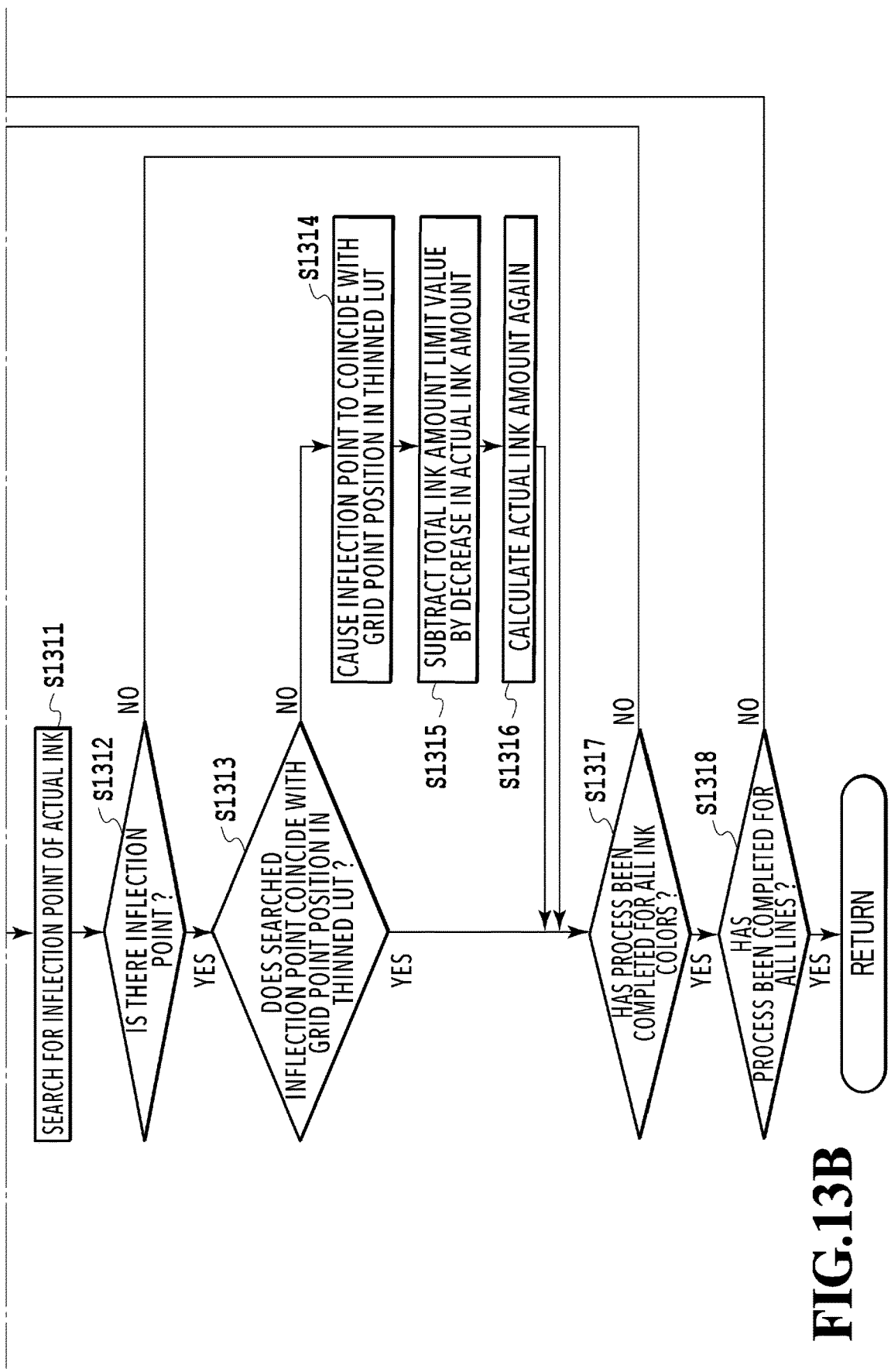
FIG. 13B is a flowchart illustrating a procedure of calculating an actual ink amount in the first embodiment.

Returning to the description of the flowchart of FIG. 13B, in S1311, the inflection point of the actual ink amount is searched for. Here, the inflection point of the actual ink amount is an input image signal value corresponding to a point at which the increase/decrease of the actual ink amount changes in the RGB color space. In the present embodiment, the inflection point is searched for by sequentially moving a target point on the target line and detecting the increase/decrease of the actual ink amount of the corresponding ink color.

Figure 21A:
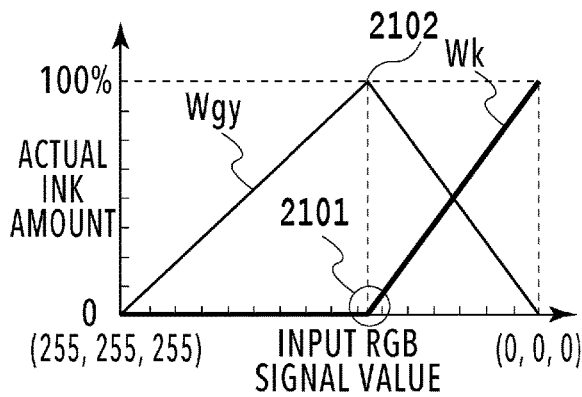
FIGS. 21A to 21H are diagrams for describing a difference between a thinned LUT generated by a related art technique and a thinned LUT generated by a technique of the first embodiment.

The inflection point in the present embodiment will be described with reference to FIGS. 21A to 21D. FIG. 21A is a diagram illustrating a part of the all-point LUT before the setting of the inflection point (S1311 to S1314) is performed. In other words, FIG. 21A illustrates a correspondence relation between the input RGB signal value and each of the actual ink amount Wgy of the gray ink and the actual ink amount Wk of the black ink in a line connecting the peak W and the peak K (a so-called gray line) obtained at the stage at which S1310 ends.

Figure 21B:
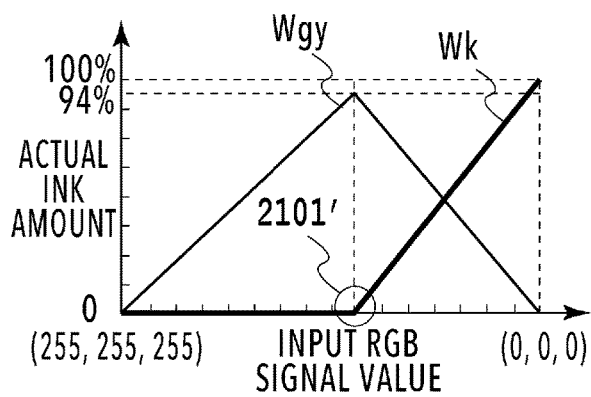
Figure 21C:
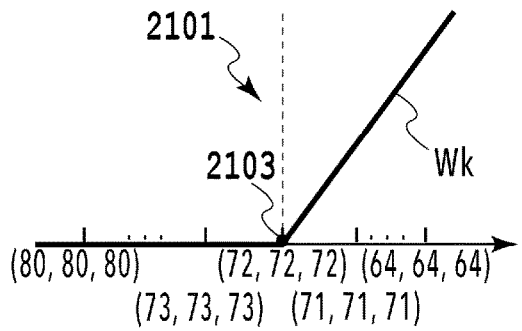
Figure 21D:
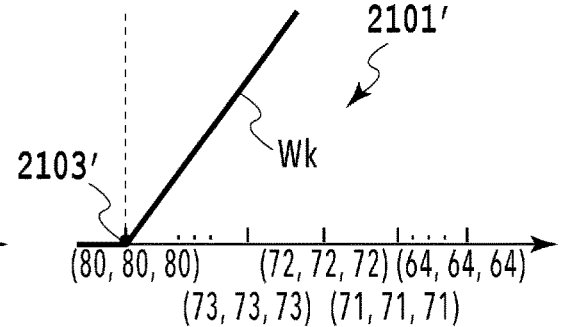

FIG. 21C is an enlarged view of a region 2101 of FIG. 21A. As described above, the all-point LUT of the present embodiment is a three-dimensional LUT having 256×256×256 grid points, and there are a total of 256 grid points of (255, 255, 255) (254, 254, 254) . . . (1, 1, 1) (0, 0, 0) in the gray line. In the example of FIG. 21A, the actual ink amount Wgy turns from the increase to the decrease in a graph line indicating the actual ink amount at a peak 2102. In this case, FIG. 21C illustrates that an inflection point 2103 of the actual ink amount Wgy is an input RGB signal value (72, 72, 72) corresponding to the peak 2102. Further, in the gray line of FIG. 21A, the actual ink amount Wk of K having the same hue as GY and a different density turns from 0 to the increase in accordance with the change in the increase and the decrease of the actual ink amount Wgy. As described above, in a case where a color tint is indicated by two or more color ink colors having different densities in a certain line, an input RGB signal value corresponding to a point at which the ink amount turns to the increase from 0 can also be regarded as the inflection point.

In S1312, it is determined whether or not the inflection point has been found. In a case where the inflection point has been found (S1312: YES), the flow proceeds to S1313. In a case where the inflection point has not been found (S1312: NO), S1313 to S1316 are skipped.

In S1313, it is determined whether or not the inflection point searched for in S1311 coincides with the grid point position in the thinned LUT. In a case where the inflection point searched for in S1311 coincides with the grid point position in the thinned LUT (S1313: YES), S1314 to S1316 are skipped. In a case where the inflection point searched for in S1311 does not coincide with the grid point position in the thinned LUT (S1313: NO), the process proceeds to S1314. As described above, in the present embodiment, the grid point positions of the thinned LUT acquired in S401 are 17 points of (0,0,0) (16,16,16) . . . (240,240,240) (255,255, 255). In the example of FIGS. 21A to 21D, the input RGB signal value (72, 72, 72) is searched for as the inflection point in S1311, and the input RGB signal value does not coincide with the grid point position of the thinned LUT acquired in S401. Therefore, the process proceeds to S1314.

In S1314, the inflection point searched for in S1311 is set to coincide with the grid point position of the thinned LUT. FIG. 21B is a diagram illustrating an example in which the inflection point (72, 72, 72) searched for in S1311 is changed to (80, 80, 80) which is the grid point position of the LUT. In the present embodiment, the grid point position of the thinned LUT whose inflection point is to be changed is the position of the grid point adjacent in a direction in which the gradation indicated by the input RGB signal gets bright. This is based on a characteristic in which the ejection amount of the ink decreases as the gradation indicated by the input RGB signal generally becomes brighter, and it is because the ejection amount of the ink is not increased before and after the inflection point is set. In another embodiment, the grid point position of the thinned LUT whose inflection point is to be changed is the position of the grid point adjacent in a direction in which the gradation indicated by the input RGB signal gets dark (that is, the direction in which the ink ejection amount increases).

In S1315, the total ink amount limit value acquired in S1302 is subtracted from the decrease in the actual ink amount. In the example of FIGS. 21A to 21D, the actual ink amount Wgy 100% and the actual ink amount Wk0% are decreased to the actual ink amount Wgy 94% and the actual ink amount Wk0%, respectively, as the inflection point is set to (80, 80, 80) in S1314. In other words, as the inflection point is set to the grid point position of the thinned LUT, the actual ink amount is reduced by 6%. In S1315, the total ink amount limit value is updated to a value obtained by subtracting the actual ink amount of 6%. As the total ink amount limit value is updated (subtracted), in S1316 to be described later, the actual ink amount is recalculated so that the actual ink amount turns from the increase to the decrease at the changed inflection point.

In S1316, the actual ink amount of the target ink color is recalculated for all the target points in the target line. The calculation technique here is the same as in the process of S1305 to S1310, and the actual ink amount is recalculated on the basis of the total ink amount limit value updated in S1315.

In S1317, it is determined whether or not the process of S1304 to S1316 has been completed for all the ink colors. In a case where the process of S1304 to S1316 has been completed for all the ink colors (S1317: YES), the process proceeds to S1318. In a case where the process of S1304 to S1316 has not been completed for all the ink colors (S1317: NO), the process returns to S1304, and a next ink color is selected.

FIG. 21B is a diagram illustrating a part of the all-point LUT obtained at the stage at which the process for the gray line is completed (S1317: YES). A region 2101' illustrated in FIG. 21B has the same content to an enlarged view of FIG. 21D. In other words, the inflection point is set to an input RGB signal value (80, 80, 80), and the inflection point coincides with the grid point position of the thinned LUT. Then, the ink amount Wgy changes from the increase to the decrease at the inflection point (80, 80, 80), and the ink amount Wk also changes from 0 to the increase at the inflection point (80, 80, 80).

In S1318, it is determined whether or not the process of S1301 to S1317 has been completed for all the lines. In a case where the process of S1301 to S1317 has been completed for all the lines (S1318: YES), the process of the present flowchart ends and returns to the flowchart of FIG. 5B. In a case where the process of S1301 to S1317 has not been completed for all the lines (S1318: NO), in S1319, the total ink amount limit value is reset, and the process returns to S1301, and a next target line is selected.

Returning to the flowchart of FIG. 5B, in S5043, the actual ink amounts (corresponding to all the ink colors) on the plane surrounded by the line connecting the peaks of the color cube are calculated. The calculation of the actual ink amount on the plane is performed by applying a technique of calculating the virtual color material amount in S5033 and a technique of calculating the actual ink amount on the line connecting the peaks of the color cube in S5042.

In S5044, the actual ink amounts (corresponding to all the ink colors) in the color cube are calculated. The calculation of the actual ink amount in the color cube is performed by applying the technique of calculating the virtual color material amount in S5034 and the technique of calculating the actual ink amount on the line connecting the peaks of the color cube in S5042. In a case where the process of S5044 ends, the process of S504 ends.

Finally, in S505, the generated all-point LUT in S501 to S504 is output. In a case where the generated all-point LUT is output (S505), the process of the present flowchart ends.

Figure 21E:
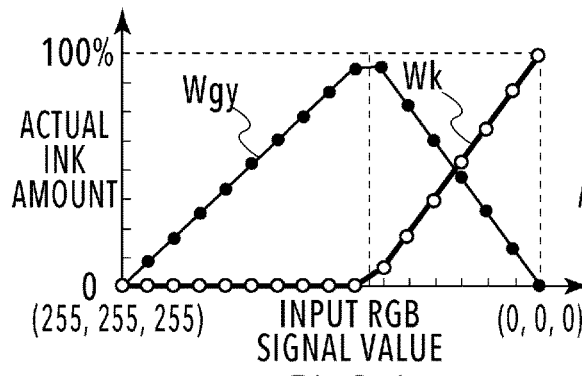

Next, effects obtained by performing the inflection point search process (S1311) to the actual ink amount recalculation process (S1316) which is one of main parts of the present embodiment will be described in comparison with the related art technique. FIG. 21E illustrates a part of a thinned LUT generated by the related art technique. In other words, the thinned LUT of FIG. 21E is a three-dimensional color conversion LUT generated by thinning out grid points from an all-point LUT generated without considering the grid point position of the thinned LUT (S404). FIG. 21E also illustrates a correspondence relation between the input RGB signal value in the gray line and each of the actual ink amount Wgy of the gray ink and the actual ink amount Wk of the black ink, similarly to FIG. 21A. As described above, the grid points in thinned LUT are 17 points of (0, 0, 0), (16, 16, 16) . . . (240, 240, 240) (255, 255, 255). In FIG. 21E, the actual ink amounts Wgy and Wk corresponding to the grid points are indicated by "•" and "○" in FIG. 21E, respectively, and the actual ink amounts Wgy and Wk between grid points are calculated through the interpolation calculation. In the example of FIG. 21E, since the inflection point is not set (changed), in a case where the input RGB signal value (80, 80, 80) is input to the thinned LUT, the corresponding actual ink amounts Wgy and Wk are calculated through the interpolation calculation. Therefore, the input RGB signal value (80, 80, 80) does not coincide with the inflection points of the actual ink amounts Wgy and Wk, and the interpolation error occurs in the output obtained with reference to the thinned LUT. As a result, the gradation property in the output image may deteriorate.

Figure 21F:
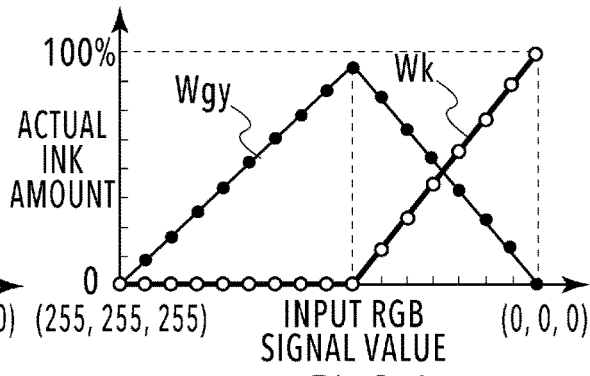

On the other hand, FIG. 21F is a diagram illustrating a part of a thinned LUT generated by the technique of the present embodiment. In other words, the thinned LUT of FIG. 21F is a three-dimensional color conversion LUT generated by thinning out grid points from the all-point LUT generated in consideration of the grid point position of the thinned LUT (S404). Since the meanings of reference numerals in the thinned LUT of FIG. 21F are the same as those in FIG. 21E, description thereof is omitted. In the example of FIG. 21F, since the inflection point is set (changed), in a case where the input RGB signal value (80, 80, 80) is input to the thinned LUT, the same values as the actual ink amounts held in the all-point LUT are derived as the corresponding actual ink amounts Wgy and Wk. Further, the input RGB signal values (80, 80, 80) coincide with the inflection points of the actual ink amounts Wgy and Wk. As a result, according to the technique of generating the color conversion LUT of the present embodiment, it is possible to obtain an output image in which the gradation property is maintained.

Figure 21G:
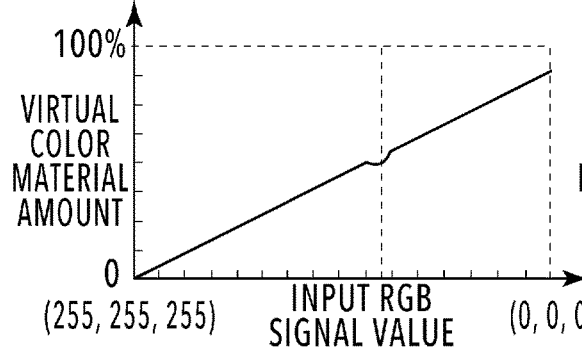
Figure 21H:
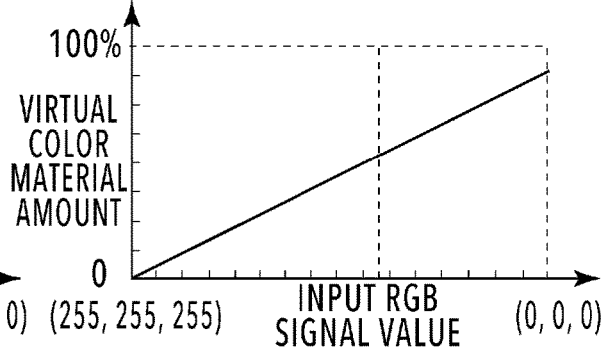

Further, FIG. 21G to FIG. 21H illustrate graphs obtained by converting the actual ink amounts Wgy and Wk in FIG. 21E to FIG. 21F into the virtual color material amounts. Here, for the sake of simplicity of description, only transition of Vyi among the virtual color material amounts Vyi, Vmi, and Vci is illustrated. As illustrated in FIG. 21G in the virtual color material amount Vyi corresponding to a portion around the input RGB signal value (72, 72, 72), there is a region in which linearity is impaired. On the other hand, it can be seen in FIG. 21H that the linearity is maintained in the virtual color material amount Vyi corresponding to the portion around the input RGB signal value (72, 72, 72).

As described above, according to the color conversion LUT generation technique in the present embodiment, in a case where the all-point LUT is generated, position information on the grid point in the thinned LUT is acquired, and the inflection point of the actual color material is set to coincide with the grid point in the thinned LUT. With such a configuration, according to the color conversion LUT generation technique in the present embodiment, it is possible to generate a color conversion LUT with a satisfactory color conversion characteristic without requiring a complicated process in the color conversion process.

Second Embodiment

The color conversion LUT generation technique in the first embodiment has been described in connection with the example in which the grid point positions in the thinned LUT are at equal intervals. In the present embodiment, a case in which the grid point positions in the thinned LUT are at unequal intervals as a non-linear conversion process is performed on the input RGB signal in the color conversion process. Hereinafter, description of parts common to those the first embodiment will be simplified or omitted, and the following description will proceed focusing on points specific to the present embodiment.

(Overall Structure of Printing System)

Figure 22:
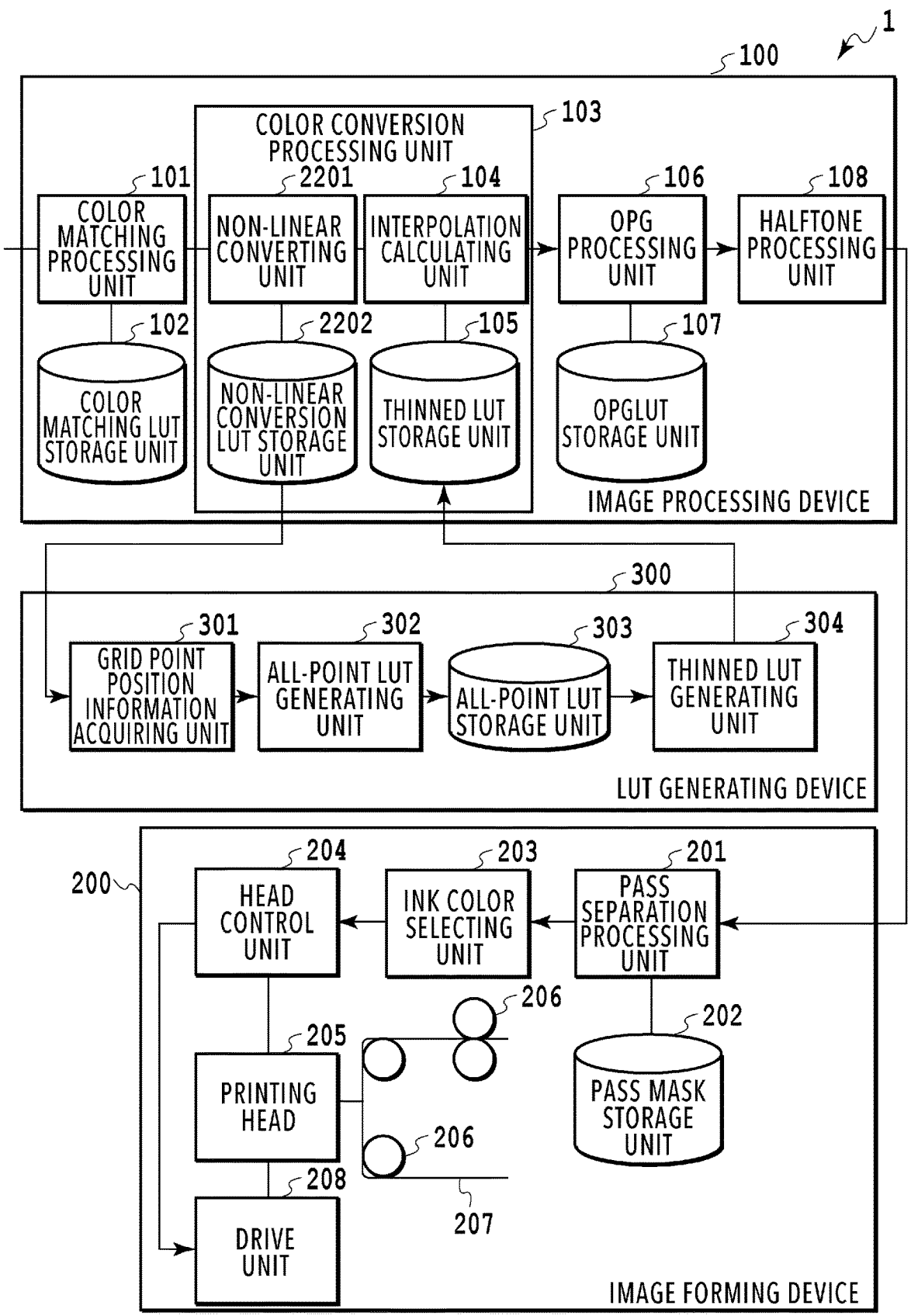
FIG. 22 is a block diagram illustrating an overall configuration example of a printing system in a second embodiment.

FIG. 22 is a block diagram illustrating an overall configuration example of printing system 1 in the present embodiment. A difference from the printing system 1 of the first embodiment lies in that a non-linear converting unit 2201 and a non-linear conversion LUT storage unit 2202 are added to the color conversion processing unit 103 of the image processing device 100. The non-linear converting unit 2201 performs non-linear conversion on each of the RGB signal values in the RGB image data which has undergone the color matching process, and transmits the non-linearly converted RGB image data to the interpolation calculating unit 104. The non-linear conversion process is performed for each ink color installed in the image forming device 200. In the non-linear conversion process, a one-dimensional non-linear conversion LUT with a non-linear characteristic stored in non-linear conversion LUT storage unit 2202 is used. In the present embodiment, a fixed value (output value) corresponding to a predetermined input RGB signal value is held at a grid point in the non-linear conversion LUT.

(Non-Linear Conversion LUT)

FIGS. 23A to 23E are schematic diagrams illustrating an example of a non-linear conversion LUT in the present embodiment. In the graphs of FIGS. 23A to 23E, a horizontal axis denotes an input RGB signal value, and a vertical axis denotes an output RGB signal value which has undergone the non-linear conversion. The graphs of FIGS. 23A to 23E indicate non-linear conversion LUTs of the R axis, the G axis, and the B axis corresponding to five ink colors of C, M, Y, K and GY. The non-linear conversion LUTs of FIGS. 23A to 23E have 17 grid points, and a converted output value corresponding to input RGB image data of 8 bits (256 gradations) is held at each grid point. An output value between grid points is calculated through the linear interpolation.

(Image Forming Procedure)

An image forming procedure in the second embodiment is different from that of the first embodiment in a process executed by the color conversion processing unit 103, and the other processes are the same as in the first embodiment. The non-linear converting unit 2201 performs the non-linear conversion process on the image data converted by the color matching process in S302 with reference to the non-linear conversion LUT stored in the non-linear conversion LUT storage unit 2202. Then, the interpolation calculating unit 104 calculates the actual ink amount between the grid points through the interpolation calculation for the image data converted by the non-linear conversion process with reference to the thinned LUT stored in the thinned LUT storage unit 105.

(LUT Generation Procedure)

The LUT generation procedure in the present embodiment is different from the processing procedure in the first embodiment only in the process of S401. In S401, first, the grid point position information acquiring unit 301 can acquire the position information on the grid points uniformly arranged in the RGB color space by performing a calculation in accordance with a predetermined rule on the basis of the number of grid points of the thinned LUT which is decided in advance. Then, the grid point position information acquiring unit 301 performs the non-linear conversion process on the RGB signal value held in each of the grid points obtained by the above calculation with reference to the non-linear conversion LUT stored in the non-linear conversion LUT storage unit 2202. As a result, the grid point position information acquired in the present embodiment is position information on non-uniformly arranged grid points in the RGB color space. For example, in a case in which the 8-bit input RGB signal values are arranged at 17×17×17 grid points, the position of the grid point arranged in each of the R, and B axes differs for each of the ink colors of C, M, Y, K, and GY. As an example, unequal interval position information such as 0, 32, 64, 96, 112, 128, 144, 160, 176, 192, 208, 216, 224, 232, 240, 248, and 255 is acquired for the R axis of the cyan ink. This is an example in which the interval of the grid points closer to 0 is wider, and the interval of the grid points closer to 255 is narrow. As the method of acquiring grid point position information, a method other than the above-described method may be used, the grid point position information may be acquired from the definition file in which position information on non-uniformly arranged grid points is described, or the LUT generating device 300 may hold the non-linear conversion LUT in advance. In this case, the grid point position information acquiring unit 301 can acquire the position information on the non-uniformly arranged grid points without referring to the non-linear conversion LUT stored in the image processing device 100. Since steps other than S401 are the same as in the first embodiment, illustration of a flowchart illustrating the LUT generation procedure in the present embodiment is omitted.

(Examples of all-Point LUT and Thinned LUT)

Figure 24A:
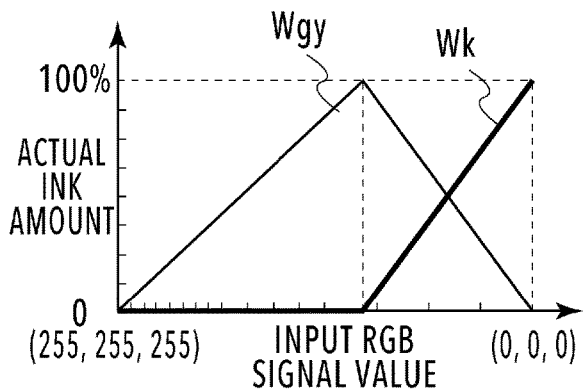
FIGS. 24A to 24F are diagrams for describing a difference between a thinned LUT generated by a related art technique and a thinned LUT generated by a technique of the second embodiment.
Figure 24B:
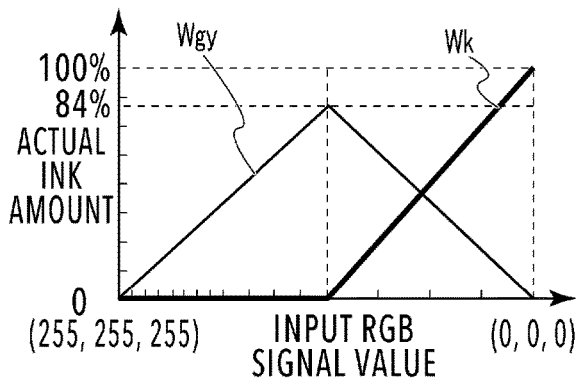

FIG. 24A and FIG. 24B are diagrams illustrating a part of the all-point LUT before the inflection point is set and a part of the all-point LUT after the inflection point is set in the present embodiment which correspond to the all-point LUTs of FIGS. 21A and 21B, respectively. Since the meanings of reference numerals in FIGS. 24A and 24B are the same as those in FIGS. 21A and 21B, respectively, description thereof is omitted. A difference between FIGS. 21A and 21B and FIGS. 24A and 24B lies in that in FIGS. 21A and 21B, scale marks indicating the grid point position of the thinned LUT are at equal intervals, while in FIGS. 24 A and 24 B, the scale marks are at unequal intervals. In the present embodiment, the grid points are assumed to be arranged at 0, 32, 64, 96, 112, 128, 144, 160, 176, 192, 208, 216, 224, 232, 240, 248, and 255 at unequal intervals for each of the R, and B axes in the thinned LUT.

Figure 24C:
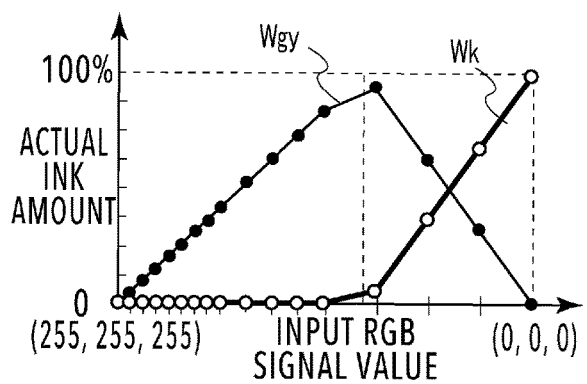
Figure 24D:
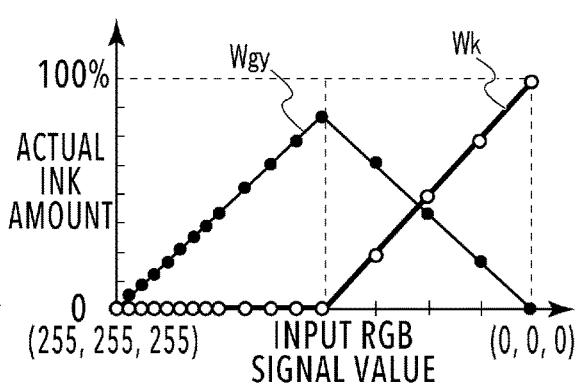
Figure 24E:
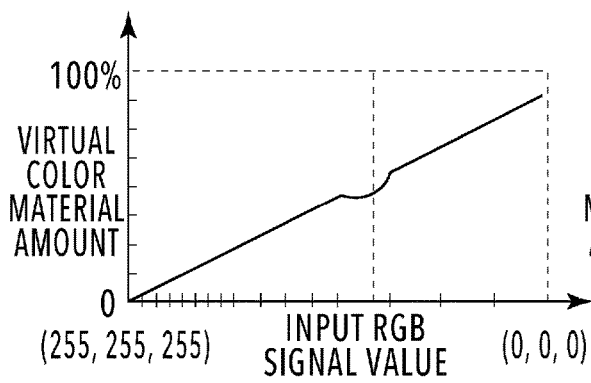

Next, FIG. 24C is a diagram illustrating a part of the thinned LUT generated by the related art technique and corresponds to the thinned LUT of FIG. 24E in the first embodiment. On the other hand, FIG. 24D is a diagram illustrating a part of the thinned LUT generated by the technique of the present embodiment and corresponds to the thinned LUT of FIG. 21F in the first embodiment. Since the meanings of reference numerals in FIG. 24C to FIG. 24D are the same as those in FIG. 21C to FIG. 21F, description thereof is omitted. In the example of FIG. 24C, since the inflection point is not set (changed), for example, in a case where the input RGB signal value (100, 100, 100) is input to the thinned LUT, the corresponding actual ink amounts Wgy and Wk are calculated through the interpolation calculation. At this time, since the input RGB signal value (100, 100, 100) does not coincide with the inflection points of the actual ink amounts Wgy and Wk, the gradation error occurs in an output obtained with reference to the thinned LUT. As a result, the gradation property in the output image may deteriorate. On the other hand, in the example of FIG. 24D, since the inflection point is set (changed), in a case where the input RGB signal value (100, 100, 100) is input to the thinned LUT, the same values as the actual ink amounts held in the all-point LUT are derived as the corresponding actual ink amount Wgy and Wk. Further, the input RGB signal value (100, 100, 100) coincides with the inflection points of the actual ink amounts Wgy and Wk. As a result, according to the color conversion LUT generation technique of the present embodiment, it is possible to obtain an output image in which the gradation property is maintained.

Figure 24F:
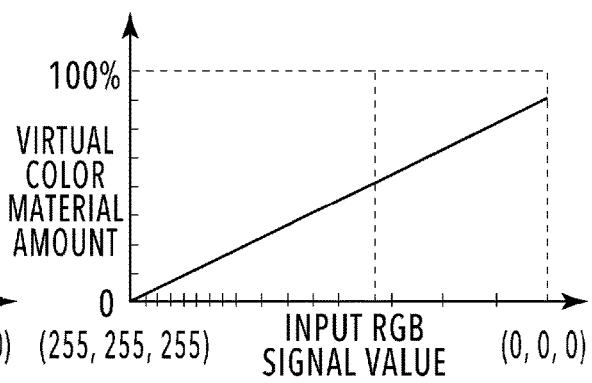

Further, FIGS. 24E and 24F illustrate graphs illustrating transitions in which the actual ink amounts Wgy and Wk in FIGS. 24C and 24D are into the virtual color material amounts, respectively. Here, for the sake of simplicity of description, only transition of Vyi among the virtual color material amounts Vyi, Vmi, and Vci is illustrated. As illustrated in FIG. 24E, in the virtual color material amount Vyi corresponding to a portion around the input RGB signal value (100, 100, 100), there is a region in which linearity is impaired. On the other hand, it can be seen in FIG. 24F that the linearity is maintained in the virtual color material amount Vyi corresponding to the portion around the input RGB signal value (100, 100, 100).

According to the color conversion LUT generation technique in the present embodiment, even though the grid point positions in the thinned LUT are at unequal intervals, in a case where the all-point LUT is generated, the inflection point of the output value of the actual color material can be set to coincide with the grid point in the thinned LUT. With such a configuration, it is possible to generate a color conversion LUT with a satisfactory color conversion characteristic without requiring a complicated process in the color conversion process.

Third Embodiment

In the first and second embodiments, the all-point LUT is newly generated in a case where the thinned LUT is generated. The present embodiment will be described in connection with an example in a case in which the all-point LUT is generated on the basis of an existing color conversion LUT in a case where the thinned LUT is generated. Specifically, after the actual ink amount in the existing color conversion LUT is corrected on the basis of the virtual color material amount, the grid point position information in the existing color conversion LUT is acquired. Then, similarly to the first and second embodiments, the inflection points of the actual ink amounts in the all-point LUT are caused to coincide with the positions of the grid points in the existing color conversion LUT. Further, description of parts common to the above embodiments is simplified or omitted, and the following description will proceed focusing on points specific to the present embodiment.

(Overall Structure of Printing System)

Figure 25:
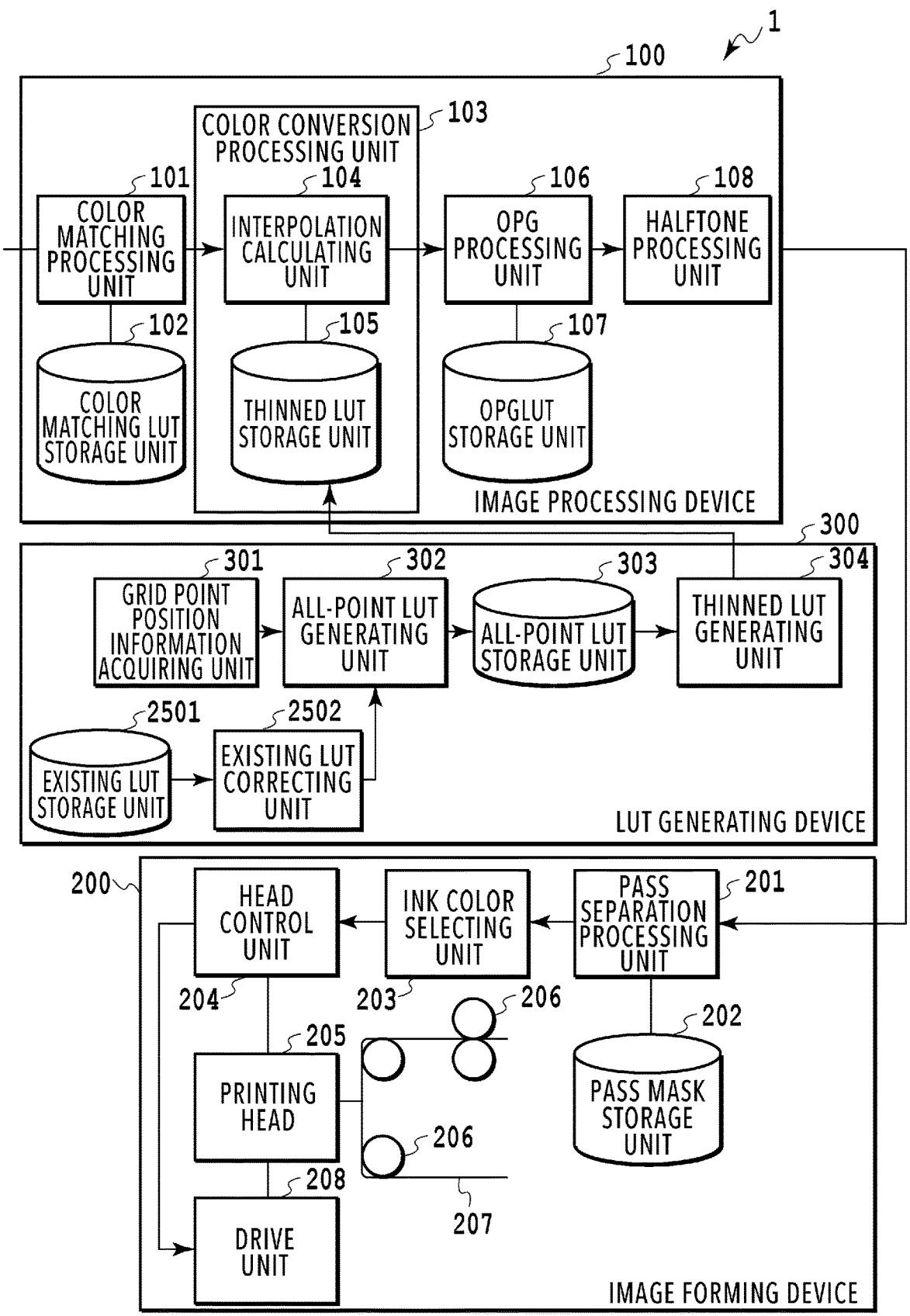
FIG. 25 is a block diagram illustrating an overall configuration example of a printing system in a third embodiment.

FIG. 25 is a block diagram illustrating an overall configuration example of a printing system 1 in the present embodiment. In the printing system 1 of the present embodiment, an existing LUT storage unit 2501 and an existing LUT correcting unit 2502 are added to the LUT generating device 300 as compared with the first embodiment. The existing LUT storage unit 2501 stores an existing color conversion LUT. In the present embodiment, the existing color conversion LUT is a color conversion LUT previously generated by the thinned LUT generating unit 304 and includes 17×17×17 grid points. The existing LUT correcting unit 2502 performs evaluation and correction based on the virtual color material amount in order to improve the color conversion characteristic of the existing color conversion LUT stored in the existing LUT storage unit 2501. The all-point LUT generating unit 302 in the present embodiment generates the all-point LUT with reference to the grid point position information acquired by the grid point position information acquiring unit 301 and a corrected LUT output from the existing LUT correcting unit 2502.

(Existing Color Conversion LUT Correction Procedure)

Figure 26:
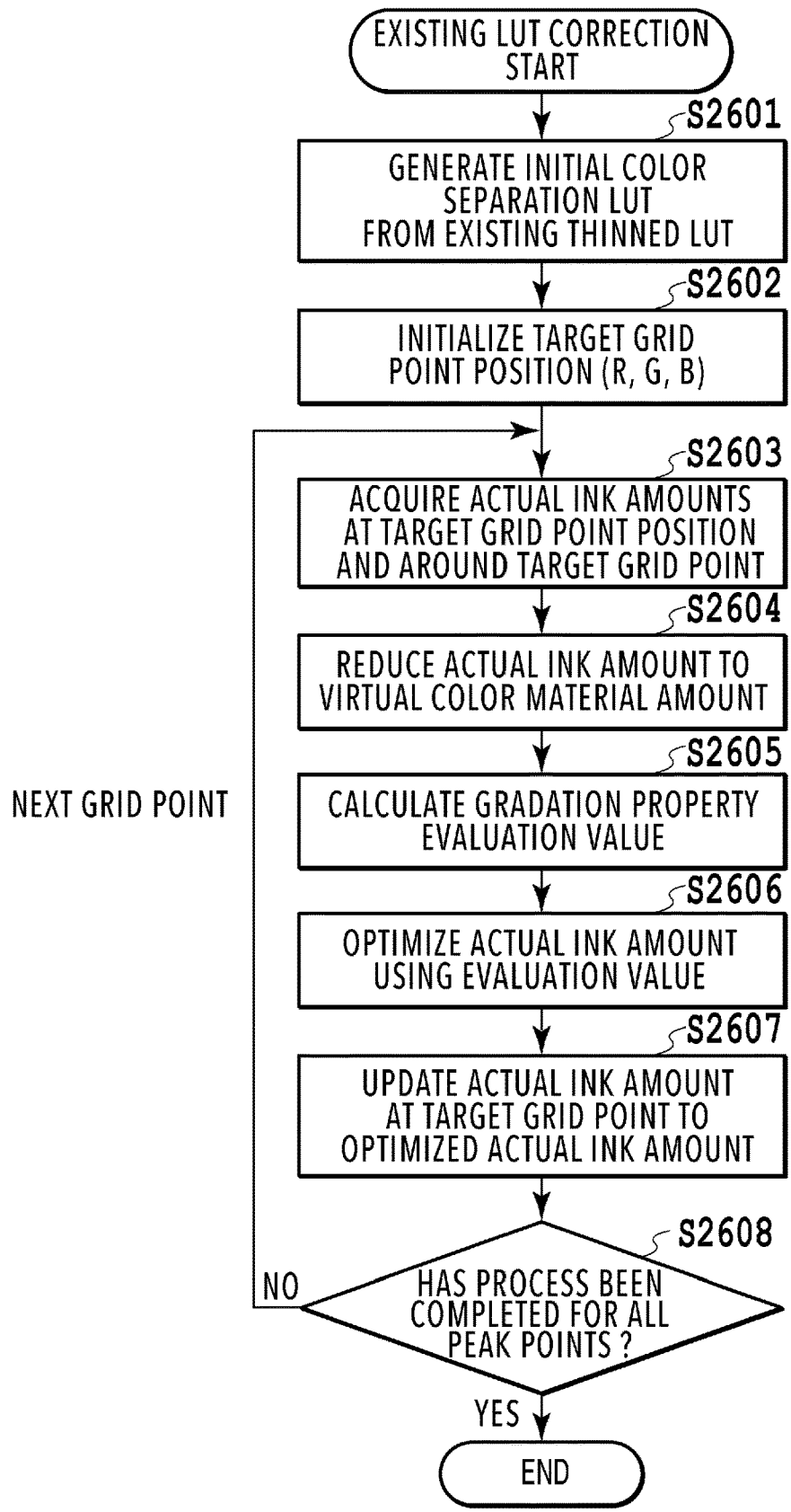
FIG. 26 is a flowchart illustrating a procedure of correcting an existing color conversion LUT in the third embodiment.

An existing color conversion LUT correction procedure in the present embodiment will be described with reference to a flowchart of FIG. 26. As described above, the number of grid points of the existing color conversion LUT is 17×17×17. In a case where the existing color conversion LUT is corrected, the number of grid points of the modified color conversion LUT is 256×256×256 which is the same as the all-point LUT.

In S2601, an initial color separation LUT is generated from the existing color conversion LUT. In the present embodiment, an initial color separation LUT including 256×256×256 grid points is generated by reading the existing color conversion LUT stored in the existing LUT storage unit 2501 and performing the interpolation calculation (linear interpolation) on the color conversion LUT.

In S2602, a target grid point serving as a correction target is initialized. In the present embodiment, a grid point position of RGB=(0, 0, 0) is assumed to be the initial grid point. The existing LUT correcting unit 2502 performs the correction process on the grid points in the initial color separation LUT while moving a target grid point in the order of the B value, the G value, and the R value.

In S2603, the existing LUT correcting unit 2502 acquires the actual ink amounts held at a target grid point and a grid point positioned near the target grid point (hereinafter referred to as a "neighbor grid point"). In the present embodiment, the actual ink amounts held at the neighbor grid points (3×3×3=27 points) in a three dimensions in the R axis direction, the G axis direction, and the B axis direction centering on the target grid point are acquired. In a case where the neighbor grid point is outside a definition range of the initial color separation LUT, the actual ink amount corresponding to the corresponding neighbor grid point is not acquired.

In S2604, the actual ink amount of the target grid point and the actual ink amount of the neighbor grid point are converted into the virtual color material amounts. A conversion method from the actual ink amount to the virtual color material amount is performed by the following Formulas.

$$Vyi = R * Vyi'$$ Formula (6-1)

$$Vmi = R * Vmi'$$ Formula (6-2)

$$Vci = R * Vci'$$ Formula (6-3)

In Formulas (6-1) to (6-3), the virtual color material amounts Vyi', Vmi', Vci' per unit ejection amount are calculated in advance by a technique similar to S501 in the first embodiment.

In S2605, a gradation property evaluation value at the target grid point is calculated. In the present embodiment, uniformity of the virtual color material amounts in the RGB color space is used as the gradation property evaluation value. Specifically, a change between the virtual color material amount corresponding to the target grid point and the virtual color material amount corresponding to the adjacent grid point is indicated as a vector, and a magnitude of a sum of vectors is calculated as the gradation property evaluation value. A method of calculating the gradation property evaluation value differs depending on the position of each target grid point in the RGB color space.

Figure 27C:
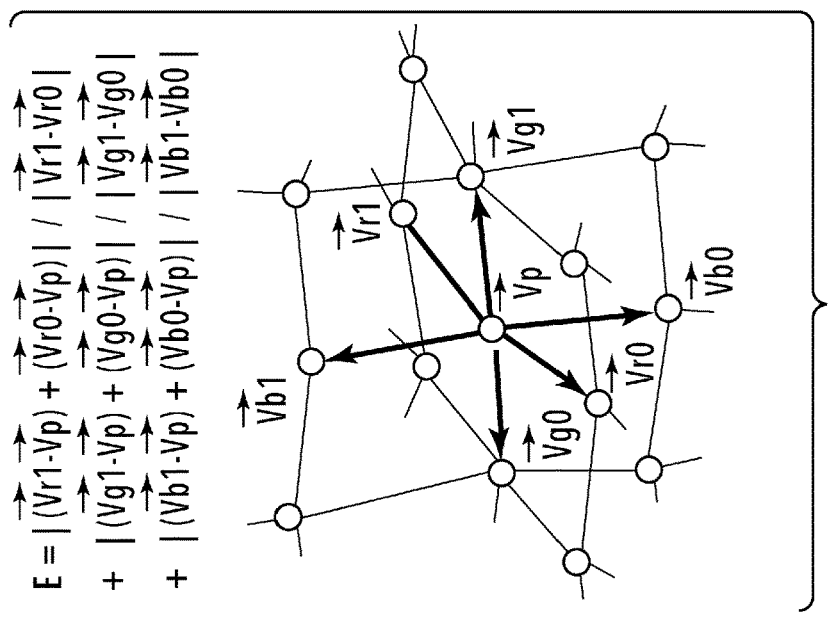
FIGS. 27A to 27C are diagrams for describing a method of calculating an evaluation value in the third embodiment.
Figure 27B:
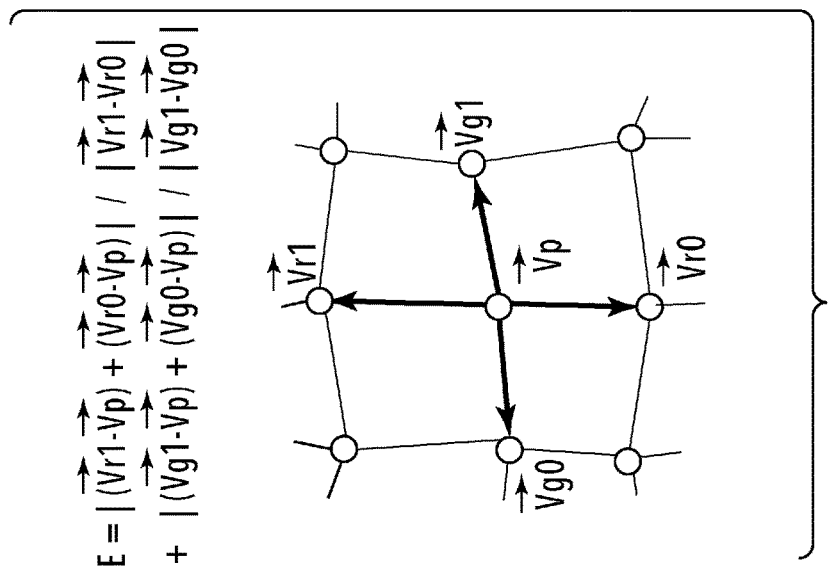
Figure 27A:
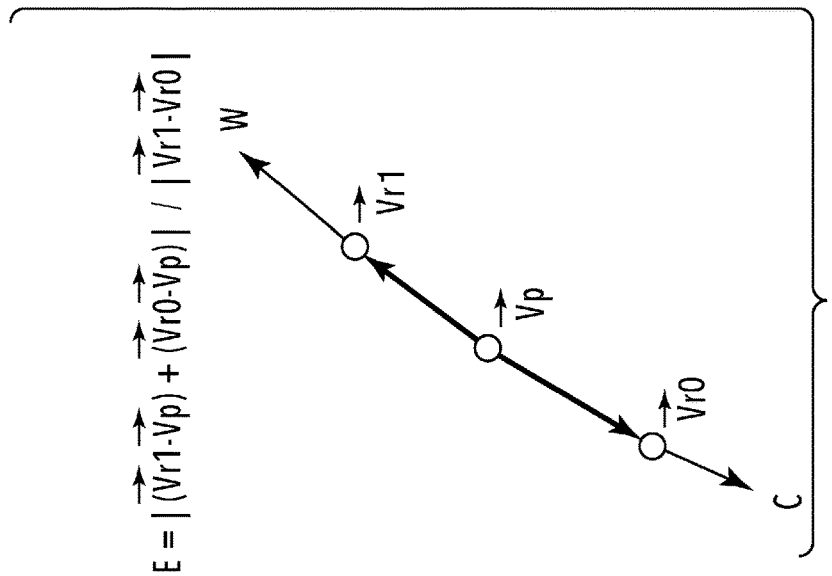

FIGS. 27A to 27C are diagrams for describing a method of calculating the gradation property evaluation value in the present embodiment. FIG. 27A is a diagram illustrating the target grid point and the adjacent grid point on a side connecting a peak C and a peak W. At this time, since there is only one position relation in which the target grid point is positioned between two adjacent grid points, a gradation property evaluation value E is calculated in accordance with the following Formula (7).

$$E = |(Vr1 - Vp) + (Vr0 - Vp) / |Vr1 - Vr0|$$ Formula (7)

In Formula (7), Vp indicates the virtual color material amount corresponding to the target grid point, and Vr0 and Vr1 indicate the virtual color material amounts corresponding to the adjacent grid points.

FIG. 27B is a diagram illustrating the target grid point and the adjacent grid point on a surface of a color cube partitioned by the G axis and the R axis. At this time, since there are two position relations in which the target grid point is positioned between two adjacent grid points, the calculation using Formula (7) is performed on a combination of each of (Vr0, Vp, Vr1) and (Vg0, Vp, Vg1). As illustrated in FIG. 27B, a sum of calculation results is obtained as the gradation property evaluation value E.

FIG. 27C is a diagram illustrating the target grid point and the adjacent grid point in the color cube. At this time, since there are three positional relationships in which the target grid point is positioned between two adjacent grid points, the calculation using Formula (7) is performed on a combination of each of (Vr0, Vp, Vr1), (Vg0, Vp, Vg1), and (Vb0, Vp, Vb1). As illustrated in FIG. 27C, a sum of calculation results is obtained as the gradation property evaluation value E.

In S2606, the existing LUT correcting unit 2502 optimizes the actual ink amount corresponding to the target grid point using the gradation property evaluation value E calculated by the technique of FIGS. 27A to 27C. Specifically, first, the virtual color material amount corresponding to the target grid point is increased or decreased so that the gradation property evaluation value E decreases. The increased or decreased virtual color material amount is converted into the actual ink amount again.

In S2607, the actual ink amount corresponding to the target grid point is updated to the actual ink amount optimized in S2606. As the ink amount of the grid point is corrected so that the gradation property evaluation value E decreases as described above, it is possible to correct the initial color separation LUT to have a better satisfactory gradation characteristic.

In S2608, it is determined whether or not the correction has been completed for all the grid points. In a case where the correction has been completed for all the grid points (S2608: YES), the process of the present flowchart ends. In a case where the correction has not been completed for all the grid points (S2608: NO), the target grid point is caused to move to the next grid point, and the process of S2603 and subsequent steps is repeated again.

(All-Point LUT Generation Procedure)

Figure 28:
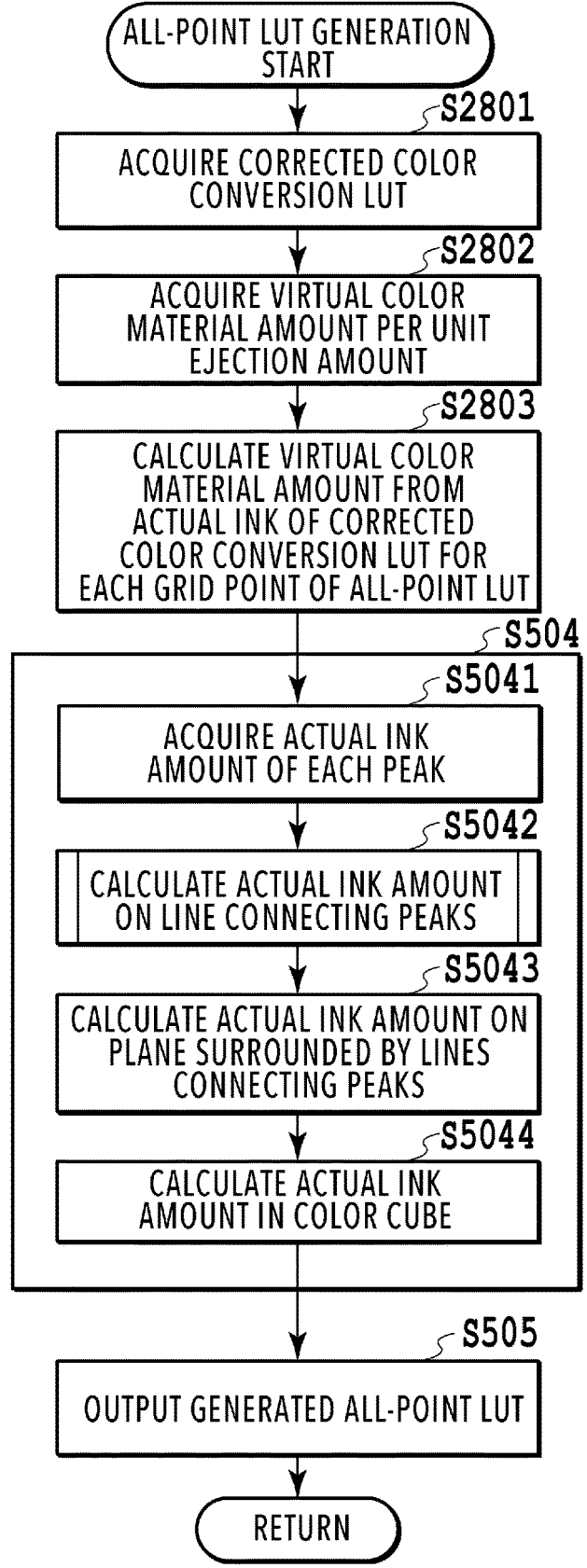
FIG. 28 is a flowchart illustrating an all-point LUT generation procedure in the third embodiment.

FIG. 28 is a flowchart illustrating an all-point LUT generation procedure in the present embodiment. Steps in the flowchart of FIG. 28 are performed by the all-point LUT generating unit 302.

In S2801, the corrected color conversion LUT obtained in the existing LUT correction process (FIG. 26) is acquired.

In S2802, the virtual color material amount per unit ejection amount is acquired. Since the process of S2802 is the same as S501 of the first embodiment, description thereof is omitted.

In S2803, the virtual color material amount is calculated from the actual ink amount of the corrected color conversion LUT. As the actual ink amount, the actual ink amount held at each grid point in the corrected color conversion LUT is read out. S504 and S505 are the same as in the first embodiment, and thus description thereof is omitted.

As described above, in the color conversion LUT generation technique in the present embodiment, the existing color conversion LUT is corrected on the basis of the virtual color material amount, and the thinned LUT obtained by thinning out the grid points from the corrected all-point LUT is generated. Then, similarly to the first and second embodiments, the grid point position information of the thinned LUT is acquired, and the inflection point of the actual color material is caused to coincide with the position of the grid point in the thinned LUT. Therefore, it is possible to generate the thinned LUT with a less processing load while suppressing the gradation property of an output image from being impaired as compared with the technique of generating the all-point LUT newly.

Fourth Embodiment

In the color conversion LUT generation techniques in the first to third embodiments, in a case where the all-point LUT is generated, the value obtained by reducing the virtual color material amount to the actual ink amount for each grid point in the all-point LUT is calculated. The present embodiment will be described in connection with an example in which the actual ink amount is calculated for each grid point in the all-point LUT on the basis of a correspondence relation between the input image signal and the actual ink amount in a case where the all-point LUT is generated. In other words, in the present embodiment, the virtual color material amounts used in the first to third embodiments are not used. Further, descriptions of parts common to the above embodiments will be simplified or omitted, and the following description will proceed focusing on points specific to the present embodiment.

(Overall Structure of Printing System)

Figure 29:
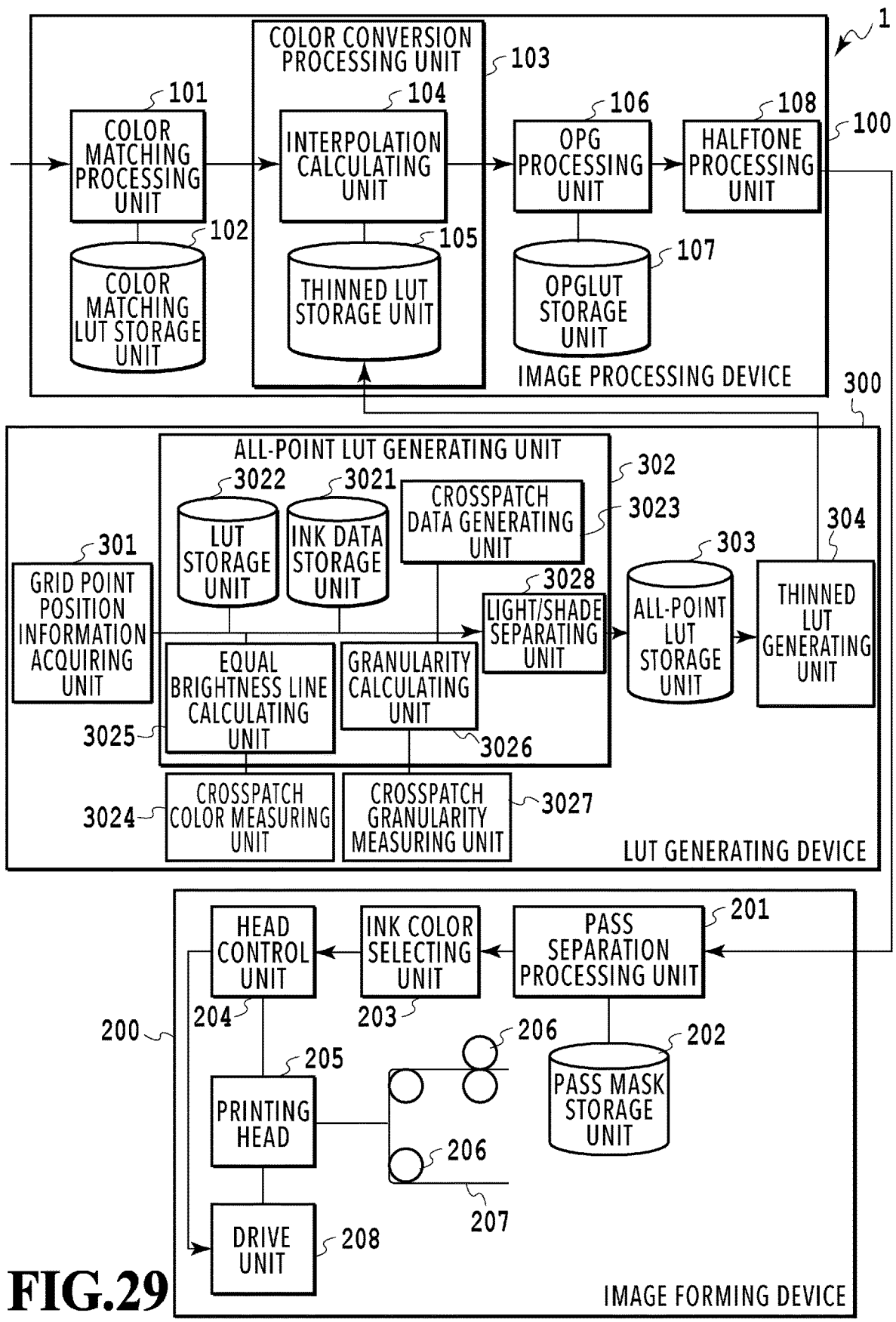
FIG. 29 is a block diagram illustrating an overall configuration example of a printing system in a fourth embodiment.

FIG. 29 is a block diagram illustrating an overall configuration example of a printing system 1 in the present embodiment. A difference from the printing system 1 in the first embodiment lies in that an internal configuration of the all-point LUT generating unit 302 of the LUT generating device 300 is different, and a crosspatch color measuring unit 3024 and a crosspatch granularity measuring unit 3027 are added. The all-point LUT generating unit 302 of the present embodiment includes an ink data storage unit 3021, an LUT storage unit 3022, a crosspatch data generating unit 3023, an equal brightness line calculating unit 3025, a granularity calculating unit 3026, and a light/shade separating unit 3028. Further, the equal brightness line calculating unit 3025 is connected to the crosspatch color measuring unit 3024, and the granularity calculating unit 3026 is connected to the crosspatch granularity measuring unit 3027.

The ink data storage unit 3021 stores ink data indicating a type of ink used for image output and color measurement value data indicating a color measurement value. The LUT storage unit 3022 stores the color separation LUT before a light/shade separation process and the color separation LUT after the light/shade separation. The decomposition LUT stored in the LUT storage unit 3022 includes grid points of 256×256×256 points. The crosspatch data generating unit 3023 generates crosspatch data using the ink data stored in the ink data storage unit 3021 and the color separation LUT before the light/shade separation stored in the LUT storage unit 3022. The crosspatch data is data for printing a crosspatch to be measured by the crosspatch color measuring unit 3024. The image forming device 200 outputs the crosspatch to the printing medium 207 on the basis of the crosspatch data. The crosspatch color measuring unit 3024 controls a spectrophotometer or the like and performs color measurement for the output cross patch. The equal brightness line calculating unit 3025 calculates an equal brightness line on the basis of a color measurement result of the crosspatch color measuring unit 3024. The equal brightness line will be described in detail later. The granularity calculating unit 3026 calculates the granularity in the equal brightness line calculated by the equal brightness line calculating unit 3025 on the basis of the granularity information on the crosspatch measured by the crosspatch granularity measuring unit. The crosspatch granularity measuring unit 3027 controls a CCD camera, a scanner, or the like and measures the granularity of the crosspatch. The light/shade separating unit 3028 performs the light/shade separation on the LUT before the light/shade separation stored in the LUT storage unit 3022 using the measured crosspatch color measurement value and the granularity information on the measured crosspatch.

(All-Point LUT Generation Procedure)

Figure 30:
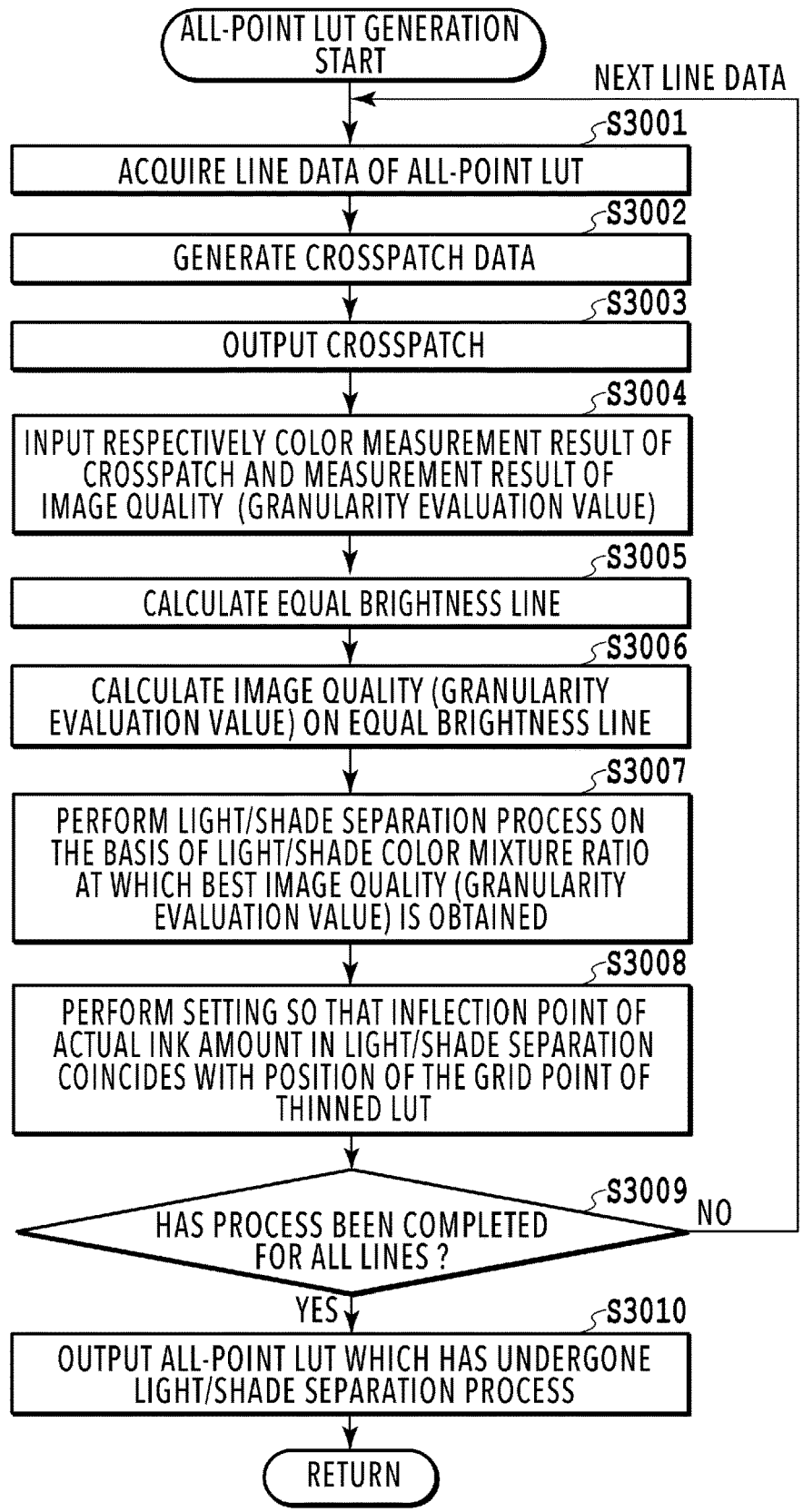
FIG. 30 is a flowchart illustrating the all-point LUT generation procedure in the third embodiment.
Figure 31:
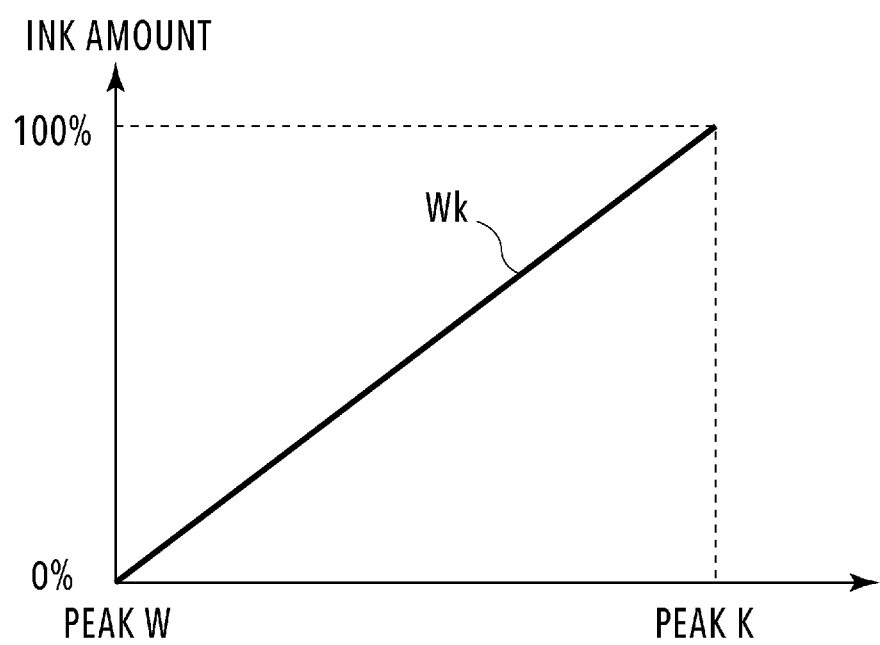
FIG. 31 is a diagram illustrating an example of line data in the fourth embodiment.

FIG. 30 is a flowchart illustrating an all-point LUT generation procedure in the present embodiment. First, in S3001, line data of the all-point LUT is acquired. The line data of the present embodiment refers to a color conversion data group in which the input RGB signal value and the actual ink amount held on the line connecting the peaks in the color cube illustrated in FIG. 10 are associated. Here, the "line" refers to a side connecting peaks of one color cube and corresponds to, for example, a side forming an outline of the color cube such as the peak W and the peak C. A single color cube has a total of 12 lines. In the present embodiment, a single color cube includes a color conversion data group corresponding to 256 grid points per line data corresponding to one side in the color cube. FIG. 31 is a diagram illustrating an example of a color conversion characteristic indicated by the line data in the present embodiment. An example of the color conversion characteristic indicated by the line data in the line connecting the peak W and the peak K is illustrated as a specific example.

Figure 32:
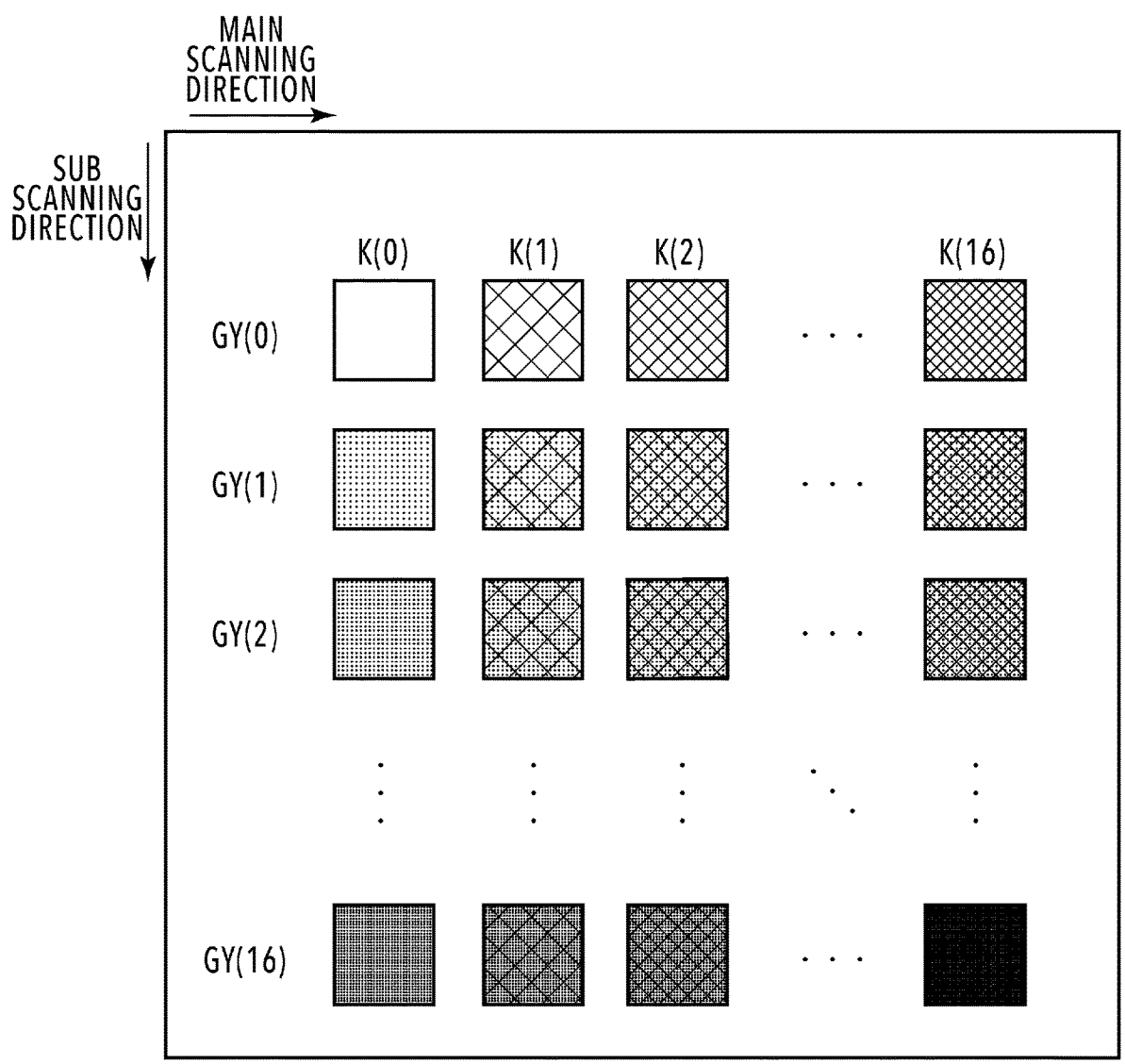
FIG. 32 is a diagram illustrating an example of a cross-patch in the fourth embodiment.

In S3002, the crosspatch data generating unit 3023 generates the crosspatch data. The crosspatch data generating unit 3023 generates the crosspatch data using the line data read in S3001 and the ink data stored in the ink data storage unit 3021. FIG. 32 is a diagram illustrating an example of the crosspatch in which the image forming device 200 outputs the crosspatch data generated in S3002. As illustrated in FIG. 32, the crosspatch of the present embodiment includes 17 patches in a main scanning direction and 17 patches in a sub scanning direction, that is, a total of 289 patches. The image forming device 200 can obtain the crosspatch including the 289 patches having different ink ejection amounts by forming printing in accordance with the line data. In the present embodiment, the ejection amount of dark ink (black ink) gradually increases as it proceeds in the main scanning direction, and the ejection amount of light ink (the gray ink) gradually increases as it proceeds in the sub scanning direction. Further, the ejection amount of ink changes linearly in both the main scanning direction and the sub-scanning direction. In a case where the black ink is indicated by K, and the gray ink is indicated by GY, the ejection amounts of the respective inks can be indicated by K(i)=(i/16)*100[%] and GY(i)=(i/16)*100[%]. Here, "i" is an integer of 0 to 16.

In S3003, the crosspatch data generated in S3002 is output to the printing medium 207 from the image forming device 200.

In S3004, the color measurement result of the crosspatch measured by the crosspatch color measuring unit 3024 and the measurement result of the image quality (granularity) measured by the crosspatch granularity measuring unit 3027 are respectively input. In the present embodiment, the granularity evaluation value is input to the granularity calculating unit 3026 as the measurement result of the image quality. RMS granularity indicated in the following Formula (8) can be used as the granularity evaluation value. Further, after a patch image (an image obtained by photographing or scanning the crosspatch) is multiplied by an MTF (Modulation Transfer Function) of a human visual system, the RMS granularity may be calculated, and the granularity in which the human visual characteristics are considered may be used.

$$RMS \text{ granularity} = \Sigma_x \Sigma_y \{(f(x,y)-f\text{ave})^2/n\} \quad \text{Formula (8)}$$

In Formula (8), f(x, y) indicates a density (or brightness) of a patch at a position (x, y), fave indicates a density average of all pixels in a patch (or brightness average), n indicates a total of the number of pixels in a patch. Instead of the granularity, an evaluation value may be used as the image quality, and for example, a gradation property evaluation value (a cumulative sum of a second order differential of the actual ink amount) or the like may be used.

Figures 33A, 33B:
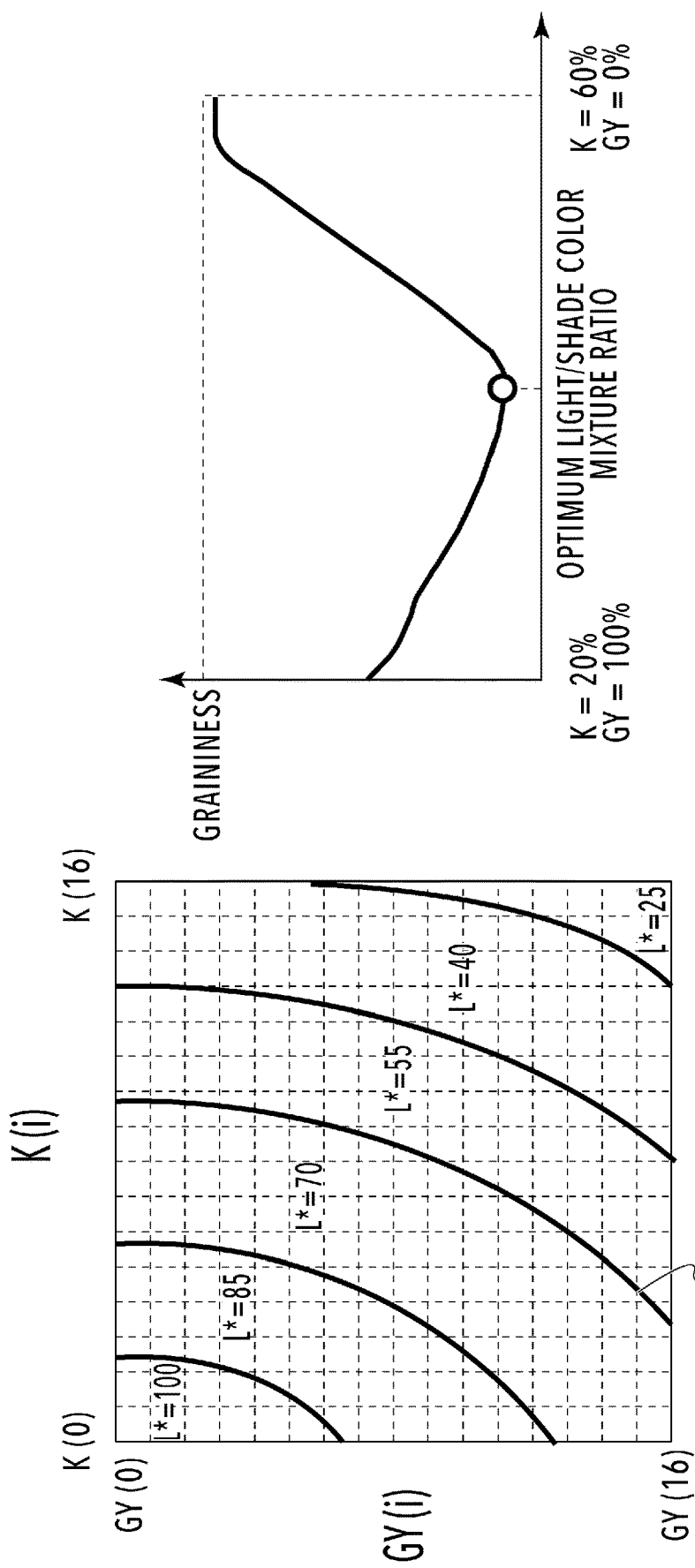
FIGS. 33A and 33B are diagrams illustrating examples of an equal brightness line and a granularity evaluation value in the fourth embodiment.

In S3005, the equal brightness line calculating unit 3025 calculates the equal brightness line. The equal brightness line in the present embodiment refers to a contour line related to brightness in the crosspatch, for example, as illustrated in FIG. 33A.

In S3006, the granularity calculating unit 3026 calculates the image quality (the granularity evaluation value) on the equal brightness line calculated in S3005. For example, the granularity evaluation value in the present embodiment is illustrated in FIG. 33B.

In S3007, a light/shade color mixture ratio at which the best image quality (granularity) is obtained is decided with reference to the image quality (the granularity evaluation value) in the equal brightness line acquired in S3006. The light/shade separating unit 3028 performs the light/shade separation process on the basis of the decided optimum light/shade color mixture ratio. Specifically, the line data is updated so that it becomes the decided optimum light/shade color mixing ratio.

In S3008, the light/shade separation is updated so that the inflection point of the actual ink amount in the light/shade separation of the all-point LUT generated in S3007 coincides with the position of the grid point of the thinned LUT. It is possible to cause the inflection point of the actual ink amount to coincide with the position of the grid point of the thinned LUT by performing the light/shade separation similarly to the process of S1311 to S1316 in the first embodiment.

FIG. 34A illustrates an example of a graph illustrating transition of the gray ink actual ink amount Wgy and the black ink actual ink amount Wk before S3008 is applied in the line (so-called gray line) connecting the peak W and the peak K. Further, FIG. 34B illustrates an example of a graph illustrating transition of the gray ink actual ink amount Wgy and the black ink actual ink amount Wk after S3008 is applied in the gray line connecting the peak W and the peak K. Further, scale marks of a horizontal axis in the graphs of FIGS. 34A and 34B correspond to the positions of the grid points in the thinned LUT.

At this time, in FIG. 34A, a position d0 of the inflection point at which the actual ink amounts Wgy and Wk are switched does not coincide with the grid point position information acquired in S401 (corresponding to the scale mark on the horizontal axis in FIG. 34 A). On the other hand, in FIG. 34B, a position d1 of the inflection point at which the actual ink amounts Wgy and Wk are switched coincides with the grid point position information acquired in S401 (corresponding to the scale mark on the horizontal axis in FIG. 34 A). As described above, in the line data of the all-point LUT, the all-point LUT is corrected so that the inflection points of a plurality of types of actual ink amounts coincide with the positions of the grid points of the thinned LUT.

In S3009, it is determined whether or not the process has been completed for all the lines. In a case where the process has been completed for all the lines (S3009: YES), the process proceeds to S3010. In a case where the process has not been completed for all the lines (S3009: NO), the process returns to S3001, and next frame data is processed.

In S3010, the all-point LUT which has undergone the light/shade separation processing is output. In a case where the output of the all-point LUT ends, the process of the present flowchart ends.

In the above process, in a case where the light/shade separation is performed so that each sample point in the same line is independently optimized, consistency (continuity) in the line may disappear. In order to solve the problem related to the consistency, in the light/shade separation process, it is preferable to convert to a smooth curve by giving a constraint condition such as "it becomes a shape in which a light ink increases and then decreases" using the light/shade separation results of other sample points in the line.

As described above, in the color conversion LUT generation technique of the present embodiment, the actual ink amount is calculated for each grid point in the all-point LUT on the basis of a correspondence relation between the input image signal and the actual ink amount in a case where the all-point LUT is generated. Then, in a case where the all-point LUT, is generated, the inflection point of the actual ink amount is set to coincide with the grid point in the thinned LUT. With such a configuration, according to the color conversion LUT generation method in the present embodiment, it is possible to generate a color conversion LUT with a satisfactory color conversion characteristic without requiring a complicated process in the color conversion process.

Other Embodiments

Further, modified examples to be described below may be made in the above-described embodiment. The two or more inks (for example, GY and K) having the same hue but different densities have been described as examples of a plurality of types of ink in the all-point LUT, but a combination other than such a combination of light/shade inks may be used. For example, inks having the same color but different dot sizes at the time of image forming, a plurality of ink colors capable of reproducing the same hue (for example, C, M, Y, and K for reproducing a gray gradation in which color dots are mixed), or a spot color ink (red, green, blue, or the like) may be used.

Further, the example in which types of ink loaded into the printing head 205 are five colors of C, M, Y, K, and GY has been described, but the type of ink loaded into the printing head 205 is not limited to the above example. For example, a single color ink such as light cyan, light magenta, light yellow, light gray, light red, light green, or light blue or a special color ink such as orange, pink, white, red, blue, green, or violet may be applied. Further, a colorless and transparent clear ink or a metal-tone metallic ink may be applied.

Inks of various characteristics such as a dye, a pigment, and a UV curable type can be applied as a characteristic of an ink material.

Further, in the above embodiments, the example in which the image forming device 200 is an ink jet printer (a multipass system) has been described, but other printing systems may be used. For example, a full line type ink jet printer, an electrophotographic type printer, a sublimation type printer, a UV curing type printer using a color material which is cured by irradiation of ultraviolet rays, or a 3D printer that forms a three-dimensional object may be used. Further, the color conversion LUT generation technique described in the present embodiment can also be applied to an image display device such as a display or a projector. Similarly, the color conversion LUT generation technique described in the present embodiment can be applied to image processing software such as photo editing software or CG production software.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to generate a color conversion LUT with a satisfactory color conversion characteristic without requiring a complicated process in the color conversion process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-078367, filed Apr. 11, 2017, which is hereby incorporated by reference wherein in its entirety.

What is claimed is:

1. A generating device that generates a first color conversion look up table (LUT) for converting an input image signal value into an output value of an actual color material installed in an image forming device,
the first color conversion LUT obtained by thinning out grid points in a second color conversion LUT in which a number of grid points is larger than a number of grid points of the first color conversion LUT, the generating device comprising:

one or more processors; and a memory including instructions thereon which, when executed by the one or more processors, cause the generating device to function as:

an acquiring unit configured to acquire grid point position information indicating positions of the grid points in the first color conversion LUT; and a generating unit configured to generate the first color conversion LUT on the basis of the grid point position information, wherein the generating unit determines, based on the grid point position information, whether or not an inflection point of the output value of the actual color material is at a position of the grid point, corrects, in response to the grid point position information, at least some output values for at least two actual color materials in the second color conversion LUT in accordance with a determination result, and generates the first color conversion LUT obtained by thinning out the grid points in the second color conversion LUT without correcting the position of the grid point when the grid point position information indicates that the inflection point of the output value of the actual color material is not in the position of the grid point.

2. The generating device according to claim 1, wherein the generating unit causes inflection points of output values of at least two actual color materials in the second color conversion LUT to coincide with the positions of the grid points in the first color conversion LUT.

3. The generating device according to claim 2, wherein the inflection point is the input image signal value corresponding to a point at which an increase or decrease of the output values of the at least two actual color materials changes.

4. The generating device according to claim 2, wherein the generating unit causes the inflection points to coincide with the positions of the grid points in the first color conversion LUT adjacent in a direction in which a gradation indicated by the input image signal value gets bright.

5. The generating device according to claim 4, wherein the instructions, when executed by the one or more processors, further cause the generating unit to function as:

a searching unit configured to search for the inflection points, wherein, in a case that the inflection points which are searched for do not coincide with the positions of the grid points in the first color conversion LUT, the generating unit causes the inflection points to coincide with the positions of the grid points in the first color conversion LUT adjacent in a direction in which a gradation indicated by the input image signal value gets bright; and a calculating unit configured to subtract the output values of the at least two actual color materials decreased as the inflection points are caused to coincide with the positions of the grid points in the first color conversion LUT from limit values of the at least two actual color materials ejectable onto a printing medium, and to calculate the output values of the at least two actual color materials with reference to the subtracted limit values.

6. The generating device according to claim 2, wherein the generating unit causes the inflection points to coincide with the positions of the grid points in the first color conversion LUT adjacent in a direction in which a gradation indicated by the input image signal value gets dark.

7. The generating device according to claim 6, wherein the instructions, when executed by the one or more processors, further cause the generating unit to function as:

a searching unit configured to search for the inflection points, wherein, in a case that the inflection points which are searched for do not coincide with the positions of the grid points in the first color conversion LUT, the generating unit causes the inflection points to coincide with the positions of the grid points in the first color conversion LUT adjacent in a direction in which a gradation indicated by the input image signal value gets dark; and a calculating unit configured to subtract the output values of the at least two actual color materials decreased as the inflection points are caused to coincide with the positions of the grid points in the first color conversion LUT from limit values of the at least two actual color materials ejectable onto a printing medium, and to calculate the output values of the at least two actual color materials with reference to the subtracted limit values.

8. The generating device according to claim 1, wherein the acquiring unit acquires the grid point position information indicating that the grid points in the first color conversion LUT are arranged at equal intervals.

9. The generating device according to claim 1, wherein the first color conversion LUT includes a three-dimensional LUT and a one-dimensional non-linear conversion LUT having a non-linear characteristic, and the acquiring unit acquires the grid point position information which indicates positions of grid points in the first color conversion LUT decided on the basis of the non-linear characteristic and indicates that the grid points in the first color conversion LUT are arranged at unequal intervals.

10. The generating device according to claim 1, wherein the instructions, when executed by the one or more processors, further cause the generating device to function as:

a storage unit configured to store an existing color conversion LUT generated in advance; and a correcting unit configured to correct output values of the at least two actual color materials held at the grid points in the existing color conversion LUT, and wherein the second color conversion LUT is the existing color conversion LUT in which the output values of the at least two actual color materials are corrected by the correcting unit.

11. The generating device according to claim 10, wherein the correcting unit corrects the output values of the plurality of types of actual color materials held at target grid points on the basis of a gradation property evaluation value calculated from the output values of the at least two actual color materials at the target grid points and grid points adjacent to the target grid points.

12. The generating device according to claim 1, wherein the instructions, when executed by the one or more processors, further cause the generating device to function as:

a second generating unit configured to generate the second color conversion LUT, wherein the second color conversion LUT is an all-point LUT having grid points corresponding to all the input image signal values, wherein the second generating unit includes:

a calculating unit configured to calculate output values of a plurality of virtual color materials corresponding to the input image signal value for each grid point in the second color conversion LUT; and
a converting unit configured to convert the calculated output values of the plurality of virtual color materials into the output values of the plurality of types of color materials for each grid point in the second color conversion LUT on the basis of the output values of a plurality of types of actual color materials at respective peaks of the second color conversion LUT given in advance,
the plurality of virtual color materials have densities corresponding to respective wavelength bands in a case that a wavelength range reproduced in outputs of the plurality of types of actual color materials is divided into a plurality of wavelength bands, and
the calculating unit calculates the output values of the plurality of virtual color materials corresponding to the input image signal value on the basis of the densities corresponding to the respective wavelength bands.

13. The generating device according to claim 1, wherein the instructions, when executed by the one or more processors, further cause the generating device to function as:
a second generating unit configured to generate the second color conversion LUT,
wherein the second color conversion LUT is an all-point LUT having grid points corresponding to all the input image signal values, and
wherein the second generating unit includes
a measuring unit configured to measure a patch output in accordance with a predetermined correspondence relation between the input image signal value and the output values of the plurality of types of actual color materials in the second color conversion LUT;
an evaluating unit configured to evaluate an image quality of a patch image generated from the patch; and
a calculating unit configured to calculate the output values of the plurality of types of actual color materials for each grid point in the second color conversion LUT on the basis of the evaluation.

14. The generating device according to claim 1, wherein the plurality of types of actual color materials are at least any one of two or more color materials having the same hue but different densities, color materials having the same color but different dot sizes, a plurality of color materials capable of reproducing the same hue, and spot color inks.

15. The generating device according to claim 1, wherein the grid points in the second color conversion LUT are at equal intervals.

16. A color conversion look up table (LUT) generation method that generates a first color conversion LUT for converting an input image signal value into an output value of an actual color material installed in an image forming device,
the first color conversion LUT obtained by thinning out grid points in a second color conversion LUT in which a number of grid points is larger than a number of grid points of the first color conversion LUT, the color conversion LUT generation method comprising:
acquiring grid point position information indicating positions of the grid points in the first color conversion LUT; and
generating the first color conversion LUT on the basis of the grid point position information,
wherein generating the first color conversion LUT includes determining, based on the grid point position information, whether or not an inflection point of an output value of the actual color material is at a position of the grid point, correcting, in response to the grid point position information, at least some output values for at least two actual color materials in the second color conversion LUT in accordance with a determination result, and generating the first color conversion LUT obtained by thinning out the grid points in the second color conversion LUT without correcting the position of the grid point when the grid point position information indicates that the inflection point of the output value of the actual color material is not in the position of the grid point.

17. A non-transitory computer readable storage medium storing a program for causing a computer to function as a generating device that generates a first color conversion look up table (LUT) for converting an input image signal value into an output value of an actual color material installed in an image forming device,
the first color conversion LUT obtained by thinning out grid points in a second color conversion LUT in which a number of grid points is larger than a number of grid points of the first color conversion LUT, the generating device comprising:
an acquiring unit configured to acquire grid point position information indicating positions of the grid points in the first color conversion LUT; and
a generating unit configured to generate the first color conversion LUT on the basis of the grid point position information,
wherein the generating unit determines, based on the grid point position information, whether or not an inflection point of an output value of the actual color material is at a position of the grid point, corrects, in response to the grid point position information, at least some output values for at least two actual color materials in the second color conversion LUT in accordance with a determination result, and generates the first color conversion LUT obtained by thinning out the grid points in the second color conversion LUT without correcting the position of the grid point when the grid point position information indicates that the inflection point of the output value of the actual color material is not in the position of the grid point.

* * * * *